United States Patent
Sano et al.

(10) Patent No.: US 9,013,492 B2
(45) Date of Patent: Apr. 21, 2015

(54) IMAGE DISPLAY DEVICE, IMAGE DISPLAY METHOD, AND IMAGE DISPLAY PROGRAM

(71) Applicant: Sony Corporation, Tokyo (JP)

(72) Inventors: Ikuya Sano, Kanagawa (JP); Kazuto Nishizawa, Kanagawa (JP); Iori Nishiuchi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/762,808

(22) Filed: Feb. 8, 2013

(65) Prior Publication Data

US 2013/0187938 A1    Jul. 25, 2013

Related U.S. Application Data

(63) Continuation of application No. 12/387,300, filed on Apr. 30, 2009, now Pat. No. 8,395,637.

(30) Foreign Application Priority Data

May 2, 2008    (JP) ................................ P2008-120208
May 2, 2008    (JP) ................................ P2008-120209

(51) Int. Cl.
*G06F 15/80*    (2006.01)
*G09G 5/00*    (2006.01)
(Continued)

(52) U.S. Cl.
CPC *G09G 5/00* (2013.01); *G06F 3/147* (2013.01); *G09G 5/14* (2013.01); *G09G 2380/16* (2013.01)

(58) Field of Classification Search
CPC .......... G09G 3/3426; G09G 2360/122; G09G 3/1446

USPC ......................................... 345/505, 581, 204
See application file for complete search history.

(56) References Cited

U.S. PATENT DOCUMENTS

2001/0050679 A1    12/2001    Shigeta
2002/0078447 A1*   6/2002    Mizutome et al. .............. 725/37
(Continued)

FOREIGN PATENT DOCUMENTS

JP    07288790 A    10/1995
JP    10307931 A    11/1998
(Continued)

OTHER PUBLICATIONS

Office Action from Japanese Application No. 2008-120209, dated Mar. 9, 2010.
(Continued)

*Primary Examiner* — Hau Nguyen
(74) *Attorney, Agent, or Firm* — Lerner, David, Littenberg, Krumholz & Mentlik, LLP

(57) ABSTRACT

An image display device includes: a storing section configured to store associating information that associates information indicating one or more providing sources of image data with each of one or more display areas set within a display screen; an obtaining section configured to obtain image data from a providing source corresponding to each of one or more display areas on the basis of the associating information stored in the storing section; a forming section configured to form display image data of a display image to be displayed on the display screen on the basis of the image data being obtained by said obtaining section for each of one or more display areas; and a display processing section configured to display the display image corresponding to the display image data formed by the forming section on the display screen.

15 Claims, 35 Drawing Sheets

(51) Int. Cl.
*G06F 3/147* (2006.01)
*G09G 5/14* (2006.01)

(56) References Cited

U.S. PATENT DOCUMENTS

| 2003/0221876 A1* | 12/2003 | Doczy et al. | 178/18.01 |
| 2004/0032400 A1* | 2/2004 | Freeman et al. | 345/173 |

FOREIGN PATENT DOCUMENTS

| JP | 2000041208 A | 2/2000 |
| JP | 2001230916 A | 8/2001 |
| JP | 2002-024846 A | 1/2002 |
| JP | 2002140187 A | 5/2002 |
| JP | 2002236701 A | 8/2002 |
| JP | 2003085209 A | 3/2003 |
| JP | 2003241728 A | 8/2003 |
| JP | 2003242409 A | 8/2003 |
| JP | 2005217902 A | 8/2005 |
| JP | 2006099532 A | 4/2006 |
| JP | 2006171807 A | 6/2006 |
| JP | 2006-279764 A | 10/2006 |
| JP | 2006279118 A | 10/2006 |
| JP | 2007243605 A | 9/2007 |
| JP | 2007274030 A | 10/2007 |
| JP | 2008052616 A | 3/2008 |

OTHER PUBLICATIONS

Nobuyuki Hayashi, other one person, "How to walk of Flickr", Mac People, Japan, ASCII Co., Ltd., May 1, 2005, vol. 11, No. 5, p. 64-69.

Office Action from Japanese Application No. 2008-120208, dated Apr. 15, 2010.

* cited by examiner

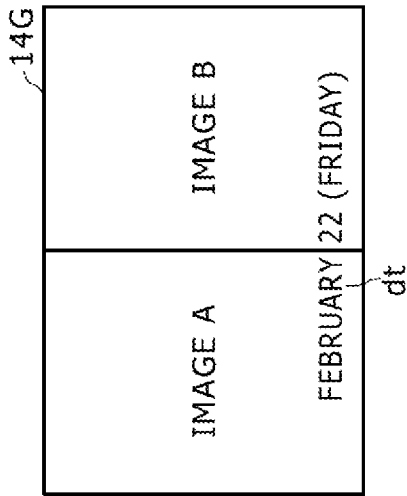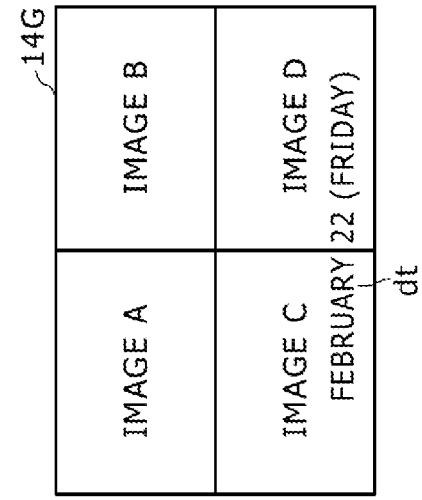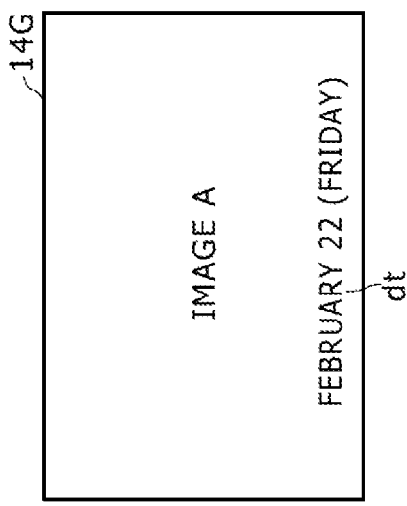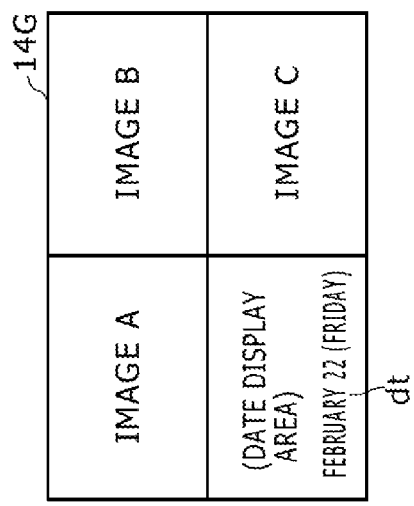

FIG.9

| | | |
|---|---|---|
| U11 U31 | U32 | U12 |
| 2007/04/21 09:21<br>AAA<br>U21<br>IMAGE A<br><br>FRAME A | 2007/10/29 12:42<br>BBB<br>U22<br>IMAGE B<br><br>FRAME B | 14G |
| FRAME C<br><br>IMAGE C<br>U13 U23<br>U33<br>CCC<br>2007/11/22 05:05 | FRAME D<br><br>IMAGE D<br>U24 U14<br>U34<br>DDD<br>2007/04/25 03:46 | |

FIG.10

| | | |
|---|---|---|
| U11 U31 | U32 | U12 |
| 2008/03/05 08:32PM<br>AAA<br>(NEW) U21<br>IMAGE A<br>14N<br>FRAME A | 2008/01/12 01:11PM<br>BBB<br>U22<br>IMAGE B<br><br>FRAME B | 14G |
| FRAME C<br><br>02:59 PM | FRAME D<br><br>IMAGE C<br>U23 U13<br>U33<br>CCC<br>2006/10/29 03:27PM | |

FIG. 11

| FILE ID | SHARE FRAME TITLE | | | | | |
|---|---|---|---|---|---|---|
| NUMBER OF DISPLAY PHOTOGRAPHS WITHIN ONE SCREEN | DISPLAY CHANGING TIME | OTHERS | | | | |
| FRAME ID | USER NAME | PROFILE PHOTOGRAPH | ALBUM URL | UPDATE DATE AND TIME | NEW ARRIVAL FLAG (NEW) | |
| A | AAA | ○○○···.jpeg | URL(A) | latest1 | 0 (NONE) | |
| | | | URL(A2) | latest2 | 1 (PRESENT) | |
| B | BBB | ×××···.jpeg | URL(B) | latest3 | 0 (NONE) | |
| | | | URL(B2) | latest4 | 1 (PRESENT) | |
| | | | URL(B3) | latest5 | 0 (NONE) | |
| ... | ... | ... | ... | ... | ... | |

| FILE NAME | PHOTOGRAPHING DATE AND TIME | IMAGE SIZE | ADDITION DATE AND TIME |
|---|---|---|---|
| ×××···.jpeg | '08.03.25 13:25 | ····· | '08.03.26 19:50 |

FIG.18A
FL1
| FILE NAME | ADDITIONAL DATA |
|---|---|
| | KEYWORD: (HAWAII), OCEAN |
| | STILL IMAGE DATA |

FIG.18B
FL2
| FILE NAME | ADDITIONAL DATA |
|---|---|
| | KEYWORD: (HAWAII), HOTEL, DINNER |
| | STILL IMAGE DATA |

FIG.18C
FL3
| FILE NAME | ADDITIONAL DATA |
|---|---|
| | KEYWORD: (HAWAII), WAIKIKI, SURFING |
| | STILL IMAGE DATA |

FIG.18D
FL4
| FILE NAME | ADDITIONAL DATA |
|---|---|
| | KEYWORD: (HAWAII), DIAMOND HEAD |
| | STILL IMAGE DATA |

FIG.19

| FILE NAME | TAG FRAME TITLE | | |
|---|---|---|---|
| ACCESS DESTINATION | NUMBER OF DISPLAY PHOTOGRAPHS WITHIN ONE SCREEN | IMAGE CHANGING TIME | MAXIMUM NUMBER OF DISPLAY PHOTOGRAPHS |
| KEYWORD SELECTING METHOD | | | |
| 1. FIXED: ××××<br>2. RANDOMLY OBTAIN FROM KEYWORD FILE<br>3. SELECT OFTEN USED KEYWORD | | | |

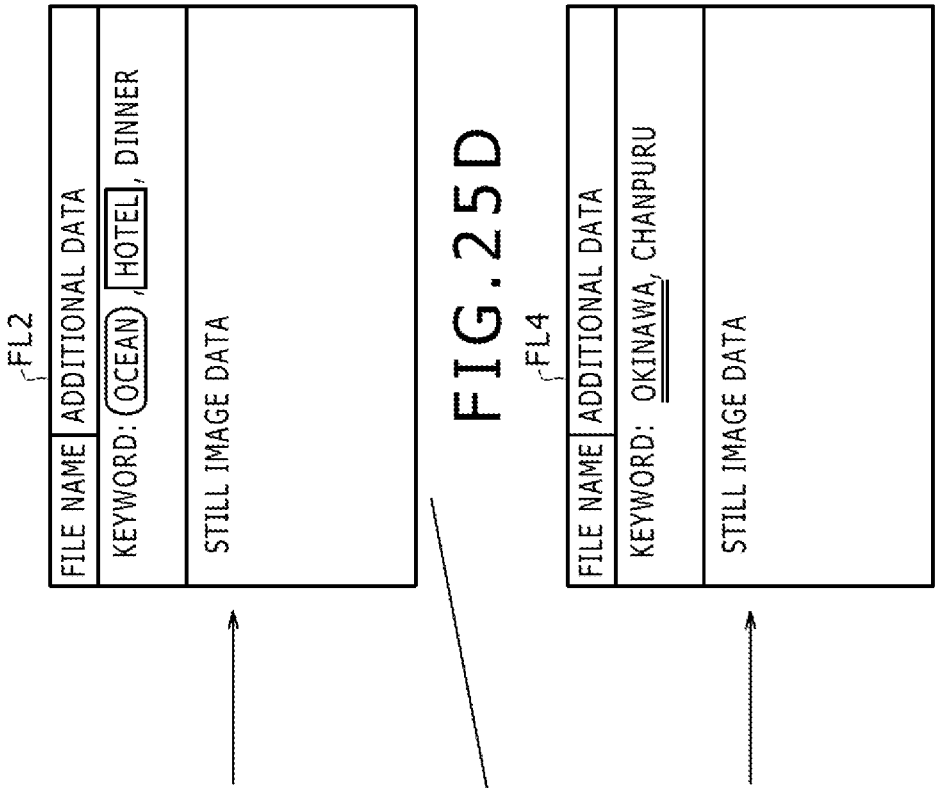
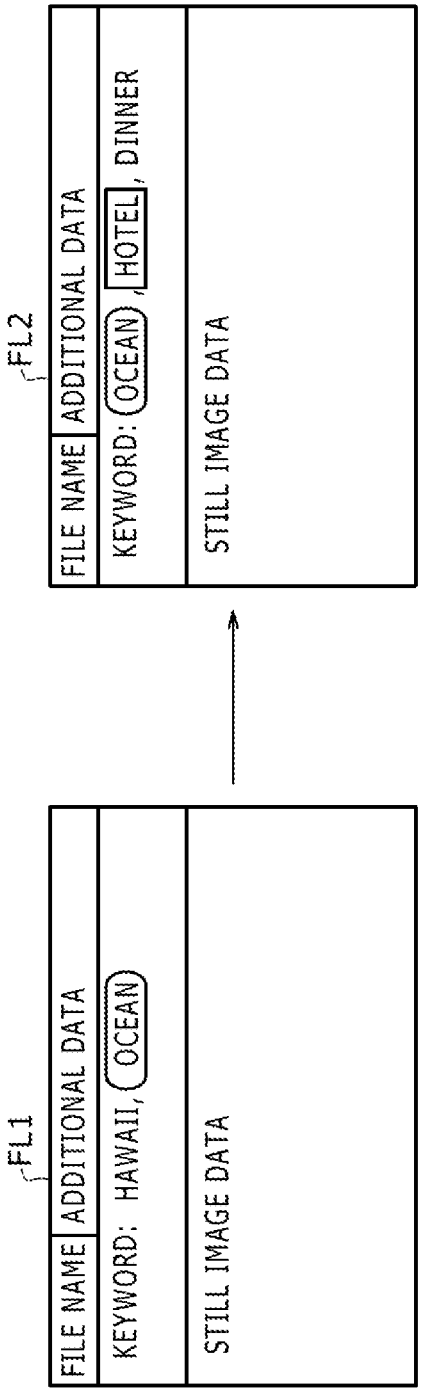
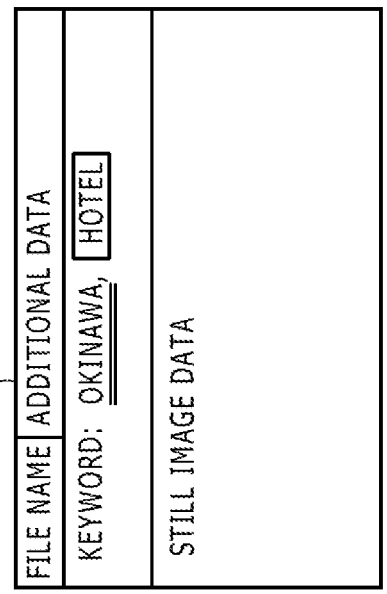

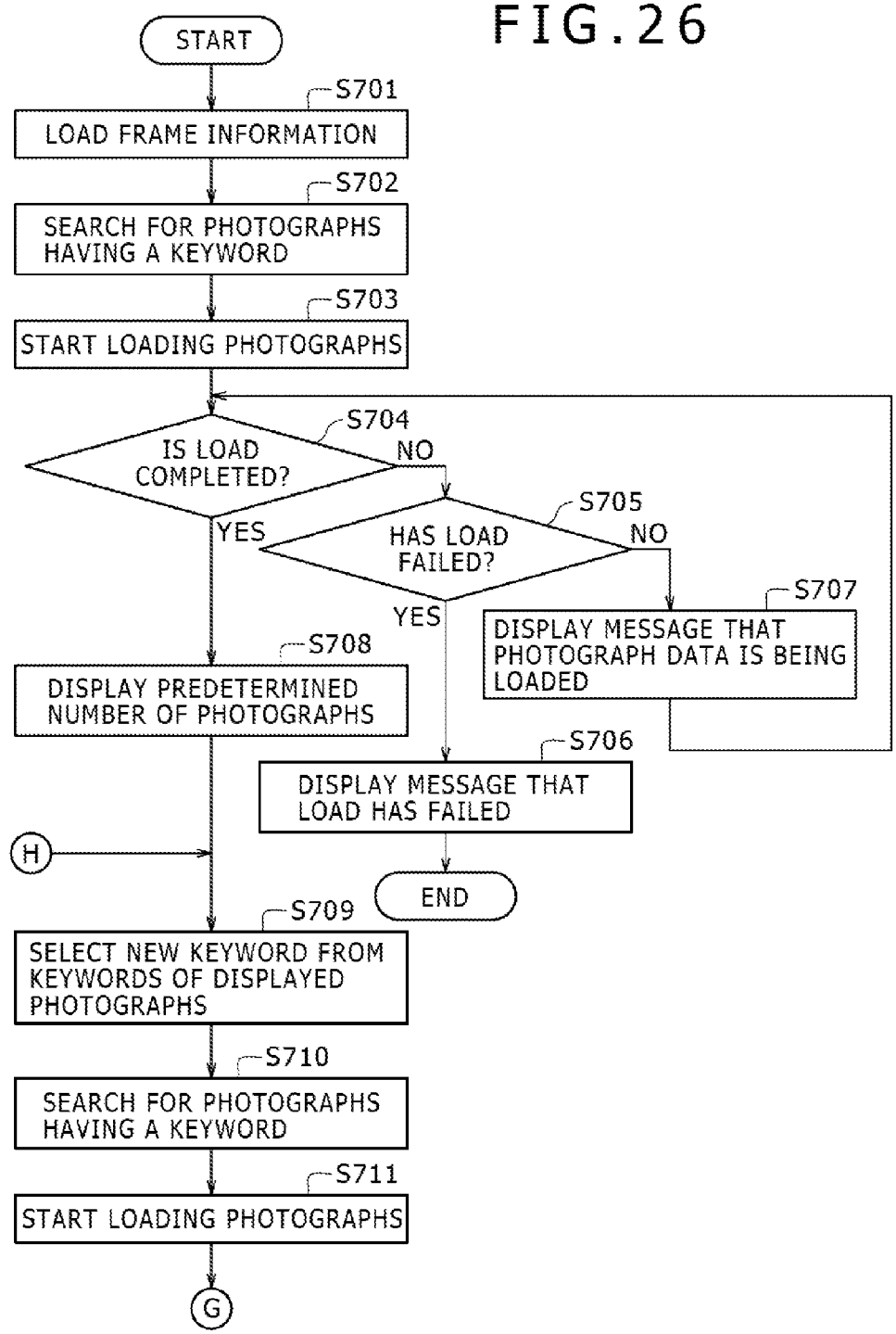

FIG. 28

MODE OF STORAGE OF PHOTOGRAPH DATA (STILL IMAGE DATA) STORED IN MEMORY
EXAMPLE IN WHICH PHOTOGRAPH DATA HAVING PHOTOGRAPHING DATES
(CREATION DATES) FROM MARCH 15, 2005 TO PRESENT DATE (FEBRUARY 22, 2008)
IS STORED

| 2005 | 2006 | 2007 | 2008 |
|---|---|---|---|
| 3/15 ⋯⋯ 12/31 | 1/1, 2/3, 2/27 ⋯ 12/31 | 1/1, 2/6, 2/23 ⋯ 12/25 | 1/1, 2/1 ⋯ 2/22 |

FIG. 29

|      |     |     |     |          |       |
|------|-----|-----|-----|----------|-------|
| 2005 | 1/1 | 2/3 |     | 3/15 ... | 12/31 |
| 2006 | 1/1 |     | 2/6 | 2/27 ... | 12/31 |
| 2007 | 1/1 |     |     | 2/23 ... | 12/25 |
| 2008 | 1/1 | 2/1 | 2/22 | | |

IDENTIFY PHOTOGRAPH DATA FOR PREDETERMINED NUMBER OF PHOTOGRAPHS AS DISPLAY OBJECTS WITH PRESENT DATE (FEBRUARY 22, 2008) AS REFERENCE

IMAGE DISPLAY DEVICE, IMAGE DISPLAY METHOD, AND IMAGE DISPLAY PROGRAM

CROSS-REFERENCE TO RELATED APPLICATIONS

The present application is a continuation of U.S. patent application Ser. No. 12/387,300 filed on Apr. 30, 2009, which claims priority from Japanese Patent Application Nos. P2008-120208, filed on May 2, 2008, and P2008-120209, filed on May 2, 2008, in the Japanese Patent Office, the disclosures of which are hereby incorporated by reference herein.

BACKGROUND OF THE INVENTION

1. Field of the Invention

The present invention relates to, for example, a device for displaying image data such as still image data, moving image data, graphics data, a method used in the device, and a program.

2. Description of the Related Art

Digital still cameras have spread, so that end users can readily use still image data on subjects which still image data is obtained by photographing. In addition, various still image data is made open to the public via server devices on the Internet. The still image data is downloaded and used by end users.

A large number of pieces of still image data are managed by using a personal computer, and the still image data is used by, for example, making a slide show display, which displays images based on a large number of pieces of still image data in order, one for each fixed time.

In addition, for easy use of still image data obtained by taking images of subjects through digital still cameras, photograph displaying devices referred to as digital photograph displaying devices, electronic photo stands and the like have been proposed.

For example, Japanese Patent Laid-open No. 2002-24846 (hereinafter referred to as Patent Document 1) to be described later discloses an invention relating to a digital photograph device that, when displaying digital photographs, automatically changes the arrangement of the photographs being displayed as a photograph layout pattern with the passage of time.

By using the invention described in Patent Document 1, the arrangement of the photographs being displayed can be changed automatically, so that enjoyable varying photograph display can be made without troubling the user.

SUMMARY OF THE INVENTION

The invention described in the above Patent Document 1 sets all of still image data recorded and retained in a predetermined memory as display objects. Also in a so-called slide show display realized by a personal computer or the like, images based on still image data registered in a selected folder are reproduced sequentially.

However, as described above, there is various still image data usable by an end user, such as still image data obtained when the end user himself/herself performed photographing using a digital camera as well as still image data made open to the public via server devices on the Internet.

It is thus desirable to use efficiently still image data stored at various storage locations without troubling the user. When still image data stored at various storage locations is thus made usable by the user, it is desirable to improve the convenience of the user from various aspects.

In view of the above, it is desirable to use efficiently image data such as still image data stored at various storage locations, and improve the convenience of the user in using the image data.

In addition, the invention described in the above Patent Document 1 sets all of still image data recorded and retained in a predetermined memory as display objects. However, a semiconductor memory storing and retaining still image data has been increased in capacity and lowered in price year after year. Some memories can store and retain a large number of pieces of still image data in a unit of a few hundred pieces or in a unit of a few thousand pieces.

Thus, when still image data is reproduced from a memory that stores and retains a large number of pieces of still image data, selection of still image data to be reproduced becomes a problem. In this case, it is desirable to be able to extract and reproduce still images suitable to a season or a time period without troubling the user. It is also desirable to be able to make effective use of not only still image data with new photographing years, months, and days but also still image data with old photographing years, months, and days.

In addition, moving image data is obtained by taking a moving image of a subject using a digital video camera, and the moving image data is recorded onto a recording medium. In addition, various moving image data can be obtained via various recording media and the Internet. Further, various music data can be obtained via various recording media and the Internet.

Thus, also when a large number of pieces of various content data including not only still image data but also moving image data, music data and the like are to be obtained and used, it is desirable to be able to use the content data in the same manner as in the case of using still images. That is, when there is a large amount of moving image data and music data, it is desirable to be able to extract and reproduce data suitable to a season or a time period without troubling the user. It is also desirable to be able to make effective use of not only content data with new obtainment years, months, and days but also content data with old obtainment years, months, and days.

In view of the above, it is also desirable to appropriately extract content data suitable for reproduction from a large amount of content data and use the content data without troubling the user.

According to a first embodiment of the present invention, there is provided an image display device including: storing means for storing associating information that associates information indicating one or more providing sources of image data with each of one or more display areas set within a display screen; obtaining means for obtaining image data from a providing source corresponding to each of the one or more display areas on the basis of the associating information stored in the storing means; forming means for forming display image data of a display image to be displayed on the display screen on the basis of the image data being obtained by the obtaining means for each of the one or more display areas; and display processing means for displaying the display image corresponding to the display image data formed by the forming means on the display screen.

According to the image display device in accordance with the first embodiment of the present invention, associating information that associates information indicating one or more providing sources of image data with each of one or more display areas set within a display screen is recorded in the storing means. Using the associating information of the storing means, the obtaining means obtains image data from a providing source corresponding to each of the one or more set display areas.

Using the obtained image data, the forming means forms display image data of a display image to be displayed on the display screen. On the basis of the display image data, the display processing means displays the display image on the display screen.

Thereby, image data obtained from a providing source corresponding to each of the one or more display areas set within one display screen can be displayed in each of the one or more display areas. Therefore image data such as still image data stored at various storage locations can be used efficiently. In addition, in using the image data, the convenience of the user can be improved.

In addition, an image display device according to a second embodiment of the present invention is the image display device according to the first embodiment of the present invention, further including: receiving means for receiving an instruction input from a user; measuring means for measuring a time from display of the display image on the display screen by the display processing means; and display controlling means for controlling the obtaining means, the forming means, and the display processing means to display a new display image when a predetermined instruction input is received via the receiving means or when a result of measurement of the measuring means indicates that a certain time has passed from the display of the display image.

According to the image display device in accordance with the second embodiment of the present invention, when one of events of an instruction input from the user and the passage of a certain time from the display of the display image occurs, the display controlling means controls the various parts to change display images displayed in the one or more display areas of the display screen.

Thereby each of the display images in the one or more display areas of the display screen can be changed in appropriate timing. Thus, more image data can be used, and image data such as still image data stored at various storage locations can be used efficiently. In addition, in using the image data, the convenience of the user can be improved.

In addition, an image display device according to a third embodiment of the present invention is the image display device according to the first embodiment of the present invention, further including: detecting means for detecting whether there is new image data at a providing source corresponding to each of the one or more display areas in each predetermined timing on the basis of the associating information stored in the storing means; and informing means for informing presence of new image data when the detecting means detects the presence of the new image data.

According to the image display device in accordance with the third embodiment of the present invention, the detecting means functions in each predetermined timing to detect whether there is new image data to be displayed at a providing source corresponding to each of the one or more display areas set within the display screen. When the presence of new image data to be displayed is detected, the informing means informs this to the user.

Thereby the user can be informed of the presence of a new image to be displayed, and quickly use the new usable image. Thus, image data such as still image data stored at various storage locations can be used efficiently. In addition, in using the image data, the convenience of the user can be improved.

In addition, an image display device according to a fourth embodiment of the present invention is the image display device according to the first embodiment of the present invention, further including: detecting means for detecting whether there is new image data at a providing source corresponding to each of the one or more display areas in each predetermined timing on the basis of the associating information stored in the storing means; updating means for updating the storing means with information indicating presence of new image data for each of the one or more display areas when the detecting means detects the presence of the new image data; and new arrival notifying means for making a display notifying presence of new image data in a display area for which the new image data is present on the basis of the information stored in the storing means.

According to the image display device in accordance with the fourth embodiment of the present invention, the detecting means functions in each predetermined timing to detect whether there is new image data to be displayed at a providing source corresponding to each of the one or more display areas set within the display screen. When the presence of new image data to be displayed is detected, the storing means is updated with this by the updating means. Thereafter, when the storing means is updated with information indicating the presence of the new image data to be displayed, the new arrival notifying means notifies the presence of the new image data to be displayed to the user by a display in a display area.

Thereby the user can be informed of the presence of a new image to be displayed in the display area by the display in the display area, and quickly use the new usable image. Thus, image data such as still image data stored at various storage locations can be used efficiently. In addition, in using the image data, the convenience of the user can be improved.

In addition, an image display device according to a fifth embodiment of the present invention is the image display device according to the first embodiment of the present invention, further including: detecting means for detecting whether there is new image data at a providing source corresponding to each of the one or more display areas in each predetermined timing on the basis of the associating information stored in the storing means; updating means for updating the storing means with information indicating presence of new image data for each of the one or more display areas when the detecting means detects the presence of the new image data; menu forming means for forming and displaying a menu having a performable process as a selection item; and notifying means for making a display notifying presence of new image data in the selection item of the menu formed by the menu forming means, the selection item being for a process of displaying an image in each of the one or more display areas set within the display screen, when the storing means is updated with information indicating the presence of the new image data.

According to the image display device in accordance with the fifth embodiment of the present invention, the detecting means functions in each predetermined timing to detect whether there is new image data to be displayed at a providing source corresponding to each of the one or more display areas set within the display screen. When the presence of new image data to be displayed is detected, the storing means is updated with this by the updating means.

The menu forming means forms and displays a menu having a performable process as a selection item. In this case, when the storing means is updated with information indicating the presence of the new image data to be displayed, the notifying means makes a display notifying the presence of the new image data in the selection item for a process of displaying an image in each of the one or more display areas set within the display screen.

Thereby the user can be informed of the presence of a new image to be displayed in the display of the selection item of the menu, and quickly use the new usable image. Thus, image data such as still image data stored at various storage locations can be used efficiently. In addition, in using the image data, the convenience of the user can be improved.

According to the image display device in accordance with a sixth embodiment of the present invention, there is provided an image display device including: storing means for storing associating information that associates information indicating providing sources of image data with each of a plurality of display areas set within a display screen; obtaining means for obtaining image data from the providing sources of the image data; and display controlling means for displaying the image data obtained by the obtaining means in each of the display areas corresponding to the providing sources on the basis of the associating information.

According to the image display device in accordance with a seventh embodiment of the present invention, there is provided an image display method including: a recording step of recording, by recording means, in storing means, associating information that associates information indicating one or more providing sources of image data with each of one or more display areas set within a display screen; an obtaining step of obtaining, by obtaining means, image data from a providing source corresponding to each of the one or more display areas on the basis of the associating information stored in the storing means; a forming step of forming, by forming means, display image data of a display image to be displayed on the display screen on the basis of the image data being obtained in the obtaining step for each of the one or more display areas; and a display processing step of displaying, by display processing means, the display image corresponding to the display image data formed in the forming step on the display screen.

According to the embodiments of the present invention, it is possible to use efficiently image data such as still image data stored at various storage locations, and improve the convenience of the user in using the image data.

In addition, according to the embodiments of the present invention, it is possible to appropriately extract content data suitable for reproduction from a large amount of content data and use the content data without troubling the user.

BRIEF DESCRIPTION OF THE DRAWINGS

FIGS. 4A, 4B, 4C, and 4D are diagrams of assistance in explaining output modes (display modes) when a still image is displayed, which modes are selectable in the image display device to which one embodiment of the present invention is applied;

FIG. 9 is a diagram of assistance in explaining a concrete example of image display by the "share frame";

FIG. 10 is a diagram of assistance in explaining a concrete example of image display by the "share frame";

FIG. 11 is a diagram of assistance in explaining an example of share frame information used in the image display device;

FIG. 13 is a diagram of assistance in explaining an example of recording information of a photograph album provided on a server device on the Internet or the like;

FIG. 14 is a diagram of assistance in explaining an example of a photograph list as management information of the photograph album provided on the server device on the Internet;

FIGS. 18A, 18B, 18C, and 18D are diagrams of assistance in explaining a "tag frame";

FIG. 19 is a diagram of assistance in explaining an example of tag frame information;

FIGS. 25A, 25B, 25C, and 25D are diagrams of assistance in explaining a tag frame when photographs are displayed on the basis of photograph data extracted with a keyword changed for each screen;

FIG. 26 is a flowchart of assistance in explaining a process of extracting and displaying photograph data while changing a keyword used for each screen;

FIG. 28 is a diagram of assistance in explaining a concrete example of still image data extracted as still image data to be reproduced in a "memory frame" function;

FIG. 29 is a diagram of assistance in explaining a concrete example of still image data extracted as still image data to be reproduced in the "memory frame" function;

DETAILED DESCRIPTION OF THE PREFERRED EMBODIMENTS

A device, a method, and a program to which an embodiment of the present invention is applied will hereinafter be described with reference to the drawings. The embodiment will be described below by taking as an example a case where the present invention is applied to an image display device that has a display element with a relatively small display screen and which can display still images and moving images and also reproduce audio.

[External Appearance of Image Display Device]

Figure 1:
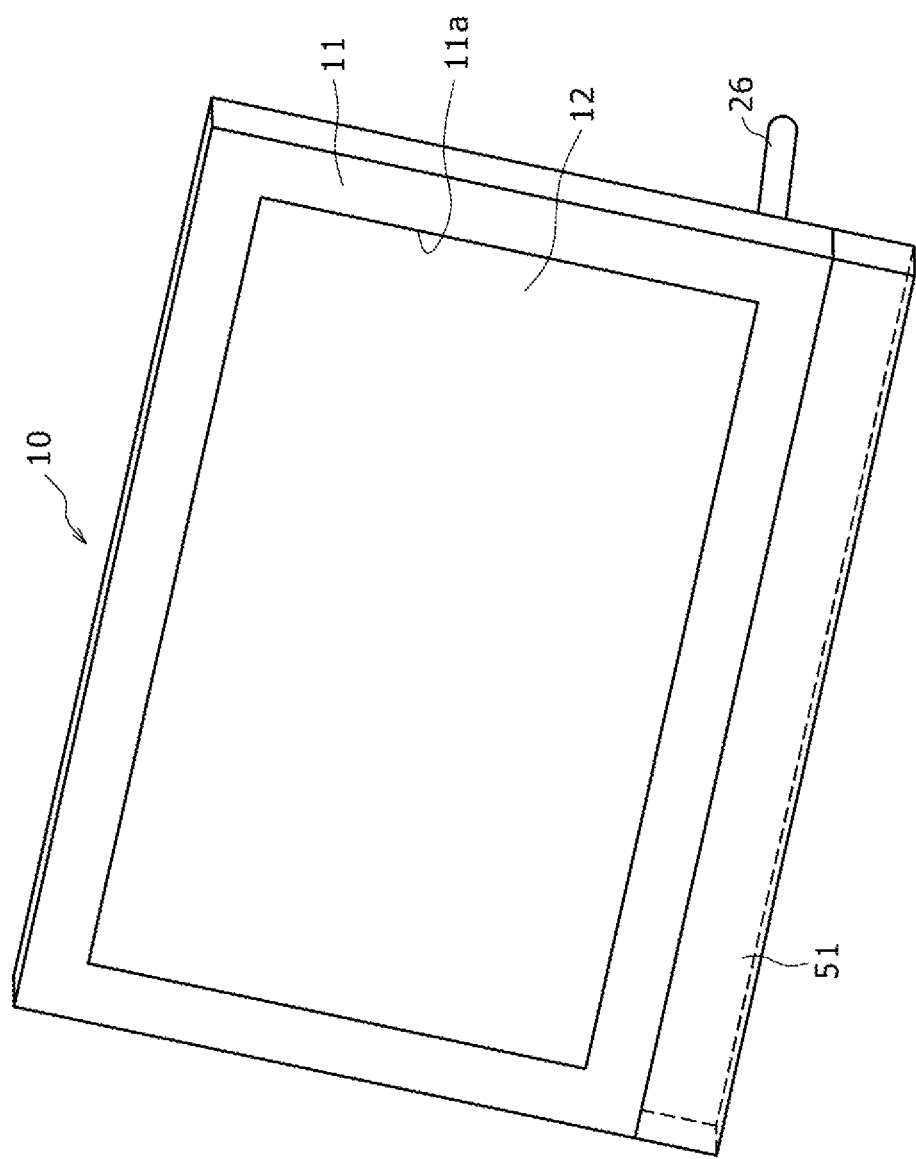
FIG. 1 is a diagram of assistance in explaining an external constitution of an image display device to which one embodiment of the present invention is applied.
Figure 2:
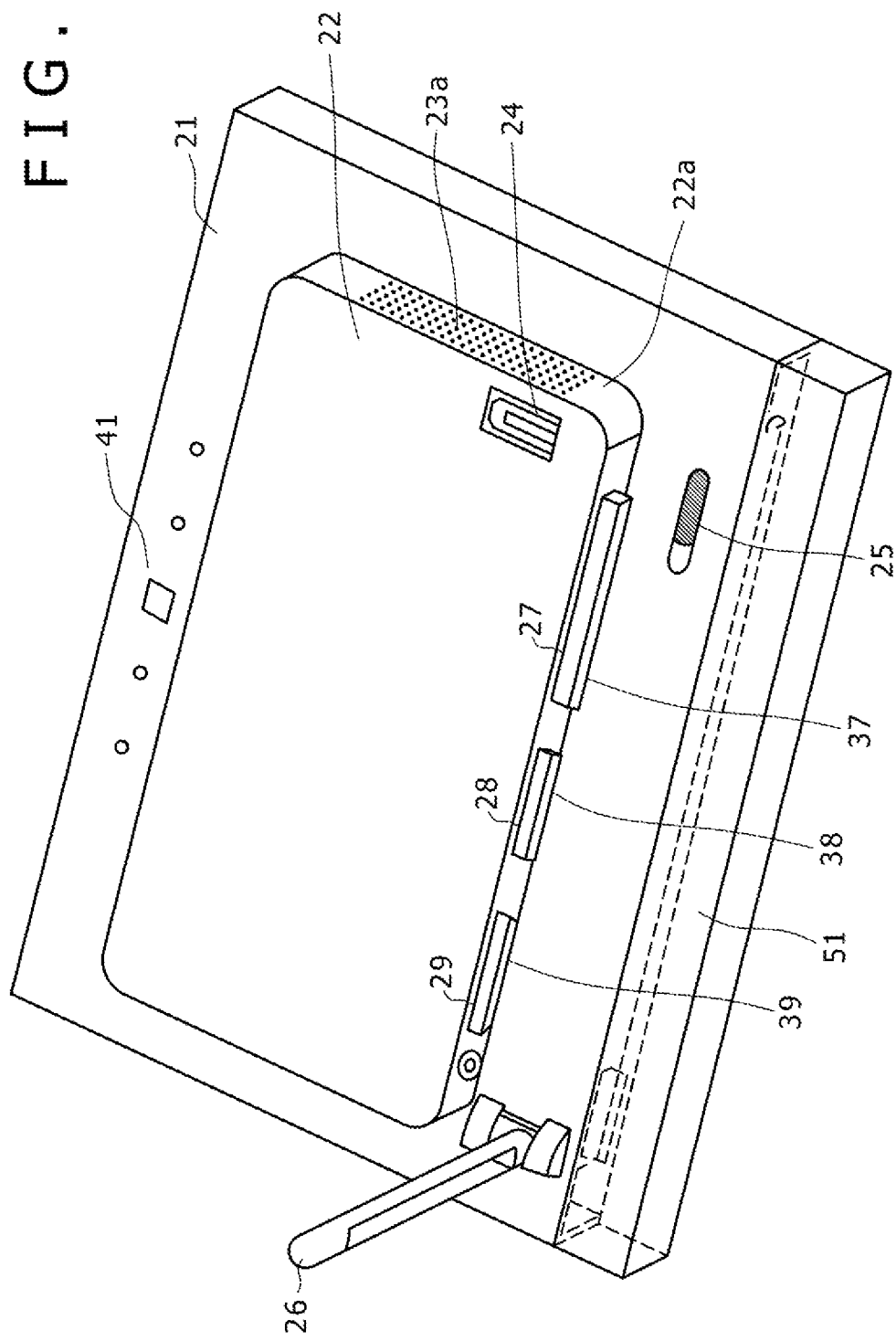
FIG. 2 is a diagram of assistance in explaining an external constitution of the image display device to which one embodiment of the present invention is applied.

FIG. 1 and FIG. 2 are diagrams of assistance in explaining an external constitution of the image display device according to the present embodiment. FIG. 1 is a diagram of the image display device as viewed from an oblique direction on a front side. FIG. 2 is a diagram of the image display device as viewed from an oblique direction on a rear side.

As described above, the image display device 10 in the present example can reproduce and display an image such as a still image, and reproduce and output audio such as music.

Specifically, when viewed from the front side, as shown in FIG. 1, a front panel 12 formed by an optically transparent material such as PMMA (polymethyl methacrylate) is attached to the rear of a bezel 11 covering the front surface of the casing of the display device so as to cover the window 11a of the bezel 11.

An LCD (liquid crystal display) panel 13 including an LCD and a backlight is attached to the rear of the front panel 12. The LCD of the LCD panel 13 is relatively small, the display screen of the LCD having a size of about seven inches, for example.

Further, a stand 51 formed by an optically transparent material such as PMMA is attached to the lower part of a side edge of the casing of the display device. Incidentally, though not shown, a plurality of substrates are attached to the rear of the LCD panel 13 within the casing of the display device.

As shown in FIG. 2, a rear cover 22 is attached to the rear surface 21 of the display device casing of the image display device 10. A large number of minute holes 23a and 23b for emitting sound are formed in each of a side surface 22a of the rear cover 22 on a left side as viewed from the front side of the device and a side surface 22b of the rear cover 22 on a right side as viewed from the front side of the device. A left speaker and a right speaker are attached to upper parts inside the side surfaces 22a and 22b.

A USB (Universal Serial Bus) terminal 24 is disposed at a position near one corner of the rear cover 22. A slide-type wireless LAN (Local Area Network) switch 25 is disposed at a position on a right side as viewed from the rear side of the device below the rear cover 22. In addition, a supporting leg 26 is attached at a position on a left side as viewed from the rear side of the device below the rear cover 22.

The supporting leg 26 can be turned around one end thereof attached to the rear surface 21 so that the image display device 10 can be stood on a desk or the like.

Further, as shown in FIG. 2, slots 27, 28, and 29 are formed in side surfaces on the lower side of the rear cover 22. Three kinds of card-shaped or stick-shaped memories 37, 38, and 39 such as a Memory Stick (registered trademark) are inserted into the slots 27, 28, and 29.

As shown in FIG. 2, a panel operating section 41 composed of operating buttons such as a power button is disposed on the upper part of the rear surface 21.

[Configuration and Functions of Image Display Device 10]

<Connected Configuration>

Figure 3:
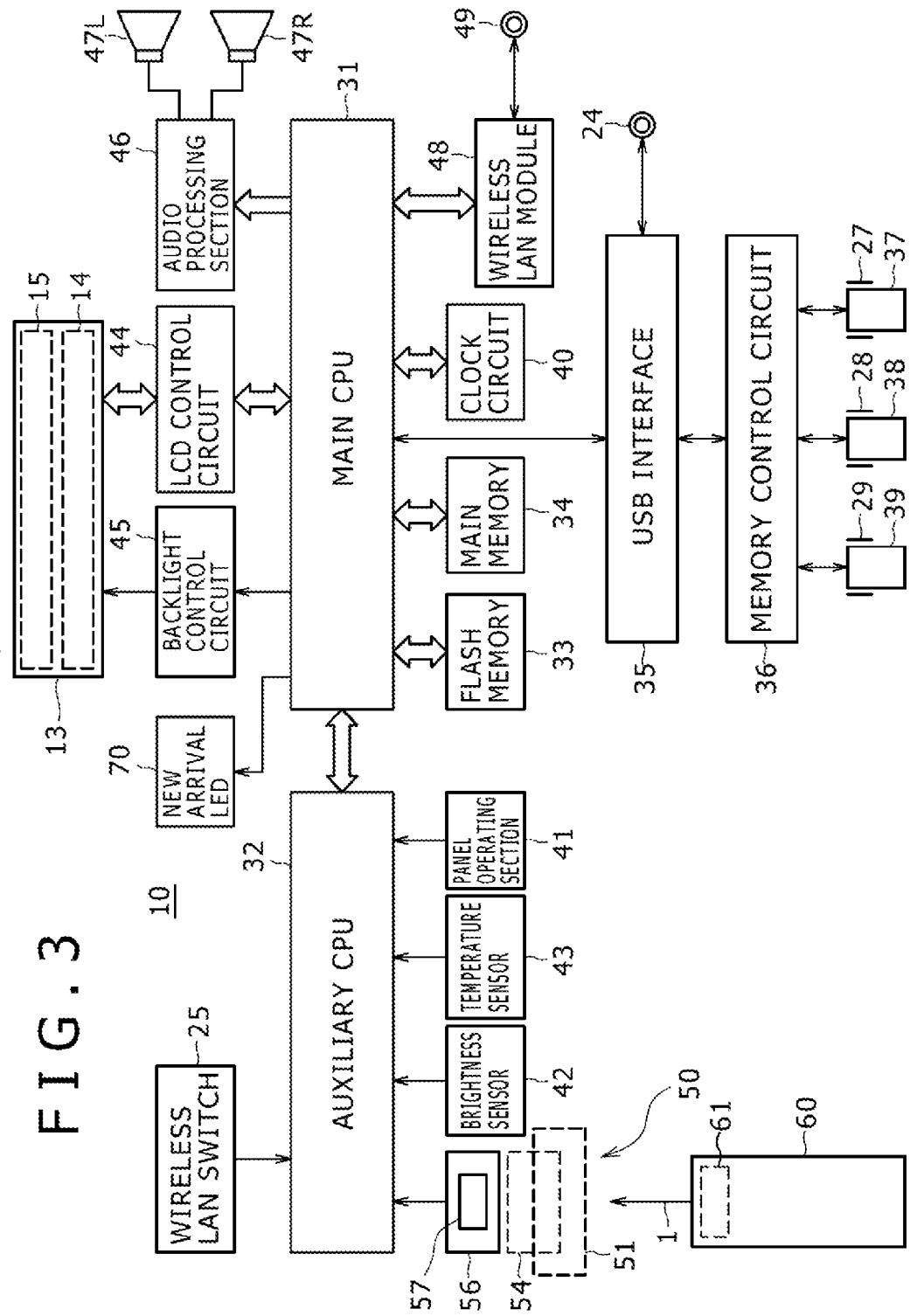
FIG. 3 is a block diagram of assistance in explaining an example of a connected configuration of the image display device to which one embodiment of the present invention is applied.

FIG. 3 shows an example of a connected configuration of the image display device 10. As shown in FIG. 3, the LCD panel 13 includes an LCD 14 and a backlight 15. The image display device 10 has a main CPU (Central Processing Unit) 31 and an auxiliary CPU 32.

The auxiliary CPU 32 is connected with a light receiving section 56, a brightness sensor 42, a temperature sensor 43, and the panel operating section 41 and the wireless LAN switch 25 described above.

The light receiving section 56, a light guiding part 54, and the above-described transparent exterior part (stand) 51 form a light receiving device 50. Signal light 1 emitted from an infrared light emitting section 61 of a remote control 60 enters the light receiving section 56 via the transparent exterior part 51 and the light guiding part 54, and is then detected by a light receiving element 57 within the light receiving section 56.

Though not shown in FIG. 1 or FIG. 2, the brightness sensor 42 is to control the brightness of the LCD 14 according to the brightness of the vicinity of the image display device 10, the brightness of the vicinity of the image display device 10 being detected by the brightness sensor 42. Specifically, the brightness of the LCD 14 is heightened when the vicinity is bright, and the brightness of the LCD 14 is lowered when the vicinity is dark.

Though not shown in FIG. 1 or FIG. 2, the temperature sensor 43 is to display the temperature (atmospheric temperature) of the vicinity of the image display device 10, which temperature is detected by the temperature sensor 43, on the LCD 14.

The main CPU 31 is connected with a flash memory 33 and a main memory 34 formed by a RAM (Random Access Memory). Various necessary programs and data such as still image data or music data are written to the flash memory 33 in advance.

Data such as still image data or music data is expanded in the main memory 34 for reproduction and display of a still image, reproduction and output of music, and the like, and is temporarily stored in the main memory 34. These pieces of still image data, music data and the like are obtained from a server by the image display device 10 connecting to the server as later described, or obtained from the above-described memory 37, 38, or 39.

In addition, the main CPU 31 is connected with an LCD control circuit 44, a backlight control circuit 45, and an audio processing section 46. The above-described left and right speakers 47L and 47R are connected to the output side of the audio processing section 46. The audio processing section 46 includes a D/A converter for converting digital audio data such as music data into an analog audio signal, and an audio amplifier circuit.

The main CPU 31 is also connected with a wireless LAN module 48. The wireless LAN module 48 is connected with a built-in antenna 49.

The main CPU 31 is also connected with the above-described USB terminal 24 and a memory control circuit 36 via a USB interface 35. The memory control circuit 36 is connected with the memories 37, 38, and 39 inserted into the slots 27, 28, and 29.

The main CPU 31 is also connected with a clock circuit 40. The clock circuit 40 has a calendar function, and is able to provide a present date, a present day of the week, and a present time.

The main CPU 31 is further connected with a new arrival LED (Light Emitting Diode) 70. Though not shown in FIG. 1, the new arrival LED 70 is disposed at a position such that when the new arrival LED 70 is turned on to emit light, at least the light can be seen from the front side of the image display device 10. When new still image data displayable by a "share frame" function to be described later occurs, the new arrival LED 70 is lit to notify this.

<Function>

The image display device 10 of the above configuration can obtain content data from a predetermined server device on the Internet, a home server on a LAN, a built-in memory, an external memory connected to the image display device 10, and the like, and reproduce the content data. Incidentally, the obtainable content data includes still image data, moving image data, graphics data, text data, music data and the like.

Description in the following will be made of a case where still image data is obtained from a home server on a LAN and is then reproduced. The wireless LAN switch 25 is turned on by being slid to the right as viewed from the rear side of the device as shown in FIG. 2, whereby the image display device 10 connects to a predetermined home server to obtain content data recorded on the home server and then reproduce the content data.

The home server as a connecting destination in this case is, for example, a main home server such as a PC (Personal Computer) having a high-capacity hard disk storage device or a hard disk recorder, or an auxiliary home server such as a notebook PC.

A connecting destination selecting screen for selecting connectable home servers is displayed on the LCD 14 by an operation on the remote control 60. When a user selects a home server as a connecting destination, the main CPU 31 connects to the home server selected by the user through the wireless LAN module 48.

Thereby, for example, folders recorded on the home server selected by the user are first displayed as a folder selecting screen on the LCD 14. Then, when the user selects a folder from the folders by an operation on the remote control 60, files in the selected folder are displayed as a file selecting screen on the LCD 14.

When the user selects a file through the remote control 60 in this state, a photograph image of the selected file is displayed in an enlarged state on the LCD 14. Further, when the user specifies a slide show display, photograph images of the files in the folder are sequentially displayed in an enlarged state on the LCD 14.

In addition, by connecting the image display device 10 with various external devices via a USB cable, still images and music retained on the recording media of the external devices can be similarly reproduced.

In addition, by inserting the memory 37, 38, or 39 into the slot 27, 28, or 29, or by mounting a memory provided with a USB terminal into the USB terminal 24, still images and music can be similarly reproduced.

Further, the image display device 10 according to the present embodiment can access a predetermined server device on the Internet via a LAN, obtain news, a weather forecast, and various other information, and reproduce the news, the weather forecast, and the various other information.

Thus, the image display device 10 according to the present embodiment can be provided with various data such as still image data, moving image data, music data, text data, and Web pages from data providing sources such as various media, and reproduce the various data.

Incidentally, as a data providing source, first, a built-in memory such as the flash memory 33 is cited. In addition, various external memories connected via the memory control circuit 36 are cited. In addition, a USB memory or an external device connected to the USB terminal 24 is cited. Further, various external devices on a LAN connected via the wireless LAN module 48 and the built-in antenna 49, various server devices on the Internet connected via the LAN, and the like are cited.

In addition, at a time of display of a still image or a moving image, the main CPU 31 obtains a present date and a present day of the week from the clock circuit 40 and displays the present date and the present day of the week, whereby the image display device 10 can be used also as a calendar. In addition, the main CPU 31 obtains a present time from the clock circuit 40 and displays the present time, whereby the image display device 10 can be used also as a clock.

[New Function Based on Concept of "Frame"]

In regard to use of still image data, the image display device 10 according to the present embodiment can not only display an image based on image data of a selected image file and make a slide show display of images based on image data of a selected image folder, as described above.

The image display device 10 according to the present embodiment realizes various new functions on the basis of a new concept of "frame," which associates an access destination such as a folder or a medium with a mode of output of content data obtained from the access destination.

[Mode of Output of Still Images]

Description will be made below of output modes (display modes) in a case where content data in the image display device 10 according to the present embodiment is still image data. FIGS. 4A, 4B, 4C, and 4D are diagrams of assistance in explaining output modes (display modes) when a still image is displayed, which modes are selectable in the image display device 10 according to the present embodiment.

As shown in FIGS. 4A to 4D, the image display device according to the present embodiment can display a still image based on still image data in a fixed manner or display a large number of still images by sequentially changing a still image being displayed in one of the four display modes.

FIG. 4A represents a case where one still image (image A) and a date display dt are displayed on the whole of the display screen 14G of the LCD 14.

In FIG. 4B, two still images are simultaneously displayed within one screen by dividing the display screen 14G of the LCD 14 into two equal parts on a left side and a right side and displaying an image A in one part and an image B in the other part, for example, and a date display dt is made on the lower side of the display screen as in the case of FIG. 4A.

In FIG. 4C, four display areas are formed by dividing the display screen 14G of the LCD 14 into two equal parts in a horizontal direction and also dividing the display screen 14G of the LCD 14 in a vertical direction, images A, B, and C are displayed in three of the four display areas, and a date display dt is made with the remaining one display area as a date display area.

In the case of the display mode shown in FIG. 4C, the ¼ (one-fourth) display area at the lower left of the display screen 14G is a date display area. Incidentally, another ¼ display area can also be set as a date display area. Incidentally, which of the ¼ display areas is set as a date display area is determined in advance at the time of manufacturing. However, a user may be allowed to change the date display area.

In FIG. 4D, four display areas are formed by dividing the display screen 14G of the LCD 14 into two equal parts in a horizontal direction and also dividing the display screen 14G of the LCD 14 in a vertical direction as in the case of FIG. 4C, and images A, B, C, and D are displayed in the four respective display areas. In addition, in the example shown in FIG. 4D, a date display dt is displayed on the lower side of the display screen as in the cases of the display modes shown in FIG. 4A and FIG. 4B.

Incidentally, in FIGS. 4A to 4D, the date display dt is a display of "February 22 (Friday)." The date display dt is displayed on the basis of a present date and a present day of the week provided from the clock circuit 40 connected to the main CPU 31. The calendar function of the image display device 10 according to the present embodiment is realized by the date display dt.

While description has been made supposing that the date display dt is made in FIGS. 4A to 4D, a time display can also be made in place of the date display dt. In addition, as to the time display, one of a 12-hour representation such as "11:20 p.m." and a 24-hour representation such as "13:30," for example, can be used as a digital display.

It is also possible to use a clock character as an analog display, and make a time display by a long hand and a short hand. The time display to be used can be selected and set by a user.

When still images are displayed while changed sequentially, information including the number of display images within one screen as described with reference to FIGS. 4A to 4D and at least a display changing time indicating a cycle in which display is changed is information indicating a display mode.

Thus, the image display device 10 according to the present embodiment has four display patterns as described with reference to FIGS. 4A to 4D, and is able to display still images in various display modes by taking the display changing time and a performance time range also into account in addition to the four display patterns.

[Share Frame]

The image display device 10 according to the present embodiment realizes a function of "share frame" as one of new functions using the new concept of "frame" described above. An outline of the function of the "share frame" is as follows.

Figure 5:
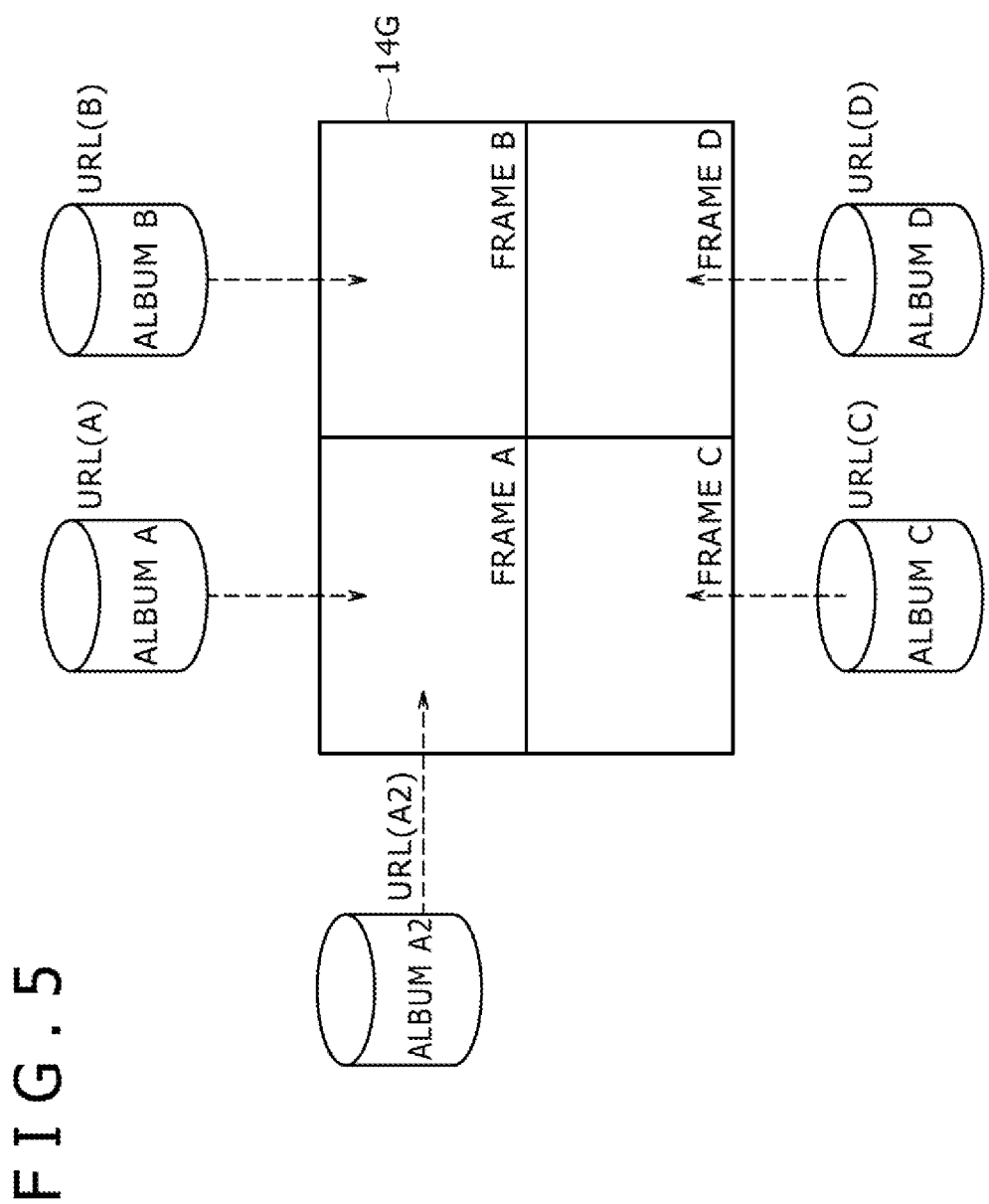
FIG. 5 is a diagram of assistance in explaining a "share frame"

The "share frame" is a function for the purpose of sharing photographs (still images) among people at physically distant locations. FIG. 5 is a diagram of assistance in explaining the "share frame."

In FIG. 5, as shown by album A, album B, album C, and album D, the "share frame" allows access to a maximum of four albums such as albums of photograph sharing services provided on server devices on the Internet. Thus, the word "album" in the present specification refers mainly to albums provided on server devices on a predetermined network such as the Internet.

In the "share frame," as shown in FIG. 5, the display screen 14G of the LCD 14 in the image display device is divided into a plurality of display areas. Then, photographs obtained from basically different access destinations are displayed in respective different display areas on the same screen that has been divided. Incidentally, each display area formed by dividing the display screen 14G will hereinafter be referred to as a "divided display area" or simply as a "frame."

Incidentally, in FIG. 5, as shown by album A and album A2, a plurality of albums (photograph providing sources) can be registered for one divided display area ("frame A" in FIG. 5).

In FIG. 5, URLs (A), (A2), (B), (C), and (D) shown at the side of the respective albums A, A2, B, C, and D are URLs (Uniform Resource Locators) indicating the locations of the respective albums. Though described later in detail, the URLs of the respective albums are registered in correspondence with the respective frames as divided display areas, so that the album of a providing source providing photographs to be displayed can be identified for each frame.

In the "share frame," information including a still image for a profile such as a photograph of the face of the owner of an album, the name of the owner, and the like is displayed in a state of being superimposed on a displayed photograph. Thereby the owner of the photograph can be identified. In addition, the "share frame" can usually make a slide show display of photographs in an album.

Incidentally, the album owner in this case does not mean only a person who actually owns the album. A person who is a main subject in each album, a person who took photographs in the album, or the like may be an album owner.

For example, in a case where a parent makes an agreement on the use of a photograph sharing service to set up an album, and registers photographs of a child in the album, the owner of the album in use may be the child even though the actual owner of the album is the parent.

[Outline of Operation at Time of "Share Frame"]

Description will next be made of an outline of operation of the image display device 10 according to the present embodiment at a time of the "share frame." FIGS. 6 to 10 are diagrams of assistance in explaining an example of display images displayed on the image display device 10 according to the present embodiment in relation to the "share frame."

As will be described later in detail, as shown in FIG. 5, the URL of an album as a photograph providing source is associated with each frame (divided display area) formed by dividing the display screen 14G.

Thus, the main CPU 31 of the image display device 10 according to the present embodiment periodically accesses the target album using the URL to check periodically whether a new photograph has been added to the album.

When detecting that a photograph has been added to the target album, the main CPU 31 turns on the new arrival LED 70 connected to the main CPU 31, as described with reference to FIG. 3. Thereby the user is notified of the presence of the newly added photograph, that is, the presence of the newly arrived photograph.

It is to be noted that while the presence of the newly arrived photograph is notified by turning on the new arrival LED 70 in this case, the present invention is not limited to this. The presence of the newly arrived photograph may be notified by blinking the new arrival LED 70.

When the new arrival LED is lit or blinking, the user checks a "home" in the present embodiment, and selects a frame in which a "NEW" mark is displayed. The "home" in this case corresponds to a so-called main menu on which selection items of functions that can be performed in the image display device 10 are registered. The main CPU 31 forms the display of the home on the basis of information stored in the flash memory 33, and makes the display of the home displayed on the display screen of the LCD 14 via the LCD control circuit 44.

Figure 6:
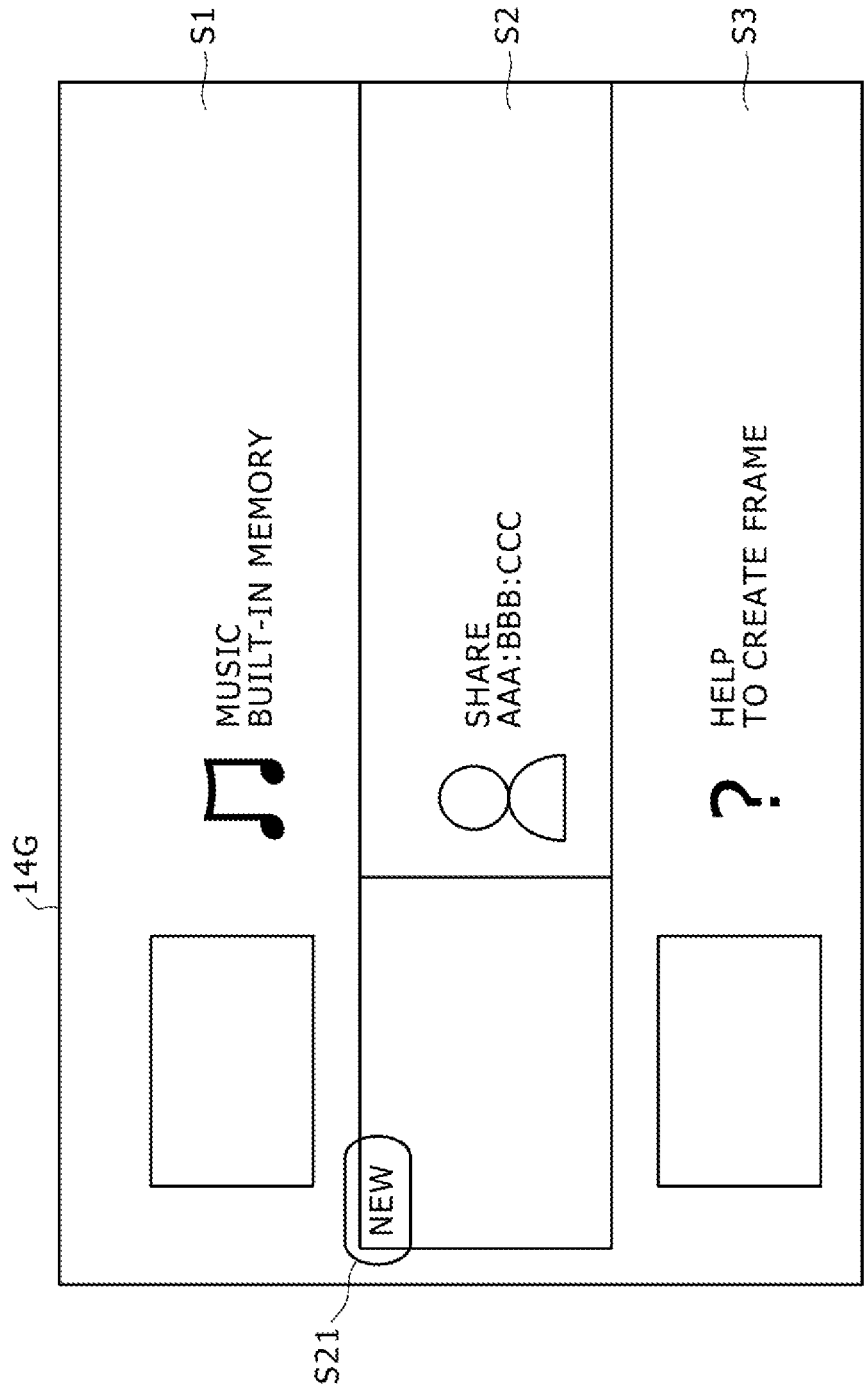
FIG. 6 is a diagram showing an example of a display image of a so-called "home" displayed on the display screen of the image display device.

FIG. 6 is a diagram showing an example of a display image of the so-called "home" displayed on the display screen 14G of the image display device 10 according to the present embodiment. In FIG. 6, three selection items of a music frame S1, a share frame S2, and a help S3 are displayed as selection items of performable functions.

Displayed in each selection item are a still image representing the item, a musical note, a human-shaped mark, a question mark or the like indicating the type of the item or the like, characters such as "music," "share," or "help" indicating the type of the item or the like, characters such as "built-in memory," "AAA:BBB:CCC," or "To create a frame" indicating the access destination of the frame, a title, or the like.

As shown in FIG. 6, at an upper left end part of the share frame S2 as a selection item, a "NEW" mark S21 indicating the presence of a photograph newly added to an album accessible in the share frame is displayed.

By selecting the share frame S2 in which the "NEW" mark S21 is displayed, the share frame having the newly added photograph as a display object is executed to display the newly added photograph and the like.

Incidentally, a large number of frames can be created and registered in the "home." Thus, as for share frames, a large number of share frames with different numbers of divisions of the display screen and different albums of access destinations can be formed and registered in the "home."

Scrolling the display image in the "home" displayed as shown in FIG. 6 can sequentially change the selection items being displayed to find a desired frame and select the frame.

By selecting a selection item for executing a desired "share frame" in the "home," an image is displayed by the "share frame."

Figure 7:
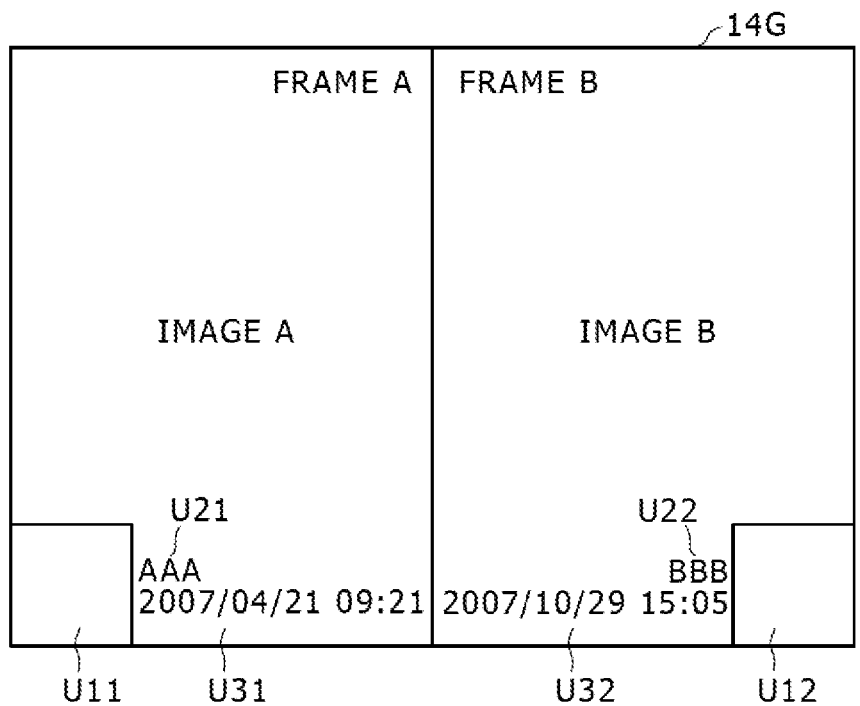
FIG. 7 is a diagram of assistance in explaining a concrete example of image display by the "share frame"

FIGS. 7 to 10 are diagrams of assistance in explaining concrete examples of display of an image by the "share frame." Of the diagrams, FIG. 7 shows a case where the albums of two people are displayed simultaneously. The display screen 14G is divided into two parts on a left side and a right side, and photographs of the different albums can be displayed in frame A and frame B as respective divided display areas.

Displayed at the lower end side of frame A are a still image U11 for a profile of the owner of the album as a providing source of the photograph displayed in frame A, a name display U21 of the owner, and a display U31 of photographing date and time information of the displayed image.

Similarly, displayed at the lower end side of frame B are a still image U12 for a profile of the owner of the album as a providing source of the photograph displayed in frame B, a name display U22 of the owner, and a display U32 of photographing date and time information of the displayed image.

Thereby the owners of the displayed photographs can be clearly identified.

Figure 8:
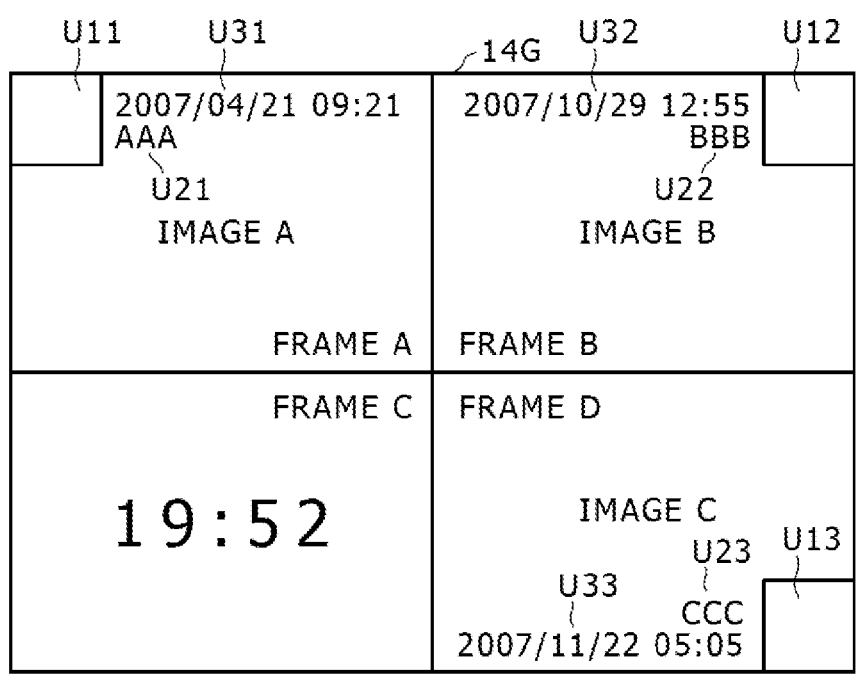
FIG. 8 is a diagram of assistance in explaining a concrete example of image display by the "share frame"

FIG. 8 shows a case where the albums of three people are displayed simultaneously. The whole of the display screen 14G is divided into four parts by dividing the display screen 14G into two parts on a left side and a right side and also dividing the display screen 14G into two parts on an upper side and a lower side. Image A, image B, and image C, which are photographs from different albums, are displayed in frame A, frame B, and frame D, respectively. Further, a present time obtained from the clock circuit 40 is displayed in frame C as the remaining divided display area.

Displayed at the upper end side of frame A are a still image U11 for a profile of the owner of the album as a providing source of the photograph displayed in frame A, a name display U21 of the owner, and a display U31 of photographing date and time information of the displayed image.

Similarly, displayed at the upper end side of frame B are a still image U12 for a profile of the owner of the album as a providing source of the photograph displayed in frame B, a name display U22 of the owner, and a display U32 of photographing date and time information of the displayed image.

Similarly, displayed at the lower end side of frame D are a still image U13 for a profile of the owner of the album as a providing source of the photograph displayed in frame D, a name display U23 of the owner, and a display U33 of photographing date and time information of the displayed image.

FIG. 9 shows a case where the albums of four people are displayed simultaneously. The whole of the display screen 14G is divided into four parts by dividing the display screen 14G into two parts on a left side and a right side and also dividing the display screen 14G into two parts on an upper side and a lower side. Image A, image B, image C, and image D, which are photographs from different albums, are displayed in frame A, frame B, frame C, and frame D, respectively.

Displayed at the upper end side of frame A are a still image U11 for a profile of the owner of the album as a providing source of the photograph displayed in frame A, a name display U21 of the owner, and a display U31 of photographing date and time information of the displayed image.

Similarly, displayed at the upper end side of frame B are a still image U12 for a profile of the owner of the album as a providing source of the photograph displayed in frame B, a name display U22 of the owner, and a display U32 of photographing date and time information of the displayed image.

Similarly, displayed at the lower end side of frame C are a still image U13 for a profile of the owner of the album as a providing source of the photograph displayed in frame C, a name display U23 of the owner, and a display U33 of photographing date and time information of the displayed image.

Similarly, displayed at the lower end side of frame D are a still image U14 for a profile of the owner of the album as a providing source of the photograph displayed in frame D, a name display U24 of the owner, and a display U34 of photographing date and time information of the displayed image.

As with FIG. 8, FIG. 10 shows a case where the albums of three people are displayed simultaneously. In the example shown in FIG. 10, a "NEW" mark (new arrival mark) 14N is displayed in frame A. The "NEW" mark 14N indicates the presence of a photograph added to the album providing the photograph displayed in frame A (providing source of photograph data).

Thus, as shown by the "NEW" mark 14N, a new arrival mark is displayed in the frame (divided display area) displaying a photograph of the album to which the new photograph is added. Thereby the user can easily grasp in which frame the new photograph is present.

Incidentally, in the examples shown in FIGS. 7 to 10, the display screen is divided into a plurality of divided display areas. However, when there is only one album providing photographs, the display screen 14G is set as one frame (divided display area) as shown in FIG. 4A, and a photograph from the target album is displayed in the frame.

[One Example of Share Frame Information]

Description will next be made of information necessary to realize the "share frame," which forms frames as divided display areas by dividing the display screen 14G and displays photographs from different albums in each frame, as described with reference to FIGS. 5 to 10.

In order to realize the "share frame," share frame information (associating information) for enabling images to be displayed by the function of the "share frame" is registered in the flash memory 33 by performing an operation of creating the "share frame" in advance.

As will be described below in detail, basically, the share frame information indicates how the display screen is divided, and associates each divided display area (each frame) formed by dividing the display screen with an album as a providing source of a photograph to be displayed. Description in the following will be made of an example of the share frame information.

FIG. 11 is a diagram of assistance in explaining an example of the share frame information used in the image display device 10 according to the present embodiment. As shown in FIG. 11, the share frame information has a file ID for identifying the share frame information itself managed as a file, and the title of the share frame.

As shown in FIG. 11, the share frame information also has the "number of display photographs within one screen," which indicates the number of parts into which the display screen 14G is divided, a "display changing time" indicating timing of changing a display image when a slide show display is made, and other information.

The other information includes, for example, information indicating whether to display a present date and a present day of the week or to display a present time. In addition, when the present time is to be displayed, there is information indicating whether to make a digital display or an analog display. In addition, in the case of the digital display, there is, for example, information indicating whether to make a so-called 12-hour display such as 1 a.m. or 1 p.m. or to make a so-called 24-hour display such as 1 or 13.

In the image display device 10 according to the present embodiment, when the "number of display photographs within one screen" is "2," the display screen 14G is divided into two parts on a left side and a right side as shown in FIG. 7, and the two frames (frame A and frame B) are set as divided display areas in which photographs are displayed.

When the "number of display photographs within one screen" is "3," the display screen 14G is divided into two parts on a left side and a right side and is also divided into two parts on an upper side and a lower side as shown in FIG. 8, and three frames (frame A, frame B, and frame D) are set as divided display areas in which photographs are displayed.

When the "number of display photographs within one screen" is "4," the display screen 14G is divided into two parts on a left side and a right side and is also divided into two parts on an upper side and a lower side as shown in FIG. 9, and the four frames (frame A, frame B, frame C, and frame D) are set as divided display areas in which photographs are displayed.

A user name, a profile photograph (described as a still image for a profile in FIG. 11), and an album URL are set for each frame as a divided display area formed by dividing the display screen.

Specifically, as shown in FIG. 11, a user name, a profile photograph, and an album URL are associated with a frame ID. The user name in this case is the name of the owner of the album, and may be a nickname, an alias or the like.

The profile photograph is the file name of a photograph of the face of the owner of the album or the file name of an image such as a photograph representing the owner of the album. As described above, the album URL indicates the location of the album providing photographs (providing source of the photographs) which album is set for each frame formed by dividing the display screen 14G.

Incidentally, a plurality of album URLs can be associated with each frame. For example, in the example shown in FIG. 11, two URLs, that is, a URL(A) and a URL(A2) are associated with frame A. Three URLs, that is, a URL(B), a URL (B2), and a URL(B3) are associated with frame B.

These pieces of information make it possible to check the photograph data (still image data) of target albums and check whether there is a new photograph on the basis of URLs associated with each frame formed by dividing the display screen.

When a check is made for newly added photograph data, and there is new photograph data, an update date and time (latest) is updated with a date and time of registration of the photograph in the relevant album. In addition, when the new photograph data is detected, a new arrival flag is turned on (value "1").

Thereby, it is possible to grasp, by the share frame information, whether there is newly added photograph data and when the photograph data was added in a case where the newly added photograph data is present, for each frame formed by dividing the display screen.

When the function of the share frame is to be used, such share frame information is registered in the flash memory 33 of the image display device 10 in advance. Thereby photographs can be displayed in the modes shown in FIGS. 7 to 10 by merely forming the selection item of the "share frame" in the "home" and selecting the selection item of the "share frame" as described with reference to FIG. 6.

[Process of Registering Share Frame Information]

Figure 12:
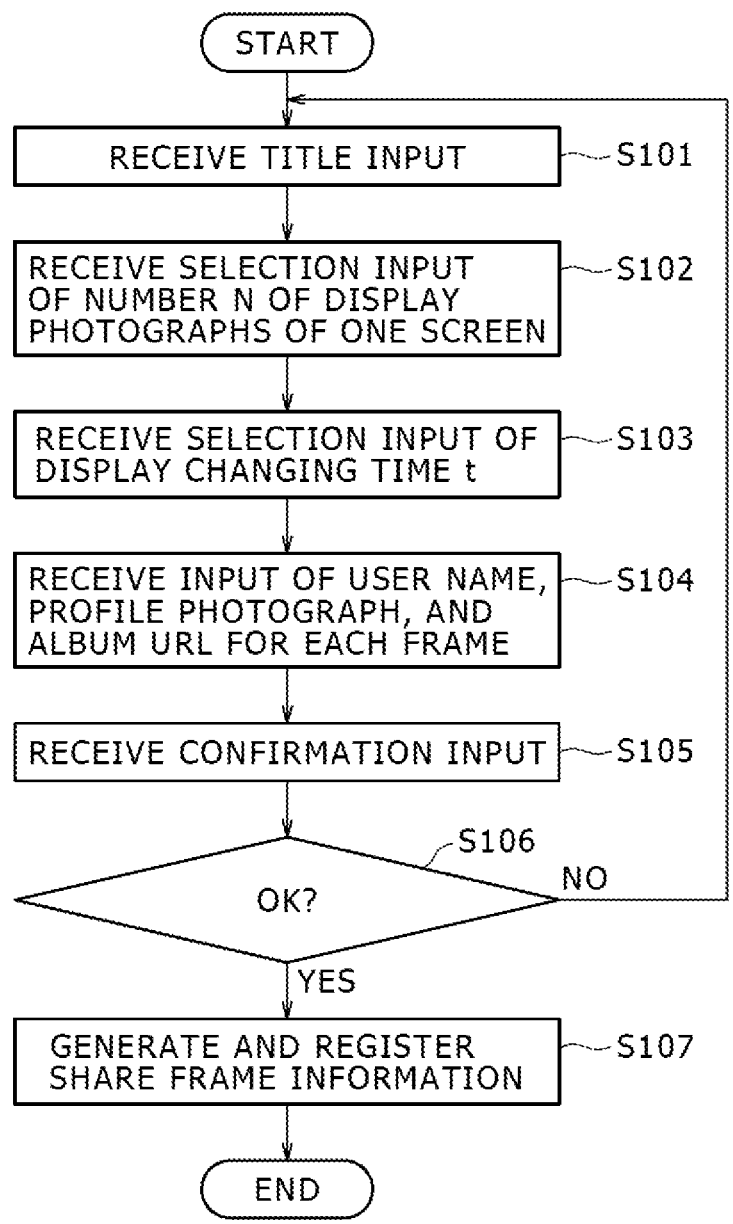
FIG. 12 is a flowchart of assistance in explaining an example of a process of registering the share frame information.

Description will next be made of a process of registering the share frame information formed as described with reference to FIG. 11 showing an example of the share frame information. FIG. 12 is a flowchart of assistance in explaining an example of the process of registering the share frame information. The process of FIG. 12 is performed mainly in the main CPU 31 and the auxiliary CPU 32 in the image display device 10 according to the present embodiment when an operation to create a "share frame" is performed via the panel operating section 41 or the like.

In this example, the main CPU 31 first receives an input of the title of the "share frame" via the auxiliary CPU 32 and the panel operating section 41 or the remote control 60 (step S101). In this case, a simple character input, for example, can be performed.

The main CPU 31 next receives a selection input of the number N of display photographs of one screen (number of display images to be displayed on one screen) via the auxiliary CPU 32 and the panel operating section 41 or the like (step S102). The process of step S102 receives a selection input of a desired number, which is the number of still images to be displayed within one screen, and is one (FIG. 4A), two (FIG. 4B), three (FIG. 4C), or four (FIG. 4D) as described with reference to FIGS. 4A to 4D.

The main CPU 31 then receives a selection input of a display changing time t via the auxiliary CPU 32 and the panel operating section 41 or the like (step S103). The display changing time t indicates the display time of an image displayed on the display screen 14G of the LCD 14. Specifically, the display changing time t can be selected from "15 seconds," "1 minute," "10 minutes," "30 minutes," "1 hour," "4 hours," "do not change" and the like.

The main CPU 31 then receives an input of a user name, the file name of a profile photograph, and an album URL for each frame formed by dividing the display screen via the auxiliary CPU 32 and the panel operating section 41 or the like (step S104). In the process of step S104, as shown in FIG. 11, one user name and one file name of a profile photograph can be input for each frame, and one or more album URLs can be input for each frame.

The main CPU 31 thereafter receives a confirmation input via the auxiliary CPU 32 and the panel operating section 41 or the like (step S105). The main CPU 31 then determines whether the confirmation input received in step S105 indicates that the selection inputs of the various information are correct (whether "OK" is selected) (step S106).

When the main CPU 31 determines in the determination process of step S106 that "Back," "No" or the like is selected as the confirmation input received in step S105 and that the confirmation input received in step S105 does not indicate that the selection inputs of the various information are correct, the main CPU 31 repeats the process from step S101. This allows selection inputs of various information to be performed again.

When the main CPU 31 determines in the determination process of step S106 that the confirmation input received in step S105 indicates that the selection inputs of the various information are correct, the main CPU 31 performs a process of generating and registering new share frame information (a process of registering a new "share frame") (step S107). Then the process of registering the share frame information which process is shown in FIG. 12 is ended.

Incidentally, in the process of step S107, share frame information in the mode shown in FIG. 11 is formed by associating the various information received in steps S101 to S104. Then, the formed share frame information is registered in a predetermined memory, and the "share frame" is registered so as to be selectable in the "home" corresponding to a so-called menu. Description will be made supposing that a destination where the share frame information is registered in the image display device 10 according to the present embodiment is the flash memory 33.

Thus, the share frame information in the mode shown in FIG. 11 is formed and retained in the flash memory 33 connected to the main CPU 31.

[Process of Checking for Newly Arrived Data]

Description will next be made of a process of checking for newly arrived data which process is performed on the basis of the share frame information formed in the flash memory 33 of the image display device 10 according to the present embodiment as shown in FIG. 11.

The process of checking for newly arrived data to be described below checks for each frame (divided display area) formed by dividing the display screen 14G whether there is data newly added to an album as a providing source providing photograph data displayed in the frame. Thus, a photograph list of each of albums associated with each frame is obtained, and whether there is newly arrived data is determined on the basis of the photograph list.

Figures 13, 14:
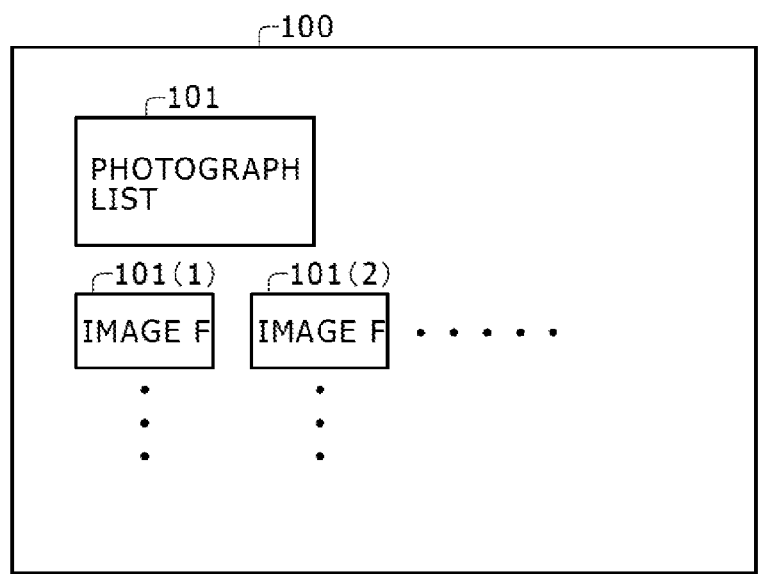

FIG. 13 is a diagram of assistance in explaining an example of recording information of a photograph album provided on a server device on the Internet or the like. An album in this example provided on a server device on the Internet is composed of a photograph list and photograph data (photograph data files).

Specifically, as shown in FIG. 13, a large number of pieces of photograph data (photograph data files) from a user are stored in the album formed on the server device on the Internet, and a list of the stored photograph data is formed as a photograph list in the album.

FIG. 14 is a diagram of assistance in explaining an example of the photograph list as management information of the photograph album provided on the server device on the Internet. As shown in FIG. 14, the photograph list has a file name, a photographing date and time, an image size, and an addition date and time.

The file name can uniquely identify photograph data registered in the album. The photographing date and time indicates a photographing date and time of the photograph data. The image size indicates the size of the photograph, and is represented by the numbers of dots in a vertical direction and a horizontal direction, for example. The addition date and time is information indicating a date and time when the photograph data was added to the album.

This photograph list makes it possible to learn when each of the pieces of photograph data registered in the album formed on the server device on the Internet was taken, how large the size of the photograph data is, and when the photograph data was added to the album.

The image display device 10 according to the present embodiment checks, in each predetermined timing, for newly arrived photograph data in the albums associated with each frame as described with reference to FIG. 11.

Figure 15:
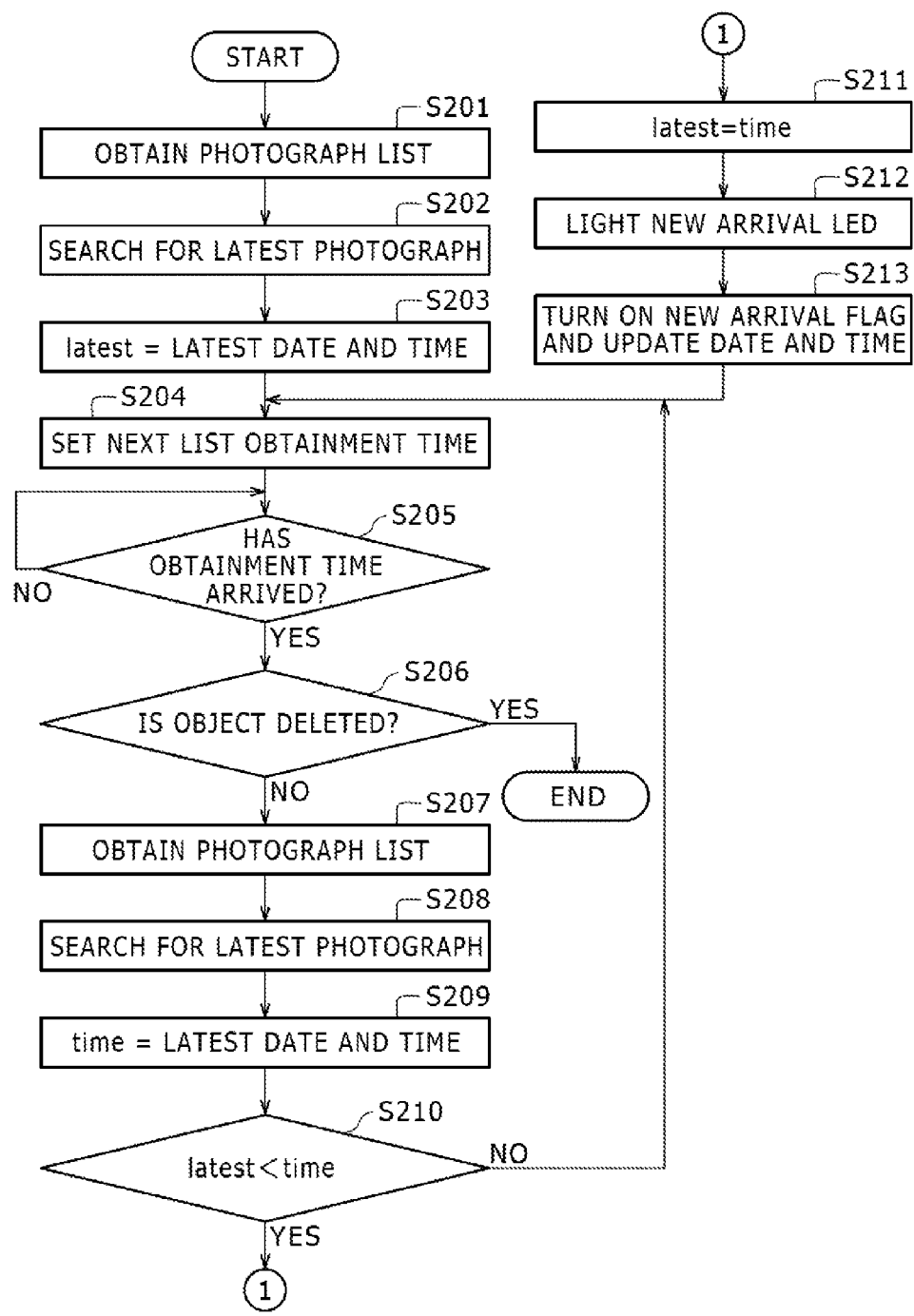
FIG. 15 is a flowchart of assistance in explaining a process of checking for newly arrived data which process is performed in the image display device.

FIG. 15 is a diagram of assistance in explaining the process of checking for newly arrived data which process is performed in the image display device 10 according to the present embodiment. The process represented in FIG. 15 is performed on the basis of share frame information after registration of the share frame information as described with reference to FIG. 11, and is ended when the share frame information itself is deleted or the specification of albums corresponding to a frame is deleted.

Thus, the process represented in FIG. 15 can check for newly arrived data in appropriate timing even when the function of the share frame is not performed.

After the share frame information is registered in the flash memory 33, the main CPU 31 performs the process represented in FIG. 15 for each frame (divided display area) registered as described with reference to FIG. 11.

The main CPU 31 first accesses an album provided on a server device on the Internet which album provides photograph data to the frame on the basis of the share frame information registered in the flash memory 33, and obtains the photograph list of the album (step S201). The photograph list obtained in this step has the constitution described with reference to FIG. 14.

The main CPU 31 refers to addition dates and times of the obtained photograph list to search for a latest photograph (photograph data) (step S202). In step S202, the photograph data of the youngest (latest) addition date and time is identified.

The main CPU 31 next sets the addition date and time (latest date and time) of the latest photograph data identified in step S202 to a variable "latest" (step S203). The main CPU 31 then sets a next list obtainment time (step S204).

The next list obtainment time set in step S204 is determined in advance. For example, the next list obtainment time can be set in one-hour units such as at intervals of one hour, at intervals of two hours, or at intervals of three hours, or a predetermined time such as 0 a.m. every day can be set.

Suppose that the image display device 10 according to the present embodiment is set in advance to obtain the photograph list four times a day at intervals of six hours, for example. In this case, the main CPU 31 sets a time after six hours in step S204.

Then, the main CPU 31 monitors the present time of the clock circuit 40 connected to the main CPU 31, and determines whether the obtainment time has arrived (step S205). When the main CPU 31 determines in the determination process of step S205 that the next obtainment time has not arrived, the main CPU 31 repeats the process from step S205, and is thus set in a waiting state until the next obtainment time arrives.

When the main CPU 31 determines in the determination process of step S205 that the next obtainment time has arrived, the main CPU 31 refers to the share frame information referred to in step S201 to check whether an object is deleted (step S206).

The process of step S206 determines whether the object is deleted mainly from the following viewpoints. First, it is determined that the object is deleted when album URLs to be registered for the corresponding frame of the share frame information being referred to are deleted. It is determined that the object is deleted also when the target share frame information itself is deleted. It is determined that the object is deleted also when the album that should be present on the server device on the Internet cannot be accessed.

When determining in the determination process of step S206 that the object is deleted, the main CPU 31 ends the process represented in FIG. 15.

When determining in the determination process of step S206 that the object is not deleted, the main CPU 31 performs a similar process to the process of step S201 described above. Specifically, the main CPU 31 accesses the album provided on the server device on the Internet which album provides photograph data to the frame on the basis of the share frame information registered in the flash memory 33, and obtains the photograph list of the album (step S207).

The main CPU 31 next performs a similar process to the process of step S202 described above. Specifically, the main CPU 31 refers to addition dates and times of the obtained photograph list to search for a latest photograph (photograph data) (step S208).

The main CPU 31 next sets the addition date and time (latest date and time) of the latest photograph data identified in step S208 to a variable "time" (step S209). The main CPU 31 then determines whether the variable "time" set in step S209 is larger than the variable "latest" set in step S203 (step S210).

The determination process of step S210 determines whether the value of the variable "time" is newer than the value of the variable "latest." That is, the determination process of step S210 determines whether new photograph data has been added to the album providing photograph data to the frame.

When it is determined in the determination process of step S210 that the variable "time" is not larger than the variable "latest," it can be determined that new photograph data has not been added. In this case, the main CPU 31 repeats the process from step S204.

When it is determined in the determination process of step S210 that the variable "time" is larger than the variable "latest," it can be determined that new photograph data has been added. In this case, the main CPU 31 sets the value of the variable "time" as the variable "latest" (step S211).

The main CPU 31 then controls the new arrival LED 70 to light the new arrival LED (step S212). Next, the main CPU 31 turns on ("1") the new arrival flag of the corresponding frame of the share frame information being referred to, and sets the value of the variable "latest" as an update date and time (step S213). The main CPU 31 thereafter repeats the process from step S204.

Thus, in the process represented in FIG. 15, the process of steps S204 to S213 is repeatedly performed in each predetermined timing until the object is no longer present. It is thereby possible to detect surely whether photographs to be displayed by the function of the share frame include a new displayable photograph, and notify this to the user.

[Process of Displaying Photographs by Share Frame]

Figure 16:
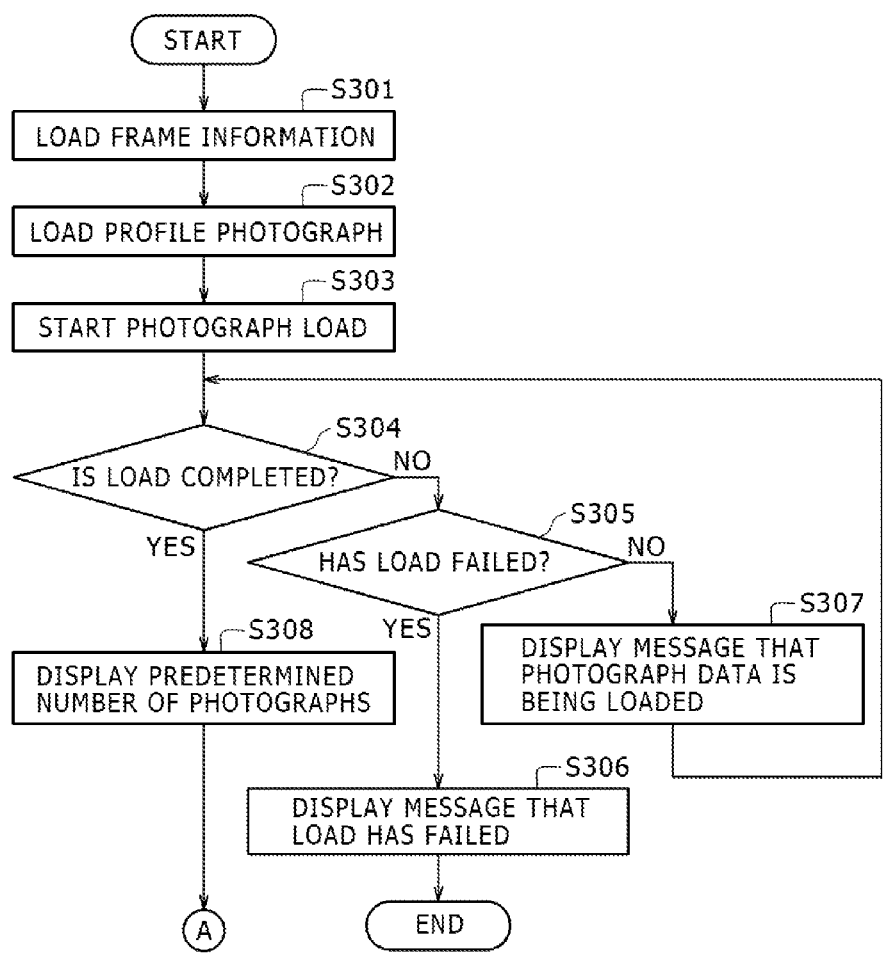
FIG. 16 is a flowchart of assistance in explaining a process of displaying photographs by the share frame.
Figure 17:
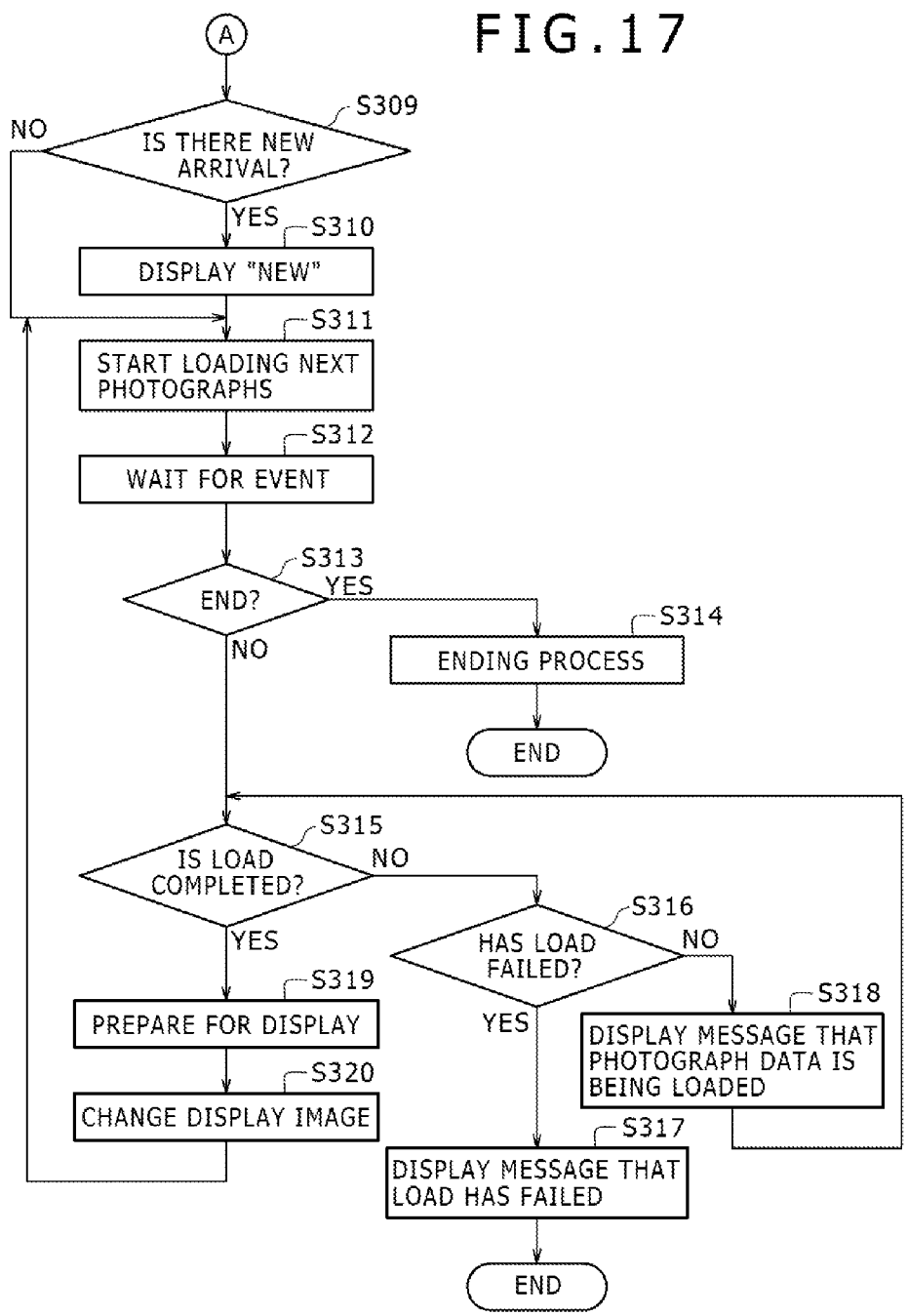
FIG. 17 is a flowchart continued from FIG. 16.

Description will next be made of a process when photographs are displayed by the function of the share frame. FIG. 16 and FIG. 17 are flowcharts of assistance in explaining a process of displaying photographs by the share frame.

The process represented in FIG. 16 and FIG. 17 is performed mainly by the main CPU 31 and the auxiliary CPU 32 by selecting the selection item of the desired share frame displayed in the "home" (corresponding to a selection menu) as described with reference to FIG. 6.

The main CPU 31 first loads the share frame information of the share frame specified by the user to be executed from the flash memory 33 into the main memory 34 (step S301). This share frame information is formed as shown in FIG. 11 by the process described with reference to FIG. 12, and has update dates and times and new arrival flags updated in each predetermined timing by the process represented in FIG. 15.

The main CPU 31 then loads the image data of profile photographs for each frame (divided display area) from corresponding files into the main memory 34 on the basis of information on the profile photographs of the loaded share frame information so as to be able to display the image data of the profile photographs for each frame (step S302). In step S302, the main CPU 31 also loads user names for each frame into the main memory 34 on the basis of information on the user names of the share frame information so as to be able to display the user names for each frame.

The main CPU 31 next starts a process of loading photograph data of photographs to be displayed in each frame into the main memory 34 on the basis of album URLs of each frame of the loaded share frame information (step S303).

The main CPU 31 then determines whether the loading of the photograph data of the photographs to be displayed in each frame is completed (step S304). When it is determined in the determination process of step S304 that the load is not completed yet, the main CPU 31 determines whether the load has failed (step S305).

The determination process of step S305 determines whether the photograph data is obtained normally without response from an album as an access destination being absent or without the photograph data being untransmitted, for example.

When determining in the determination process of step S305 that the loading of the photograph data has failed, the main CPU 31 displays a message notifying the user that the photograph data cannot be loaded (step S306), and then ends the process represented in FIG. 16 and FIG. 17. Specifically, in step S306, the main CPU 31 forms a message notifying the user that the photograph data cannot be loaded, and displays the message on the display screen 14G of the LCD 14 by controlling the LCD control circuit 44 and the like. The main CPU 31 thereafter ends the process represented in FIG. 16 and FIG. 17.

When determining in the determination process of step S305 that the loading of the photograph data has not failed, the main CPU 31 displays a message notifying the user that the photograph data is being loaded (step S307), and then repeats the process from step S304. That is, in step S307, the main CPU 31 forms a message notifying the user that the photograph data is being loaded, and displays the message on the display screen 14G of the LCD 14 by controlling the LCD control circuit 44 and the like. The main CPU 31 thereafter repeats the process from step S304.

When determining in the determination process of step S304 that the load is completed, the main CPU 31 performs a process of displaying the photographs based on the loaded photograph data in each frame formed by dividing the display screen according to the share frame information (step S308).

The process of step S308 divides the display screen 14G into a specified number of frames (divided display areas) on the basis of the share frame information, and forms, in the main memory 34, a display image for displaying the photographs according to the photograph data loaded into the main memory 34 in the respective frames. The main CPU 31 then supplies the formed display image to the LCD 14 through the LCD control section 44 to display the display image on the display screen 14G of the LCD 14. The photographing dates and times of the photographs displayed in each frame are also displayed.

The main CPU 31 thereafter proceeds to the process of FIG. 17, and determines whether there is newly arrived data for each frame by referring to the new arrival flags of the share frame information loaded into the main memory 34 in step S301 (step S309).

When determining in the determination process of step S309 that there is newly arrived data, the main CPU 31 displays a new arrival mark "NEW" indicating that there is newly arrived data within a corresponding frame (divided display area) as described with reference to FIG. 10 (step S310).

When determining in the determination process of step S309 that there is no newly arrived data, and after the process of displaying the new arrival mark in step S310, the main CPU 31 performs a process of loading the photograph data of photographs to be displayed next (step S311).

As with the process of step S303, the process of step S311 is a process for starting a process of loading the photograph data of photographs to be displayed in each frame into the main memory 34 on the basis of album URLs of each frame of the share frame information loaded in step S301.

The main CPU 31 then waits for an event (step S312). The process of step S312 in a case where there is newly arrived data is different from the process of step S312 in a case where there is no newly arrived data. Specifically, when there is newly arrived data and the new arrival mark "NEW" is displayed, the occurrence of an operation input from the user via the panel operating section 41 or the remote control 60 is the occurrence of an event.

When there is no newly arrived data, the passage of the display changing time set in the share frame information or the occurrence of an operation input from the user via the panel operating section 41 or the remote control 60 is the occurrence of an event. Incidentally, the passage of the display changing time is regarded as the occurrence of an event when a time from a start of display of the photographs being displayed now exceeds the set display changing time.

Incidentally, when there is newly arrived data, only an operation input from the user is the occurrence of an event in order to allow the user to surely view a photograph based on the newly arrived data.

The main CPU 31 thereafter determines whether an event indicating that the process of displaying photographs by the share frame is to be ended, such as an ending operation by the user or having displayed all photographs to be displayed, has occurred (step S313).

When determining in the determination process of step S313 that an event indicating that the process of displaying photographs by the share frame is to be ended has occurred, the main CPU 31 performs an ending process (step S314).

The ending process of step S314 includes a plurality of processes. For example, when there was newly arrived data and all of the newly arrived data has been displayed, the ending process of step S314 includes a process of turning off ("0") corresponding new arrival flags of the share frame information. Whether all of the newly arrived data has been displayed can be determined on the basis of whether all of photograph data of associated albums has been used.

The ending process also includes a process of turning off the new arrival LED when reference to all of the other share frame information shows that all new arrival flags are off ("0"). The ending process also includes a process of erasing the various data loaded into the main memory 34 to secure free space.

When the ending process thus including various processes performed in step S314 is ended, the process represented in FIG. 16 and FIG. 17 is also ended.

When determining in the determination process of step S313 that no event indicating that the process of displaying photographs by the share frame is to be ended has occurred, the main CPU 31 determines whether the loading of the photograph data of the photographs to be displayed in each frame is completed (step S315).

When it is determined in the determination process of step S315 that the load is not completed yet, the main CPU 31 determines whether the load has failed (step S316). The determination process of step S316 is a similar process to the process of step S305.

When determining in the determination process of step S316 that the loading of the photograph data has failed, the main CPU 31 displays a message notifying the user that the photograph data cannot be loaded (step S317), and then ends the process represented in FIG. 16 and FIG. 17. The process of step S317 is a similar process to step S306 described above.

When determining in the determination process of step S316 that the loading of the photograph data has not failed, the main CPU 31 displays a message notifying the user that the photograph data is being loaded (step S318), and then repeats the process from step S315. The process of step S318 is a similar process to step S307 described above.

When determining in the determination process of step S315 that the load is completed, the main CPU 31 performs a preparation process for displaying the photographs based on the loaded photograph data in each frame formed by dividing the display screen according to the share frame information (step S319).

The main CPU 31 thereafter makes a change so as to erase the image being displayed by gradually darkening the image and so as to display a new image prepared in step S319 in place of the erased image (step S320). The main CPU 31 thereafter repeats the process from step S311.

It is thereby possible to form a plurality of frames by dividing the display screen of the LCD 14 into a plurality of divided display areas, and display photographs of different owners in the respective frames. Thereby photographs of different owners can be displayed and used on the same screen.

Incidentally, description has been made above supposing that the display screen is divided into a plurality of areas, and that photographs of different albums are displayed in the respective divided display areas. However, the present invention is not limited to this. When photographs of different owners to be displayed simultaneously are not present, the whole of the display screen is regarded as one frame (divided display area), and a photograph from a target album can be displayed in the frame (divided display area). That is, the present invention is applicable in cases where the display screen is divided into one or more frames (divided display areas).

In addition, in the above-described embodiment, when the process of displaying photographs by the share frame is performed and a new arrival mark "NEW" is displayed, the occurrence of an operation input from the user is a display changing event. This is to allow the user to surely view a newly arrived photograph. However, it may be difficult to distinguish the newly arrived photograph.

Accordingly, when there is a newly arrived photograph, the newly arrived photograph is displayed preferentially at a time of changing to a share frame display, and the newly arrived photograph remains displayed until there is an operation input from the user to advance to a next photograph display. In this case, the display image is not changed automatically even when an automatic advance setting is made.

Usually, an album includes many photographs, and it is difficult to distinguish a newly arrived photograph. However, when display starts with a newly arrived photograph at a time of displaying a share frame after the user notices a new arrival mark, and the display is changed according to a user operation, as described above, the user can surely view the newly arrived photograph.

That is, even when a newly arrived photograph is displayed at a time of arrival of the new photograph in a state of the share frame being displayed, the newly arrived photograph cannot be distinguished if an automatic photograph advance is made in a state in which it is not certain whether the user is viewing the newly arrived photograph.

Accordingly, the newly arrived photograph is first displayed preferentially, and the automatic photograph advance is stopped until the user performs a photograph advancing operation to display a next photograph (actually an operation of pressing a right arrow button of the remote control 60, for example). Thereby, the newly arrived photograph can be clearly shown to the user, and the user can surely view the newly arrived photograph.

Incidentally, in the share frame, it is possible to select and set one of two display modes shown in the following. That is, it is possible to select and set a mode suited to a use of the user from:

(1) a mode in which photographs are displayed from a start of an album even when there is a newly arrived photograph and the photographs being displayed are changed only when there is an operation input from the user; and (2) a mode in which when there is a newly arrived photograph, the newly arrived photograph is displayed preferentially and photograph display is changed according to an operation input from the user.

Further, (1) a mode in which photographs are displayed from a start of an album even when there is a newly arrived photograph and photograph display is changed automatically may be added as a third mode.

Incidentally, in the above-described embodiment, the functions of the storing means are realized by the flash memory 33. The functions of the obtaining means are realized mainly by the main CPU 31 and the wireless LAN module 48. The functions of the forming means are realized by the main CPU 31. The functions of the display processing means are realized by the main CPU 31, the LCD control circuit 44, and the LCD 14.

The receiving means is realized by the auxiliary CPU 32, the panel operating section 41, the remote control 60 and the light receiving section 56, and the like. The functions of the measuring means are realized by the clock circuit 40. The functions of the display controlling means are realized by the main CPU 31.

The functions of the detecting means are realized mainly by the main CPU. The functions of the notifying means are realized mainly by the new arrival LED 70. The functions of the updating means are realized by the main CPU 31. The functions of the new arrival notifying means and the functions of the notifying means are realized by the main CPU 31, the LCD control circuit 44, the LCD 14 and the like.

[Tag Frame]

The image display device 10 according to the present embodiment also realizes a function of a "tag frame" as one of new functions using the new concept of "frame" described above. While the "share frame" described above and the "tag frame" are different from each other in method of identifying photograph data to be displayed, the display modes of the "share frame" and the "tag frame" are similar to each other. Accordingly, description will also be made of the function of the "tag frame" similar in the display mode to the "share frame" described above. An outline of the function of the "tag frame" is as follows.

The "tag frame" is a function for the purpose of automatically extracting related photograph data using keyword information as one of pieces of metadata added to the photograph data, and displaying the photograph data.

FIGS. 18A, 18B, 18C, and 18D are diagrams of assistance in explaining the "tag frame." In FIGS. 18A to 18D, description will be made by taking as an example a case where one photograph is displayed on one screen in order to simplify the description. However, the present invention is not limited to this. As in the case of the share frame, one screen can be divided into a plurality of display areas, and different photographs can be displayed in the respective display areas.

Each of references FL1, FL2, FL3, and FL4 in FIGS. 18A to 18D denotes photograph data (photograph data file) recorded in a predetermined memory. Each piece of photograph data is roughly composed of a header part and a still image data part.

As shown in FIGS. 18A to 18D, the header part has metadata added thereto, the metadata including a file name, additional information such as photographing condition information including a photographing date and time, focus, shutter speed and the like, keyword information, and the like.

The keyword information in this case is added by the user after photographing for the purpose of classification and organization or the like. Digital cameras allow input of relatively simple character information. In addition, a large amount of keyword information can be input relatively easily by using a personal computer.

In addition, detailed keyword information is added to some of photograph data registered in albums on photograph sharing servers on the Internet. These pieces of photograph data can be obtained and used relatively easily.

Hence, in the case of the "tag frame," attention is directed to variously added keyword information of metadata added to each piece of photograph data as described above, and photograph data having same keyword information or similar keyword information is extracted and displayed.

In the example shown in FIGS. 18A to 18D, photograph data including a keyword of "Hawaii" in keyword information thereof is extracted. As shown in FIGS. 18A to 18D, each piece of photograph data includes keyword information, and the keyword information includes a keyword (word) of "Hawaii."

In the example shown in FIGS. 18A to 18D, photographs based on photograph data having the common keyword are displayed in order indicated by arrows in FIGS. 18A to 18D. Thereby, first, the photographs of the photograph data having the same keyword can be displayed in order of FIG. 18A, FIG. 18B, FIG. 18C, and FIG. 18D.

In order to display photographs according to keyword information by the function of the "tag frame," tag frame information needs to be registered in advance. This tag frame information corresponds to share frame information in the case of using the "share frame" described above.

FIG. 19 is a diagram of assistance in explaining an example of tag frame information registered in the main memory 34 of the image display device 10 in advance.

As shown in FIG. 19, the tag frame information includes a file ID for identifying the tag frame information itself, a tag frame title, an access destination indicating a destination where photograph data to be displayed is stored, the number of display photographs of one screen which number indicates the number of display photographs displayed on one screen, a "display changing time" indicating timing of changing a display image when a slide show display is made, and a maximum number of display photographs which number indicates a maximum number of photographs displayed consecutively.

In addition, the tag frame information in this example has a first keyword selecting method set therein when photographs are displayed by the function of the "tag frame." In this case, the first keyword selecting method can be selected from three cases, that is, a case of a fixed keyword, a case of obtaining a keyword randomly from a keyword file, and a case of selecting an often used keyword.

"Fixed" uses a keyword input in advance as it is. "Obtaining a keyword randomly from a keyword file" uses a keyword randomly obtained from a keyword file prepared with a large number of keywords registered therein in advance. "Selecting an often used keyword" updates the frequency of input of character information input to the image display device 10, and uses character information with a high input frequency as a keyword.

Thus, in the tag frame information, the source where photograph data to be output is stored (access destination), information indicating a mode of display of the photograph data stored in the source, and the first keyword selecting method are set in advance.

[Process of Registering Tag Frame Information]

Figure 20:
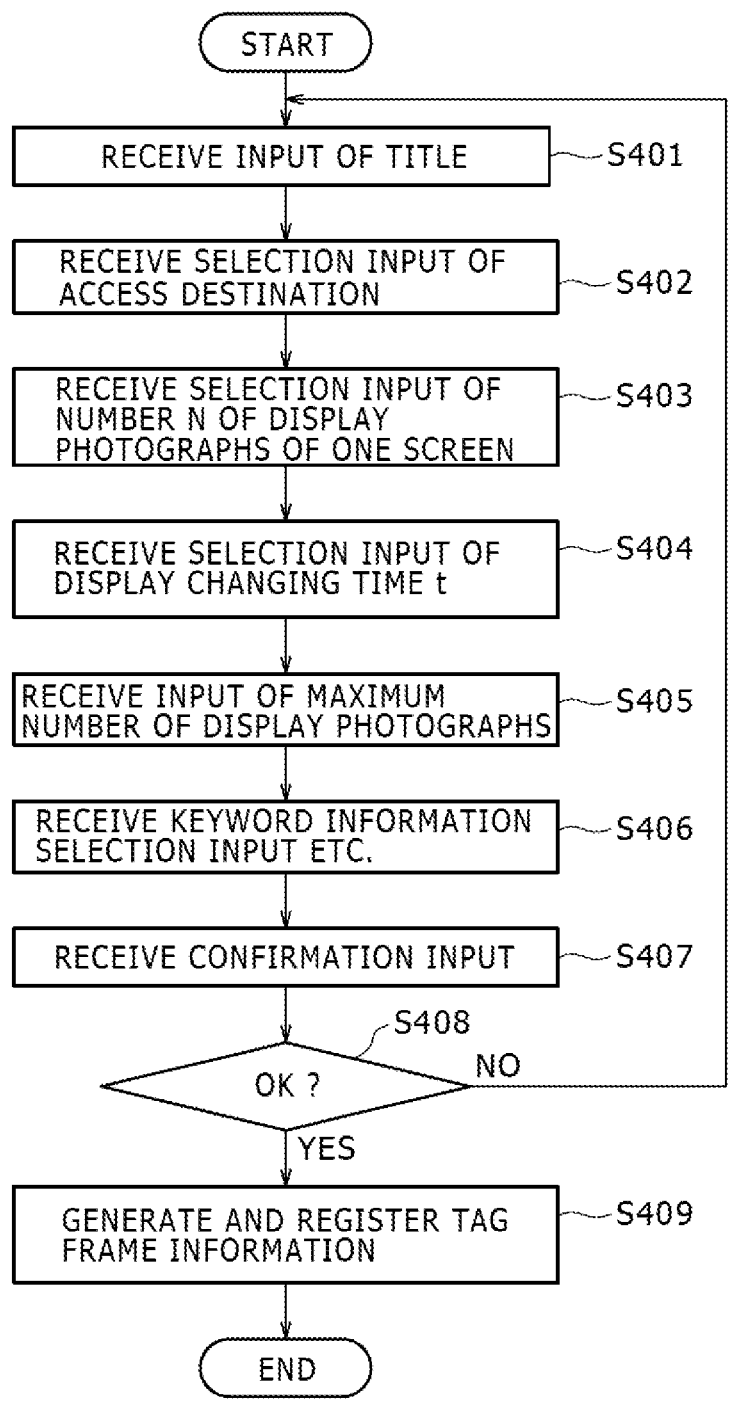
FIG. 20 is a flowchart of assistance in explaining an example of a process of registering the tag frame information.

Description will next be made of a process of registering the tag frame information formed as described with reference to FIG. 19 showing an example of the tag frame information. FIG. 20 is a flowchart of assistance in explaining an example of the process of registering the tag frame information. The process of FIG. 20 is performed mainly in the main CPU 31 and the auxiliary CPU 32 in the image display device 10 according to the present embodiment when an operation to create a "tag frame" is performed via the panel operating section 41 or the like.

In this example, the main CPU 31 first receives an input of the title of the "tag frame" via the panel operating section 41 or the remote control 60 (step S401). In this case, a simple character input, for example, can be performed.

The main CPU 31 next receives a selection input of an access destination such as a memory storing and retaining photograph data to be displayed via the panel operating section 41 or the like and the auxiliary CPU 32 (step S402). In the process of step S402, it is possible to select a built-in memory and an external memory as well as an album on a server device on a LAN, an album on a server device on the Internet, and the like.

The main CPU 31 next receives a selection input of the number N of display photographs of one screen (number of display images to be displayed on one screen) via the panel operating section 41 or the like and the auxiliary CPU 32 (step S403). The process of step S403 receives a selection input of a desired number, which is the number of still images to be displayed within one screen, and is one (FIG. 4A), two (FIG. 4B), three (FIG. 4C), or four (FIG. 4D) as described with reference to FIGS. 4A to 4D.

The main CPU 31 then receives a selection input of a display changing time t via the panel operating section 41 or the like and the auxiliary CPU 32 (step S404). The display changing time t indicates the display time of an image displayed on the display screen 14G of the LCD 14. Specifically, the display changing time t can be selected from "15 seconds," "1 minute," "10 minutes," "30 minutes," "1 hour," "4 hours," "do not change" and the like.

The main CPU 31 next receives a selection input of a maximum number of display photographs via the panel operating section 41 or the like and the auxiliary CPU 32 (step S405). The maximum number of display photographs is used to limit the number of photographs to be displayed in advance when there are a large number of pieces of photograph data having a same keyword.

The main CPU 31 finally receives a keyword information selection input or the like via the panel operating section 41 or the like and the auxiliary CPU 32 (step S406). The process of step S406 sets the first keyword selecting method. Specifically, as described above, one of the three cases of "fixed," "obtaining a keyword randomly from a keyword file," and "selecting an often used keyword" is selected as the first keyword selecting method. When "fixed" is selected, an input of fixed keyword information is also received.

The main CPU 31 thereafter receives a confirmation input via the panel operating section 41 and the auxiliary CPU (step S407). The main CPU 31 then determines whether the confirmation input received in step S407 indicates that the selection inputs of the various information are correct (whether "OK" is selected) (step S408).

When the main CPU 31 determines in the determination process of step S408 that "Back," "No" or the like is selected as the confirmation input received in step S407 and that the confirmation input received in step S407 does not indicate that the selection inputs of the various information are correct, the main CPU 31 repeats the process from step S401. This allows selection inputs of various information to be performed again.

When the main CPU 31 determines in the determination process of step S408 that the confirmation input received in step S407 indicates that the selection inputs of the various information are correct, the main CPU 31 performs a process of generating and registering new tag frame information (a process of registering a new "tag frame") (step S409). Then the process of registering the tag frame information which process is shown in FIG. 20 is ended.

Incidentally, in the process of step S409, tag frame information in the mode shown in FIG. 19 is formed by associating the various information received in steps S401 to S406. Then, the formed tag frame information is registered in a predetermined memory, and the "tag frame" is registered so as to be selectable in the "home" corresponding to a so-called menu. Description will be made supposing that a destination where the tag frame information is registered in the image display device 10 according to the present embodiment is the flash memory 33.

Thus, the tag frame information in the mode shown in FIG. 19 is formed and retained in the flash memory 33 connected to the main CPU 31.

[Processes of Displaying Photographs by Tag Frame]

Description will next be made of processes when photographs are displayed by the function of the tag frame. Two display processes (a first display process and a second display process) are considered when photographs having a same keyword are displayed by the function of the tag frame.

The first display process is roughly performed in two stages of:

(1) finding photographs having a same keyword from a first keyword; and (2) making a slide show display of the found photographs.

The second display process includes:

(1) finding photographs having a same keyword from a first keyword;

(2) while making a slide show display of the found photographs, collecting keywords of the individual photographs without duplication; and (3) after finishing collecting keywords of the photographs for display, selecting one keyword other than the first keyword, and repeating the process from (1).

The second display process thus repeats the process of (1) and (2) while changing the keyword. In the following, description will be made of details of the first display process and the second display process described above.

[First Display Process of Displaying Photographs by Tag Frame]

Figure 21:
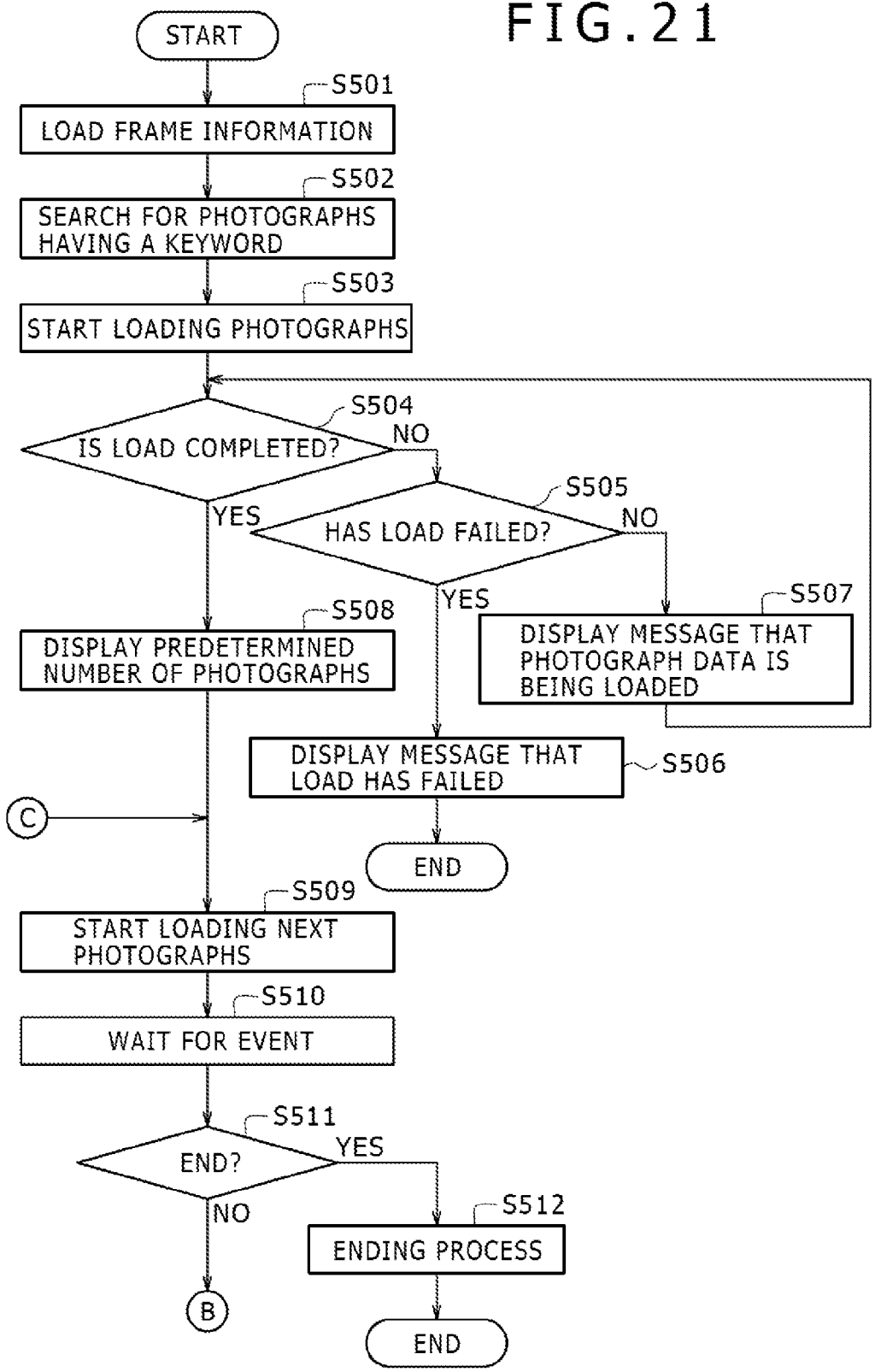
FIG. 21 is a flowchart of assistance in explaining a first display process of displaying photographs by the tag frame.
Figure 22:
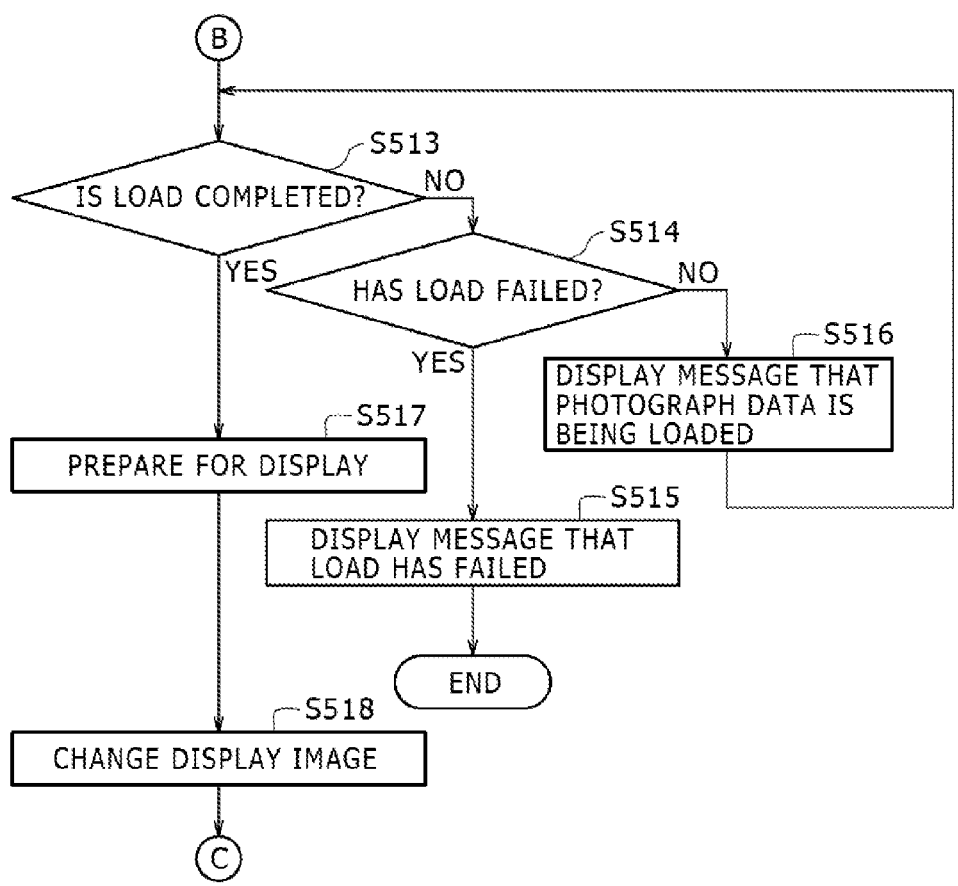
FIG. 22 is a flowchart continued from FIG. 21.

FIG. 21 and FIG. 22 are flowcharts of assistance in explaining the first display process of displaying photographs by the tag frame.

As in the case of the share frame described above, the process represented in FIG. 21 and FIG. 22 is performed mainly by the main CPU 31 and the auxiliary CPU 32 by selecting the selection item of the desired tag frame displayed in the "home" (corresponding to a selection menu) as described with reference to FIG. 6.

The main CPU 31 first loads the tag frame information of the tag frame specified by the user to be executed from the flash memory 33 into the main memory 34 (step S501). This tag frame information is formed as shown in FIG. 19 by the process described with reference to FIG. 20.

The main CPU 31 then identifies a first keyword, and searches for photograph data having the same keyword as the identified keyword (step S502). Specifically, the main CPU 31 first identifies the first keyword according to the keyword selecting method of the tag frame information loaded in step S501. Then, on the basis of the identified keyword, the main CPU 31 searches for photograph data having the same keyword from a folder or the like specified by an access destination in the tag frame information.

The main CPU 31 thereafter starts a process of loading an amount of photograph data for display on one screen among the pieces of photograph data found in step S502 and having the same keyword as the identified keyword from the folder or the like as the access destination into the main memory 34 (step S503).

The main CPU 31 then determines whether the loading of the photograph data of the photographs to be displayed in each frame is completed (step S504). When it is determined in the determination process of step S504 that the load is not completed yet, the main CPU 31 determines whether the load has failed (step S505).

The determination process of step S505 determines whether the photograph data is obtained normally without response from the access destination being absent or without the photograph data being unable to be read, for example.

When determining in the determination process of step S505 that the loading of the photograph data has failed, the main CPU 31 displays a message notifying the user that the photograph data cannot be loaded (step S506), and then ends the process represented in FIG. 21 and FIG. 22. Specifically, in step S506, the main CPU 31 forms a message notifying the user that the photograph data cannot be loaded, and displays the message on the display screen 14G of the LCD 14 by controlling the LCD control circuit 44 and the like. The main CPU 31 thereafter ends the process represented in FIG. 21 and FIG. 22.

When determining in the determination process of step S505 that the loading of the photograph data has not failed, the main CPU 31 displays a message notifying the user that the photograph data is being loaded (step S507), and then repeats the process from step S504. That is, in step S507, the main CPU 31 forms a message notifying the user that the photograph data is being loaded, and displays the message on the display screen 14G of the LCD 14 by controlling the LCD control circuit 44 and the like. The main CPU 31 thereafter repeats the process from step S504.

When determining in the determination process of step S504 that the load is completed, the main CPU 31 performs a process of displaying the photographs based on the loaded photograph data in each frame formed by dividing the display screen according to the tag frame information (step S508).

The process of step S508 divides the display screen 14G into a specified number of frames (divided display areas) on the basis of the tag frame information, and forms, in the main memory 34, a display image for displaying the photographs according to the photograph data loaded into the main memory 34 in the respective frames. The main CPU 31 then supplies the formed display image to the LCD 14 through the LCD control section 44 to display the display image on the display screen 14G of the LCD 14.

The main CPU 31 thereafter performs a process of loading the photograph data of photographs to be displayed next (step S509). As with the process of step S503, the process of step S509 starts a process of loading the photograph data to be displayed next from the photograph data found in step S502 and having the same keyword as the identified keyword into the main memory 34.

The main CPU 31 then waits for an event (step S510). In the process of step S510, the passage of the display changing time set in the tag frame information or the occurrence of an operation input from the user via the panel operating section 41 or the remote control 60 is the occurrence of an event. Incidentally, the passage of the display changing time is regarded as the occurrence of an event when a time from a start of display of the photographs being displayed now exceeds the set display changing time.

The main CPU 31 thereafter determines whether an event indicating that the process of displaying photographs by the tag frame is to be ended, such as an ending operation by the user or having displayed all photographs to be displayed, has occurred (step S511).

When determining in the determination process of step S511 that an event indicating that the process of displaying photographs by the tag frame is to be ended has occurred, the main CPU 31 performs an ending process (step S512). Thereafter the process represented in FIG. 21 and FIG. 22 is ended.

Incidentally, the ending process of step S512 includes a process of erasing the various data loaded into the main memory 34 to secure free space, for example.

When determining in the determination process of step S511 that no event indicating that the process of displaying photographs by the tag frame is to be ended has occurred, the main CPU 31 proceeds to the process represented in FIG. 22. The main CPU 31 then determines whether the loading of the photograph data of the photographs to be displayed in each frame is completed (step S513).

When it is determined in the determination process of step S513 that the load is not completed yet, the main CPU 31 determines whether the load has failed (step S514). The determination process of step S514 is a similar process to the process of step S505.

When determining in the determination process of step S514 that the loading of the photograph data has failed, the main CPU 31 displays a message notifying the user that the photograph data cannot be loaded (step S515), and then ends the process represented in FIG. 21 and FIG. 22. The process of step S515 is a similar process to step S506 described above.

When determining in the determination process of step S514 that the loading of the photograph data has not failed, the main CPU 31 displays a message notifying the user that the photograph data is being loaded (step S516), and then repeats the process from step S513. The process of step S516 is a similar process to step S507 described above.

When determining in the determination process of step S513 that the load is completed, the main CPU 31 performs a preparation process for displaying the photographs based on the loaded photograph data in each frame formed by dividing the display screen according to the tag frame information (step S517).

The main CPU 31 thereafter makes a change so as to erase the image being displayed by gradually darkening the image and so as to display a new image prepared in step S517 in place of the erased image (step S518). The main CPU 31 thereafter repeats the process from step S509 in FIG. 21.

It is thereby possible to form a plurality of frames by dividing the display screen of the LCD 14 into a plurality of divided display areas, and display photographs based on photograph data having a same keyword in the respective frames. Thereby the user can extract and reproduce related photographs on the basis of keywords added to the photograph data, and use the related photographs.

Incidentally, the process represented in FIG. 21 and FIG. 22 has been described supposing that the display screen is divided into a plurality of areas, and that photographs based on photograph data having a common keyword are displayed in the respective divided display areas. However, the present invention is not limited to this. It is also possible to make a slide show display in which photographs based on photograph data having a common keyword are displayed one at a time on one screen, and the photographs are changed sequentially.

[Second Display Process of Displaying Photographs by Tag Frame]

Figure 23:
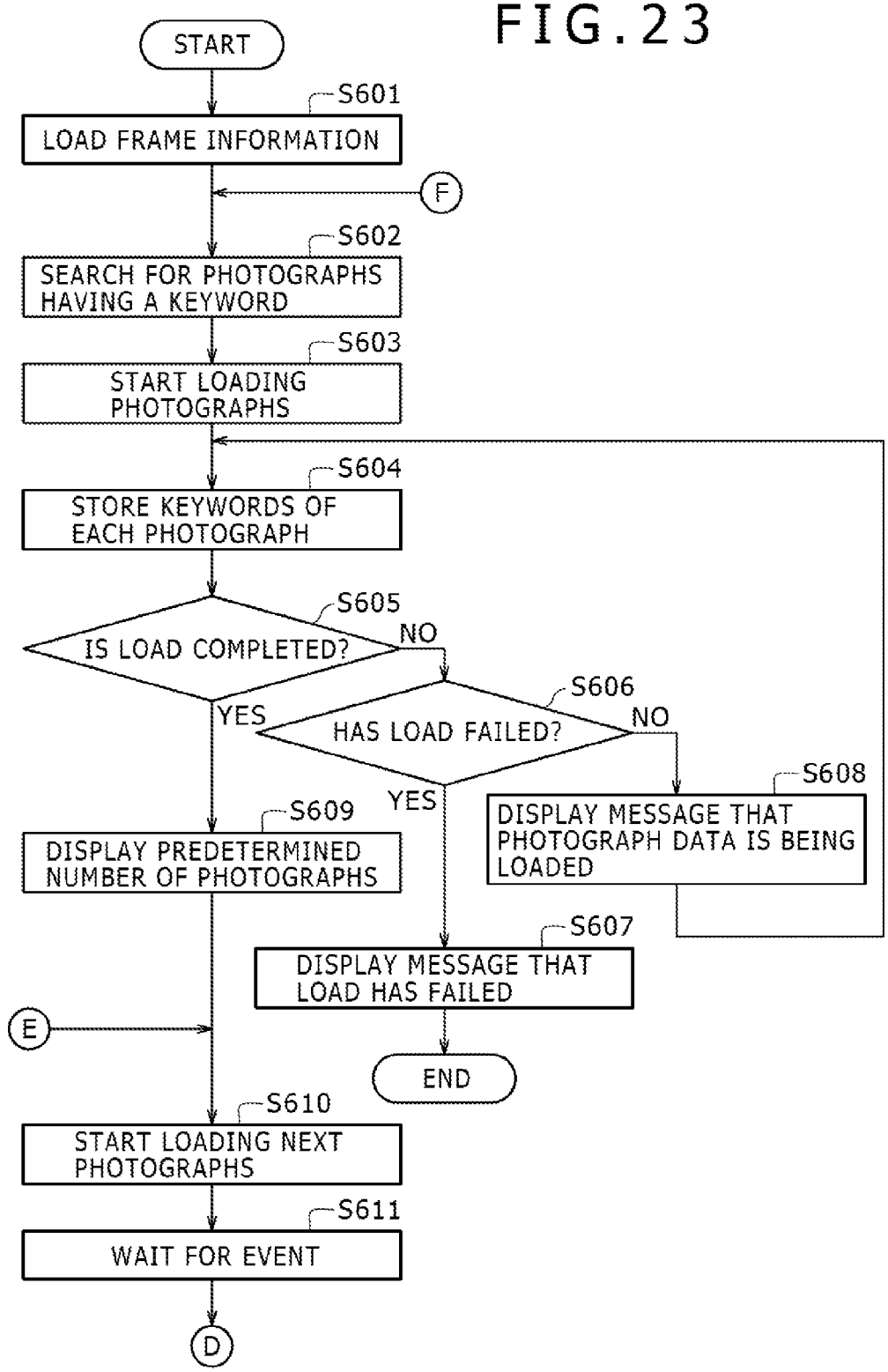
FIG. 23 is a flowchart of assistance in explaining a second display process of displaying photographs by the tag frame.
Figure 24:
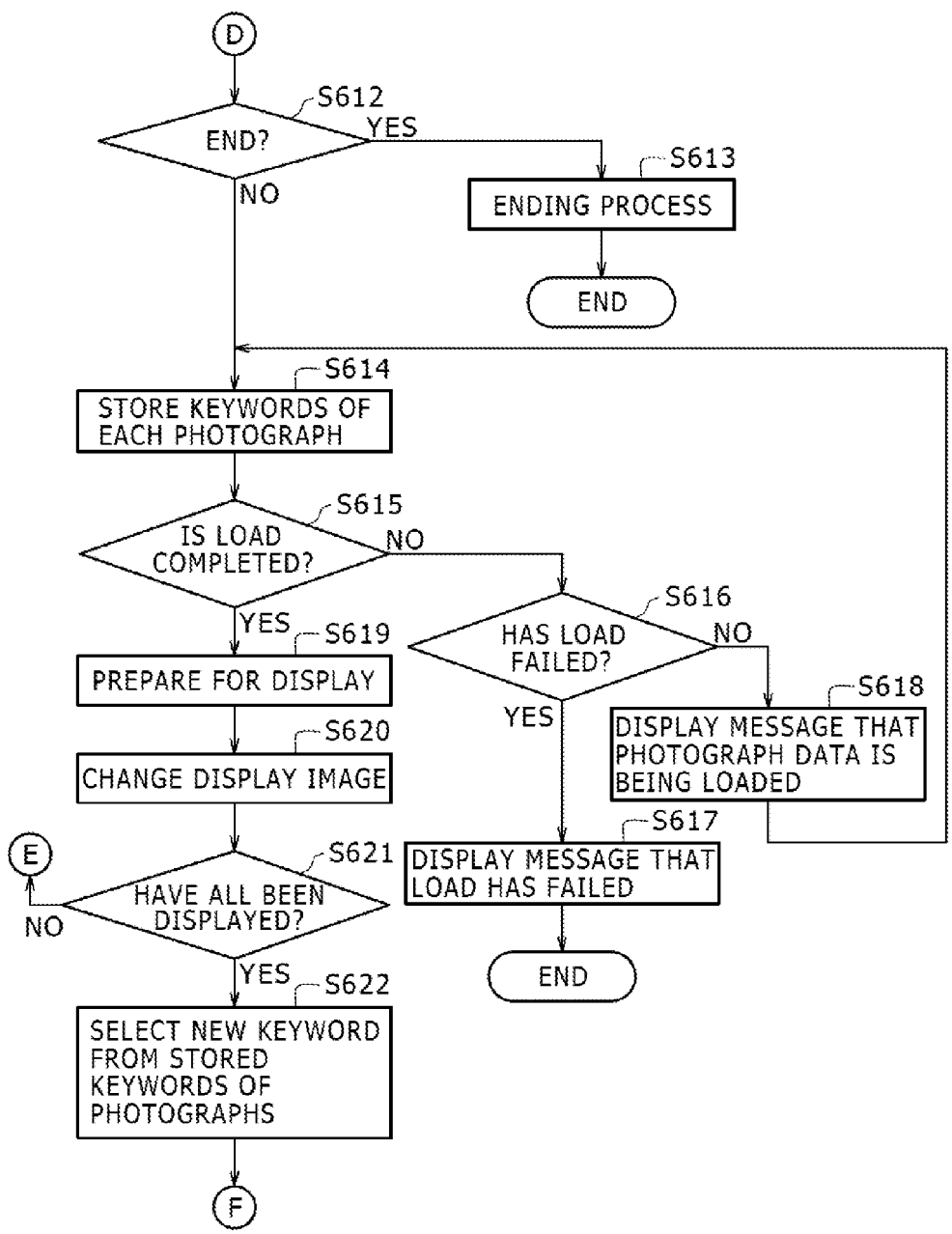
FIG. 24 is a flowchart continued from FIG. 23.

FIG. 23 and FIG. 24 are flowcharts of assistance in explaining the second display process of displaying photographs by the tag frame.

As in the case of the first tag frame display process represented in FIG. 21 and FIG. 22, the process represented in FIG. 23 and FIG. 24 is performed mainly by the main CPU 31 and the auxiliary CPU 32 by selecting the selection item of the desired tag frame displayed in the "home" (corresponding to a selection menu) as described with reference to FIG. 6.

The main CPU 31 first loads the tag frame information of the tag frame specified by the user to be executed from the flash memory 33 into the main memory 34 (step S601). This tag frame information is formed as shown in FIG. 19 by the process described with reference to FIG. 20.

The main CPU 31 then identifies a first keyword, and searches for photograph data having the same keyword as the identified keyword (step S602). Specifically, the main CPU 31 first identifies the first keyword according to the keyword selecting method of the tag frame information loaded in step S601. Then, on the basis of the identified keyword, the main CPU 31 searches for photograph data having the same keyword from a folder specified by an access destination in the tag frame information.

The main CPU 31 thereafter starts a process of loading an amount of photograph data for display on one screen among the pieces of photograph data found in step S602 and having the same keyword as the identified keyword from the folder as the access destination into the main memory 34 (step S603).

The main CPU 31 then stores keyword information added to the photograph data loaded from the folder as the access destination into the main memory 34 in a predetermined area (keyword storing area) of the main memory 34, for example (step S604).

The main CPU 31 thereafter determines whether the loading of the photograph data of the photographs to be displayed in each frame is completed (step S605). When it is determined in the determination process of step S605 that the load is not completed yet, the main CPU 31 determines whether the load has failed (step S606).

The determination process of step S606 determines whether the photograph data is obtained normally without response from the access destination being absent or without the photograph data being unable to be read, for example.

When determining in the determination process of step S606 that the loading of the photograph data has failed, the main CPU 31 displays a message notifying the user that the photograph data cannot be loaded (step S607), and then ends the process represented in FIG. 23 and FIG. 24. Specifically, in step S607, the main CPU 31 forms a message notifying the user that the photograph data cannot be loaded, and displays the message on the display screen 14G of the LCD 14 by controlling the LCD control circuit 44 and the like. The main CPU 31 thereafter ends the process represented in FIG. 23 and FIG. 24.

When determining in the determination process of step S606 that the loading of the photograph data has not failed, the main CPU 31 displays a message notifying the user that the photograph data is being loaded (step S608), and then repeats the process from step S604. That is, in step S608, the main CPU 31 forms a message notifying the user that the photograph data is being loaded, and displays the message on the display screen 14G of the LCD 14 by controlling the LCD control circuit 44 and the like. The main CPU 31 thereafter repeats the process from step S604.

When determining in the determination process of step S605 that the load is completed, the main CPU 31 performs a process of displaying the photographs based on the loaded photograph data in each frame formed by dividing the display screen according to the tag frame information (step S609).

The process of step S609 divides the display screen 14G into a specified number of frames (divided display areas) on the basis of the tag frame information, and forms, in the main memory 34, a display image for displaying the photographs according to the photograph data loaded into the main memory 34 in the respective frames. The main CPU 31 then supplies the formed display image to the LCD 14 through the LCD control section 44 to display the display image on the display screen 14G of the LCD 14.

The main CPU 31 thereafter performs a process of loading the photograph data of photographs to be displayed next (step S610). As with the process of step S603, the process of step S610 starts a process of loading the photograph data to be displayed next from the photograph data found in step S602 and having the same keyword as the identified keyword into the main memory 34.

The main CPU 31 then waits for an event (step S611). In the process of step S611, the passage of the display changing time set in the tag frame information or the occurrence of an operation input from the user via the panel operating section 41 or the remote control 60 is the occurrence of an event. Incidentally, the passage of the display changing time is regarded as the occurrence of an event when a time from a start of display of the photographs being displayed now exceeds the set display changing time.

Thereafter proceeding to the process represented in FIG. 24, the main CPU 31 determines whether an event indicating that the process of displaying photographs by the tag frame is to be ended, such as an ending operation by the user or having displayed all photographs to be displayed, has occurred (step S612).

When determining in the determination process of step S612 that an event indicating that the process of displaying photographs by the tag frame is to be ended has occurred, the main CPU 31 performs an ending process (step S613). Thereafter the process represented in FIG. 23 and FIG. 24 is ended.

Incidentally, the ending process of step S613 includes a process of erasing the various data loaded into the main memory 34 to secure free space, for example.

When determining in the determination process of step S612 that no event indicating that the process of displaying photographs by the tag frame is to be ended has occurred, the main CPU 31 stores keyword information added to the photograph data newly loaded into the main memory 34 (step S614).

The process of step S614 is similar to the process of step S604 shown in FIG. 23. Specifically, in step S614, the main CPU 31 stores keyword information added to the photograph data newly loaded into the main memory 34 by the loading process started in step S610 in FIG. 23 in a predetermined area (keyword storing area) of the main memory 34, for example.

The main CPU 31 then determines whether the loading of the photograph data of the photographs to be displayed in each frame is completed (step S615).

When it is determined in the determination process of step S615 that the load is not completed yet, the main CPU 31 determines whether the load has failed (step S616). The determination process of step S616 is a similar process to the process of step S606.

When determining in the determination process of step S616 that the loading of the photograph data has failed, the main CPU 31 displays a message notifying the user that the photograph data cannot be loaded (step S617), and then ends the process represented in FIG. 23 and FIG. 24. The process of step S617 is a similar process to step S607 described above.

When determining in the determination process of step S616 that the loading of the photograph data has not failed, the main CPU 31 displays a message notifying the user that the photograph data is being loaded (step S618), and then repeats the process from step S614. The process of step S618 is a similar process to step S608 described above.

When determining in the determination process of step S615 that the load is completed, the main CPU 31 performs a preparation process for displaying the photographs based on the loaded photograph data in each frame formed by dividing the display screen according to the tag frame information (step S619).

The main CPU 31 thereafter makes a change so as to erase the image being displayed by gradually darkening the image and so as to display a new image prepared in step S619 in place of the erased image (step S620).

The main CPU 31 then determines whether all of the photograph data found in the process of step S602 shown in FIG. 23 and having the same keyword as the identified keyword added thereto has been displayed (step S621).

When determining in the determination process of step S621 that not all of the photograph data found in the process of step S602 shown in FIG. 23 and having the same keyword as the identified keyword added thereto has been displayed, the main CPU 31 repeats the process from step S610 shown in FIG. 23 to display photographs based on new photograph data.

When determining in the determination process of step S621 that all of the photograph data found in the process of step S602 has been displayed, the main CPU 31 selects new keyword information from the stored keyword information of the photograph data (step S622).

Specifically, in step S622, the main CPU 31 selects keyword information to be set as a next keyword other than the previously selected keyword from the keyword information stored in the keyword storing area of the main memory 34, for example, by the processes of step S604 and step S614.

In the keyword selection in step S622, the new keyword is selected according to a predetermined method, such as, for example, selecting a keyword with a high frequency of occurrence or randomly selecting a keyword.

After the process of step S622, the main CPU 31 repeats the process from step S602 shown in FIG. 23 to display photographs based on photograph data having the new keyword.

It is thereby possible to form a plurality of frames by dividing the display screen of the LCD 14 into a plurality of divided display areas, and display photographs based on photograph data having a same keyword in the respective frames.

In addition, the second display process represented in FIG. 23 and FIG. 24 can display photographs based on all photograph data having an identified keyword, thereafter identify a new keyword, and display photographs based on photograph data having the identified keyword. That is, it is possible to have a configuration capable of identifying a new keyword, extract photograph data for each keyword, and display photographs of the photograph data.

Incidentally, the process represented in FIG. 23 and FIG. 24 has been described supposing that the display screen is divided into a plurality of areas, and that photographs based on photograph data having a common keyword are displayed in the respective divided display areas. However, the present invention is not limited to this. As in the first display process of displaying photographs by the tag frame as described above, it is also possible to make a slide show display in which photographs based on photograph data having a common keyword are displayed one at a time on one screen, and the photographs are changed sequentially.

[Another Display Mode of Tag Frame]

In the first display process and the second display process of displaying photographs by the tag frame as described above, all of a large number of pieces of photograph data having an identified keyword are displayed as display objects. However, it is also possible to change the keyword for each screen.

Description in the following will be made of a case of changing the keyword for each screen. Also in this example, it is possible to divide the display screen into a plurality of frames (divided display areas), and display a plurality of photographs within one screen. However, in order to simplify description, a case of displaying one photograph within one screen will be described first.

FIGS. 25A, 25B, 25C, and 25D are diagrams of assistance in explaining a tag frame when photographs are displayed on the basis of photograph data extracted with a keyword changed for each screen.

As with the references shown in FIGS. 18A to 18D, each of references FL1, FL2, FL3, and FL4 in FIGS. 25A to 25D denotes photograph data (photograph data file) recorded in a predetermined memory. Each piece of photograph data is roughly composed of a header part and a still image data part.

As shown in FIGS. 25A to 25D, the header part has metadata added thereto, the metadata including a file name, additional information such as photographing condition information including a photographing date and time, focus, shutter speed and the like, and keyword information. Each of the file name, the additional data, and the keywords is similar to that described with reference to FIGS. 18A to 18D.

In this example, a keyword to be used first is identified, and photograph data having the identified keyword is extracted and displayed. For example, suppose that "Hawaii" is identified as the keyword to be used first. In this case, as shown in FIG. 25A, photograph data FL1 having the word "Hawaii" as a keyword is extracted and displayed.

Then, of the keywords of the photograph data FL1, a keyword other than "Hawaii" is identified as a keyword to be used next. In this example, as shown in FIG. 25A, a word "ocean" is identified as the next keyword. Then, photograph data FL2 having the word "ocean" as a keyword is extracted and displayed.

Next, of the keywords of the photograph data FL2, a keyword other than "ocean" is identified as a keyword to be used next. In this example, as shown in FIG. 25B, a word "hotel" is identified as the next keyword. Then, photograph data FL3 having the word "hotel" as a keyword is extracted and displayed.

Then, of the keywords of the photograph data FL3, a keyword other than "hotel" is identified as a keyword to be used next. In this example, as shown in FIG. 25C, a word "Okinawa" is identified as the next keyword. Then, photograph data FL4 having the word "Okinawa" as a keyword is extracted and displayed.

Thus, in this example, photograph data used for display is extracted and a photograph based on the extracted photograph data is displayed while the keyword used for each screen is changed.

Incidentally, a case of displaying one photograph on one screen has been described with reference to FIGS. 25A to 25D. However, it is of course possible to display a plurality of photographs on one screen. In this case, it suffices to read an amount of photograph data having a same keyword as an identified keyword which amount corresponds to the number of photographs to be displayed on one screen.

Also in this example, tag frame information as shown in FIG. 19 is created in advance by the process represented in FIG. 20. Then, by performing a process to be described in the following using the tag frame information formed as shown in FIG. 19, photograph data corresponding to a keyword can be extracted and displayed while the keyword is changed for each screen.

[Another Example of Process of Displaying Photographs by Tag Frame]

Figure 27:
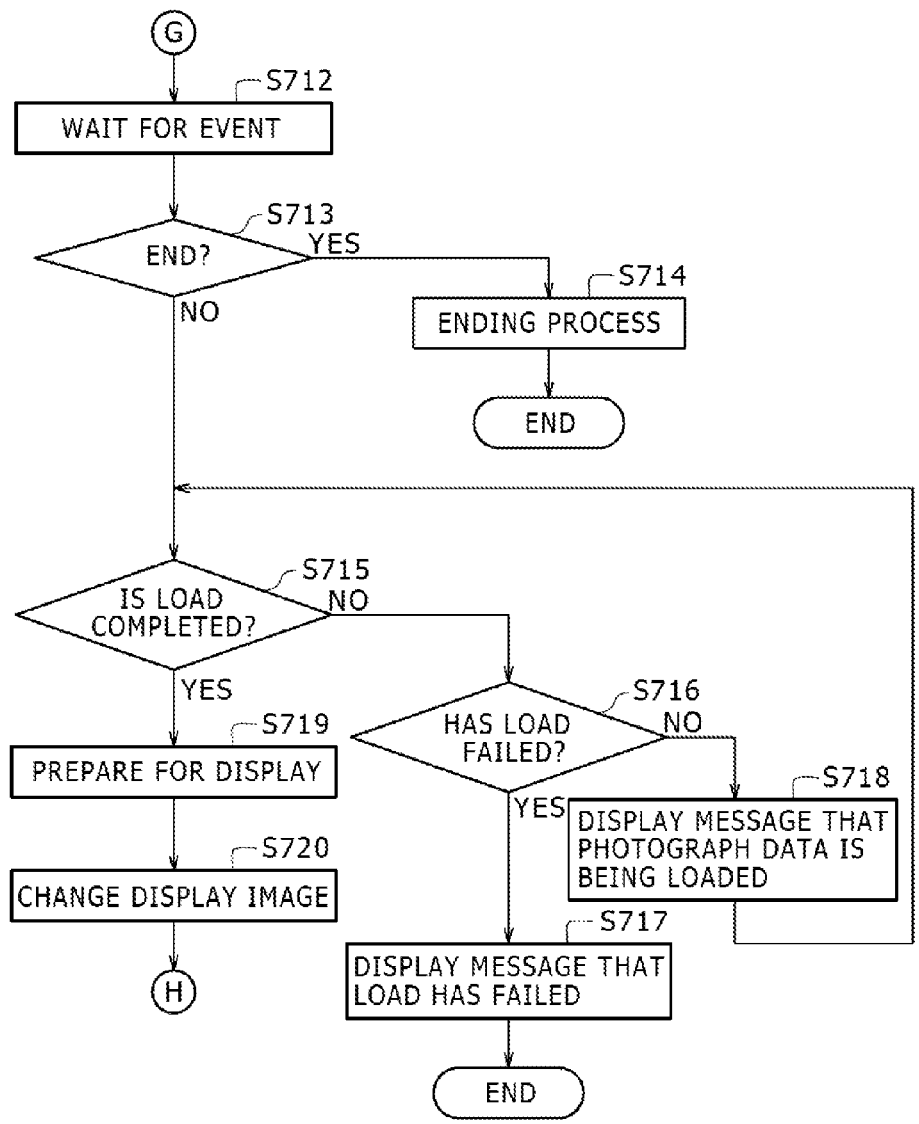
FIG. 27 is a flowchart continued from FIG. 26.

FIG. 26 and FIG. 27 are flowcharts of assistance in explaining a process of extracting and displaying photograph data while changing a keyword used for each screen, as another example of a process of displaying photographs by the tag frame.

As in the case of the first display process and the second display process described above, the process represented in FIG. 26 and FIG. 27 is performed mainly by the main CPU 31 and the auxiliary CPU 32 by selecting the selection item of the desired tag frame displayed in the "home" (corresponding to a selection menu) as described with reference to FIG. 6.

The main CPU 31 first loads the tag frame information of the tag frame specified by the user to be executed from the flash memory 33 into the main memory 34 (step S701). This tag frame information is formed as shown in FIG. 19 by the process described with reference to FIG. 20.

The main CPU 31 then identifies a first keyword, and searches for photograph data having the same keyword as the identified keyword (step S702). Specifically, the main CPU 31 first identifies the first keyword according to the keyword selecting method of the tag frame information loaded in step S701. Then, on the basis of the identified keyword, the main CPU 31 searches for photograph data having the same keyword from a folder specified by an access destination in the tag frame information.

The main CPU 31 thereafter starts a process of loading an amount of photograph data for display on one screen among the pieces of photograph data found in step S702 and having the same keyword as the identified keyword from the folder or the like as the access destination into the main memory 34 (step S703).

The main CPU 31 then determines whether the loading of the photograph data of the photographs to be displayed in each frame is completed (step S704). When it is determined in the determination process of step S704 that the load is not completed yet, the main CPU 31 determines whether the load has failed (step S705).

The determination process of step S705 determines whether the photograph data is obtained normally without response from the access destination being absent or without the photograph data being unable to be read, for example.

When determining in the determination process of step S705 that the loading of the photograph data has failed, the main CPU 31 displays a message notifying the user that the photograph data cannot be loaded (step S706), and then ends the process represented in FIG. 26 and FIG. 27. Specifically, in step S706, the main CPU 31 forms a message notifying the user that the photograph data cannot be loaded, and displays the message on the display screen 14G of the LCD 14 by controlling the LCD control circuit 44 and the like. The main CPU 31 thereafter ends the process represented in FIG. 26 and FIG. 27.

When determining in the determination process of step S705 that the loading of the photograph data has not failed, the main CPU 31 displays a message notifying the user that the photograph data is being loaded (step S707), and then repeats the process from step S704. That is, in step S707, the main CPU 31 forms a message notifying the user that the photograph data is being loaded, and displays the message on the display screen 14G of the LCD 14 by controlling the LCD control circuit 44 and the like. The main CPU 31 thereafter repeats the process from step S704.

When determining in the determination process of step S704 that the load is completed, the main CPU 31 performs a process of displaying the photographs based on the loaded photograph data in each frame formed by dividing the display screen according to the tag frame information (step S708).

The process of step S708 divides the display screen 14G into a specified number of frames (divided display areas) on the basis of the tag frame information, and forms, in the main memory 34, a display image for displaying the photographs according to the photograph data loaded into the main memory 34 in the respective frames. The main CPU 31 then supplies the formed display image to the LCD 14 through the LCD control section 44 to display the display image on the display screen 14G of the LCD 14.

The main CPU 31 thereafter selects a new keyword to be used next from keywords added to the photograph data of the displayed photographs (step S709). The process of step S709 selects a keyword different from the keyword used this time.

Specifically, in step S709, a new keyword is selected by a predetermined method, such as randomly selecting a keyword or selecting a duplicate keyword other than the keyword used this time when a plurality of pieces of photograph data are display objects.

The main CPU 31 then searches for photograph data having the same keyword as the keyword newly selected in step S709 (step S710). Specifically, on the basis of the selected new keyword, the main CPU 31 searches for photograph data having the same keyword from the folder specified as access destination in the tag frame information.

The main CPU 31 thereafter starts a process of loading photograph data for display on one screen among pieces of photograph data found in step S710 and having the same keyword as the selected new keyword from the folder or the like as the access destination into the main memory 34 (step S711).

Then, proceeding to the process represented in FIG. 27, the main CPU 31 waits for an event (step S712). In the process of step S712, the passage of the display changing time set in the tag frame information or the occurrence of an operation input from the user via the panel operating section 41 or the remote control 60 is the occurrence of an event. Incidentally, the passage of the display changing time is regarded as the occurrence of an event when a time from a start of display of the photographs being displayed now exceeds the set display changing time.

The main CPU 31 thereafter determines whether an event indicating that the process of displaying photographs by the tag frame is to be ended, such as an ending operation performed by the user, has occurred (step S713).

When determining in the determination process of step S713 that an event indicating that the process of displaying photographs by the tag frame is to be ended has occurred, the main CPU 31 performs an ending process (step S714). Thereafter the process represented in FIG. 26 and FIG. 27 is ended.

Incidentally, the ending process of step S714 includes a process of erasing the various data loaded into the main memory 34 to secure free space, for example.

When determining in the determination process of step S713 that no event indicating that the process of displaying photographs by the tag frame is to be ended has occurred, the main CPU 31 determines whether the loading of the photograph data of the photographs to be displayed in each frame is completed (step S715).

When it is determined in the determination process of step S715 that the load is not completed yet, the main CPU 31 determines whether the load has failed (step S716). The determination process of step S716 is a similar process to the process of step S705.

When determining in the determination process of step S716 that the loading of the photograph data has failed, the main CPU 31 displays a message notifying the user that the photograph data cannot be loaded (step S717), and then ends the process represented in FIG. 26 and FIG. 27. The process of step S717 is a similar process to step S706 described above.

When determining in the determination process of step S716 that the loading of the photograph data has not failed, the main CPU 31 displays a message notifying the user that the photograph data is being loaded (step S718), and then repeats the process from step S715. The process of step S718 is a similar process to step S707 described above.

When determining in the determination process of step S715 that the load is completed, the main CPU 31 performs a preparation process for displaying the photographs based on the loaded photograph data in each frame formed by dividing the display screen according to the tag frame information (step S719).

The main CPU 31 thereafter makes a change so as to erase the image being displayed by gradually darkening the image and so as to display a new image prepared in step S719 in place of the erased image (step S720). The main CPU 31 thereafter repeats the process from step S709 in FIG. 26.

It is thereby possible to change a keyword for each screen, extract photograph data according to the keyword, and display a photograph according to the photograph data.

Incidentally, while description has been made of a case where a matching keyword is used in the "tag frame" described with reference to FIGS. 18A to 27, a similar keyword can be searched for. A synonym dictionary is formed in this case. For example, groups of related keywords, such as a group of summer, ocean, Hawaii, Guam, and surfing and a group of winter, snow, skis, skates, and Alaska, are registered in advance.

When a keyword is identified, a keyword from a group that the identified keyword belongs to rather than a keyword matching the identified keyword is identified, whereby a connection of similar keywords can be formed. Thus, when a new keyword is identified, the function of the tag frame by a similar keyword can be realized as described above.

In addition, while information related to an image is not displayed when the image is displayed by the function of the tag frame in the above-described embodiment, the present invention is not limited to this. For example, a used keyword may of course be displayed together with the displayed image.

In this case, it suffices to supply information for displaying the used keyword to the LCD 14 via the LCD control circuit 44 by a function of the main CPU 31. Various other information can be displayed as required.

[Others]

Incidentally, the foregoing embodiment has been described by taking as an example a case where displayed content data is photograph data (still image data). However, the present invention is not limited to this. Different moving images may be displayed in each frame formed by dividing the display screen. Because the individual moving images also have different reproduction times in many cases, it is possible to display the moving images while changing moving image data being reproduced at fixed intervals such as one minute from a start or two minutes from the start, for example.

The present invention is thus applicable not only to cases of displaying still images but also to cases of displaying moving image data. Incidentally, still image data includes various graphics data without motion. Moving image data includes graphics data with motion such as animation data.

In addition, the foregoing embodiment has been described supposing that the display screen is divided into a plurality of display areas and that different images are displayed in the respective display areas. However, the display areas do not necessarily need to be defined clearly. For example, each image may be displayed in larger size than the set display areas, and images overlapping and adjacent to each other may be blurred around boundaries.

Thus, even when one screen is divided into a plurality of display areas, it is possible to display the boundary parts of the display areas obscurely, and display the display areas as one image (dissolve display).

In addition, while the foregoing embodiment has been described by taking as an example a case where the present invention is applied to an image display device, the present invention is not limited to this. For example, the present invention is also applicable to reproducing devices and recording and reproducing devices capable of reproducing still image data, moving image data and the like as well as information processing devices such as personal computers.

[Memory Frame]

The image display device 10 realizes a function of "memory frame" as one of new functions using the new concept of "frame" described above. An outline of the function of the "memory frame" is as follows.

The "memory frame" rearranges a large number of pieces of still image data (photograph data) stored at a predetermined access destination, directing attention to only the month and day of a photographing year, month, and day added to each of the pieces of still image data. Then, the "memory frame" sets the month and day of a reproduction day as a reference month and day (reference day), extracts still image data within a predetermined period of the reference month and day as still image data to be reproduced from the rearranged still image data, and sequentially reproduces the still image data to be reproduced in a predetermined display mode.

Thus, the "memory frame" function is realized by associating roughly two pieces of information, that is, (1) an access destination (a folder, a medium or the like) and (2) a display mode (the number N of display photographs within one screen, a display changing time t, and a performance time range T) with each other and registering (setting) the two pieces of information.

As described above, still image data extracted and displayed by the "memory frame" function is extracted with attention directed to only the month and day of the photographing year, month, and day. Therefore the still image data displayed by the "memory frame" function includes the following data.

First, the still image data includes still image data obtained by photographing performed around the reference day (reference month and day) of a year to which the reference day belongs. Second, the still image data includes still image data obtained by photographing performed around the reference day (reference month and day) of preceding years.

In this case, a period around the reference day of preceding years means a period around the same month and the same day as the reference day, which is the reproduction day, in the preceding years. Incidentally, a period around the reference day is determined in advance, such as three days from the reference day or one week from the reference day, for example.

[Concrete Example of Data Extraction in "Memory Frame" Function]

FIG. 28 and FIG. 29 are diagrams of assistance in explaining a concrete example of still image data extracted as still image data to be reproduced in the "memory frame" function.

As shown in FIG. 28, suppose that a present date is Feb. 22, 2008, and that photograph data (still image data obtained by photographing) having photographing years, months, and days from Mar. 15, 2005 to the present date is stored at a predetermined access destination (for example, an internal memory or an external memory).

Thus, there is photograph data for a total period of about three years. In addition, directing attention to years, there is photograph data over four years, that is, 2005, 2006, 2007, and 2008.

There is photograph data from March 15 to December 31 for the year 2005. For the year 2006, there is photograph data from January 1 to December 31, and there is photograph data for two days of February 3 and February 27 as photograph data for February.

For the year 2007, there is photograph data from January 1 to December 25, and there is photograph data for two days of February 6 and February 23 as photograph data for February. For the year 2008, there is photograph data from January 1 to February 22, and there is photograph data for two days of February 1 and February 22 as photograph data for February.

Consideration will be given to a case where when there is photograph data in a predetermined memory as shown in FIG. 28, photograph data (still image data) is displayed by the "memory frame" function with Feb. 22, 2008, which is a present date, as the reproduction day. In this example, suppose that photograph data having photographing months and days in a period of one week from the same month and the same day as the reproduction date in each year will be extracted.

FIG. 29 is a diagram of assistance in explaining a case of extracting photograph data with Feb. 22, 2008 as the reproduction day from the photograph data existing as shown in FIG. 28. In this example, February 22 of each of the years 2005, 2006, 2007, and 2008 is set as a reference, and photograph data taken during the period of one week from February 22 is extracted.

More specifically, because February 22 is the reference day, the period of one week from February 22 is a period from February 22 to February 28. As shown in FIG. 28, there is no photograph data taken in February of 2005.

The photograph data taken in February of 2006 includes photograph data taken on Feb. 27, 2006 as photograph data taken within one week of February 22. The photograph data taken in February of 2007 includes photograph data taken on Feb. 25, 2007 as photograph data taken within one week of February 22.

The photograph data taken in February of 2008 includes photograph data taken on Feb. 22, 2008 as photograph data taken within one week of February 22. Thus, photograph data taken on Feb. 27, 2006, Feb. 23, 2007, and Feb. 22, 2008 as enclosed in a vertical frame in FIG. 29 is extracted as photograph data to be displayed by the function of the "memory frame."

Thereby photograph data (still image data) obtained by photographing in the same period of each of this year (2008), last year (2007), and the year before last (2006) is extracted. Then, still images based on the extracted photograph data are reproduced and displayed in a predetermined display mode (output mode). Incidentally, there may be one piece of photograph data or a plurality of pieces of photograph data as photograph data taken on the same day of each year.

["Memory Frame" Registering (Setting) Process]

A "memory frame" registering process performed in the image display device 10 according to the present embodiment will next be described. In the image display device 10 according to the present embodiment, when still image data is to be displayed using the "memory frame" function, a "memory frame" registering process ("memory frame" creating process), which registers an access destination and a display mode in advance, needs to be performed.

Figure 30:
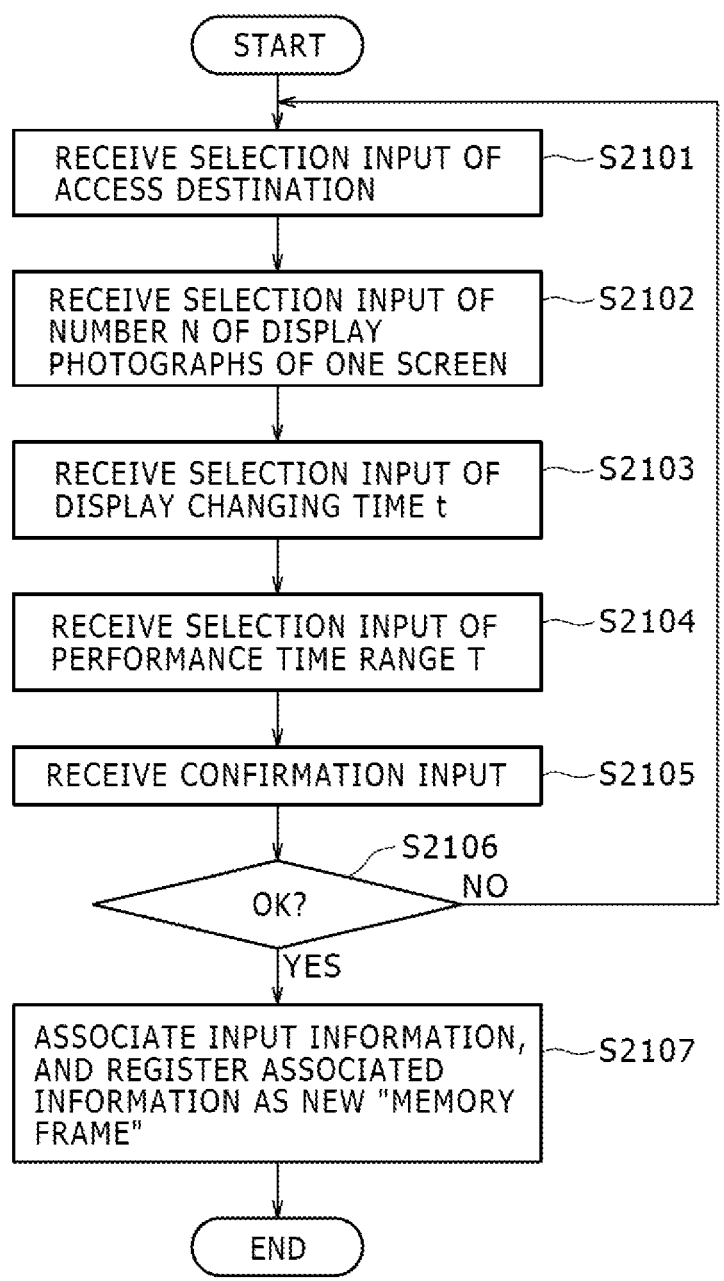
FIG. 30 is a flowchart of assistance in explaining a process of registering a "memory frame"

FIG. 30 is a flowchart of assistance in explaining the "memory frame" registering process. The process represented in FIG. 30 is performed when the user selects an item "CREATE NEW FRAME" via the panel operating section 41 from a menu displayed on the display screen of the LCD 14 and having performable functions as selection items. The process represented in FIG. 30 is performed mainly by the main CPU 31 and the auxiliary CPU 32.

First, the main CPU 31 controls the LCD control circuit 44 to display a frame creating screen on the display screen 14G of the LCD 14, and receives a selection input of an access destination via the panel operating section 41 and the auxiliary CPU 32 (step S2101). In the process of step S2101, for example, a list of selectable folders, media and the like is displayed, and a desired access destination can be selected from the list.

The main CPU 31 next receives a selection input of the number N of display photographs of one screen (number of display images to be displayed on one screen) via the panel operating section 41 and the auxiliary CPU 32 (step S2102). The process of step S2102 receives a selection input of a desired number, which is the number of still images to be displayed within one screen, and is one (FIG. 4A), two (FIG. 4B), three (FIG. 4C), or four (FIG. 4D) as described with reference to FIGS. 4A to 4D.

The main CPU 31 then receives a selection input of a display changing time t via the panel operating section 41 and the auxiliary CPU 32 (step S2103). The display changing time t indicates the display time of an image displayed on the display screen 14G of the LCD 14. Specifically, the display changing time t can be selected from "15 seconds," "1 minute," "10 minutes," "30 minutes," "1 hour," "4 hours," "do not change" and the like.

The main CPU 31 then receives a selection input of a performance time range T via the panel operating section 41 and the auxiliary CPU 32 (step S2104). The performance time range T is a time range during which the image display device 10 according to the present embodiment continuously performs a process of displaying still image data by the function of the "memory frame." Specifically, the performance time range T can be selected in hours, such as 8 hours, 12 hours, and 16 hours. Of course, the performance time range T can also be set in minutes, such as 8 hours and 30 minutes, for example.

The main CPU 31 thereafter receives a confirmation input via the panel operating section 41 and the auxiliary CPU (step S2105). The main CPU 31 then determines whether the confirmation input received in step S2105 indicates that the selection inputs of the various information are correct (whether "OK" is selected) (step S2106).

When the main CPU 31 determines in the determination process of step S2106 that "Back," "No" or the like is selected as the confirmation input received in step S2105 and that the confirmation input received in step S2105 does not indicate that the selection inputs of the various information are correct, the main CPU 31 repeats the process from step S2101. This allows selection inputs of various information to be performed again.

When the main CPU 31 determines in the determination process of step S2106 that the confirmation input received in step S2105 indicates that the selection inputs of the various information are correct, the main CPU 31 performs a process of registering a new "memory frame" (step S2107). Then the memory frame registering process represented in FIG. 30 is ended.

Incidentally, in the process of step S2107, the various information received in steps S2101 to S2104 is associated with each other and registered in a predetermined memory, and the "memory frame" is registered so as to be selectable in a menu. Description will be made supposing that a destination where information related to the "memory frame" is registered in the image display device 10 according to the present embodiment is the flash memory 33.

The image display device 10 according to the present embodiment can register a plurality of "memory frames" with different access destinations and different display modes by repeating the process represented in FIG. 30.

Incidentally, for example, the name of the access destination (a folder name, a medium name or the like), arbitrary title information, and the like can be added to each of the registered "memory frames." Thereby, even when a plurality of "memory frames" are registered, each of the registered "memory frames" can be distinguished from the other.

[Processes of Displaying Still Images by "Memory Frame"]

Processes of displaying still images by the "memory frame" which processes are performed in the image display device 10 according to the present embodiment will next be described with reference to FIGS. 31 to 34. Description in the following will be made of two display processes (a first display process and a second display process) by the "memory frame."

Incidentally, one of the first display process and the second display process can be selected according to characteristics, performance or the like of hardware resources of the image display device 10 on the side of a manufacturer manufacturing the image display device 10.

[First Display Process of Displaying Still Image by "Memory Frame"]

Figure 31:
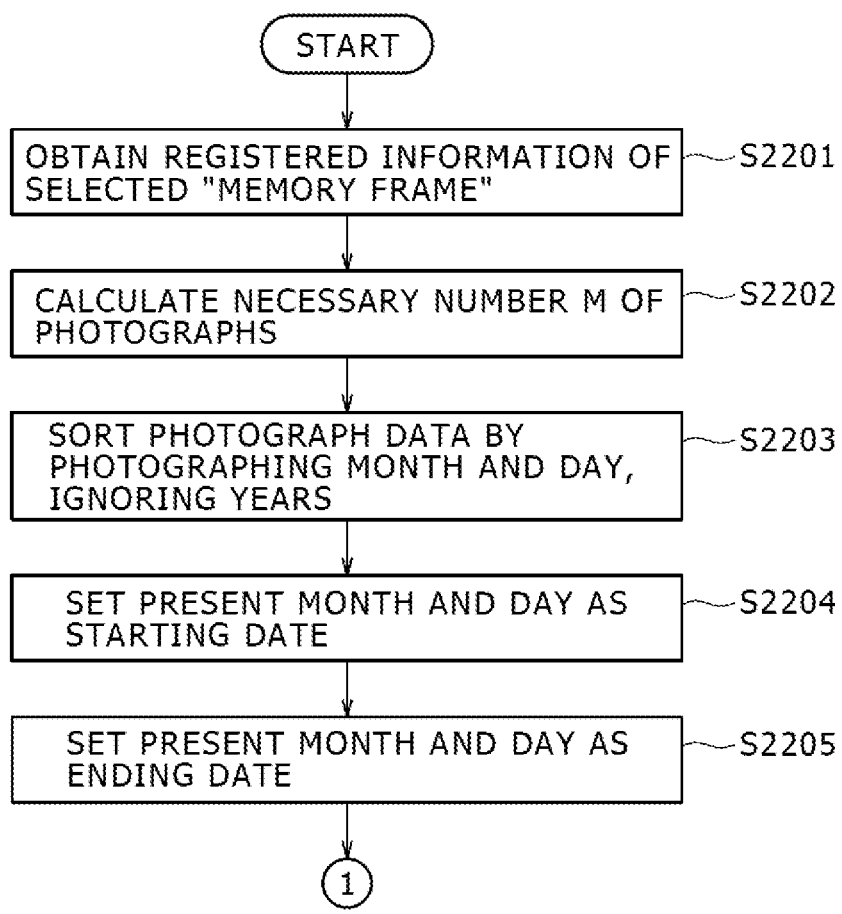
FIG. 31 is a flowchart of assistance in explaining a first display process of displaying an image by the "memory frame"
Figure 32:
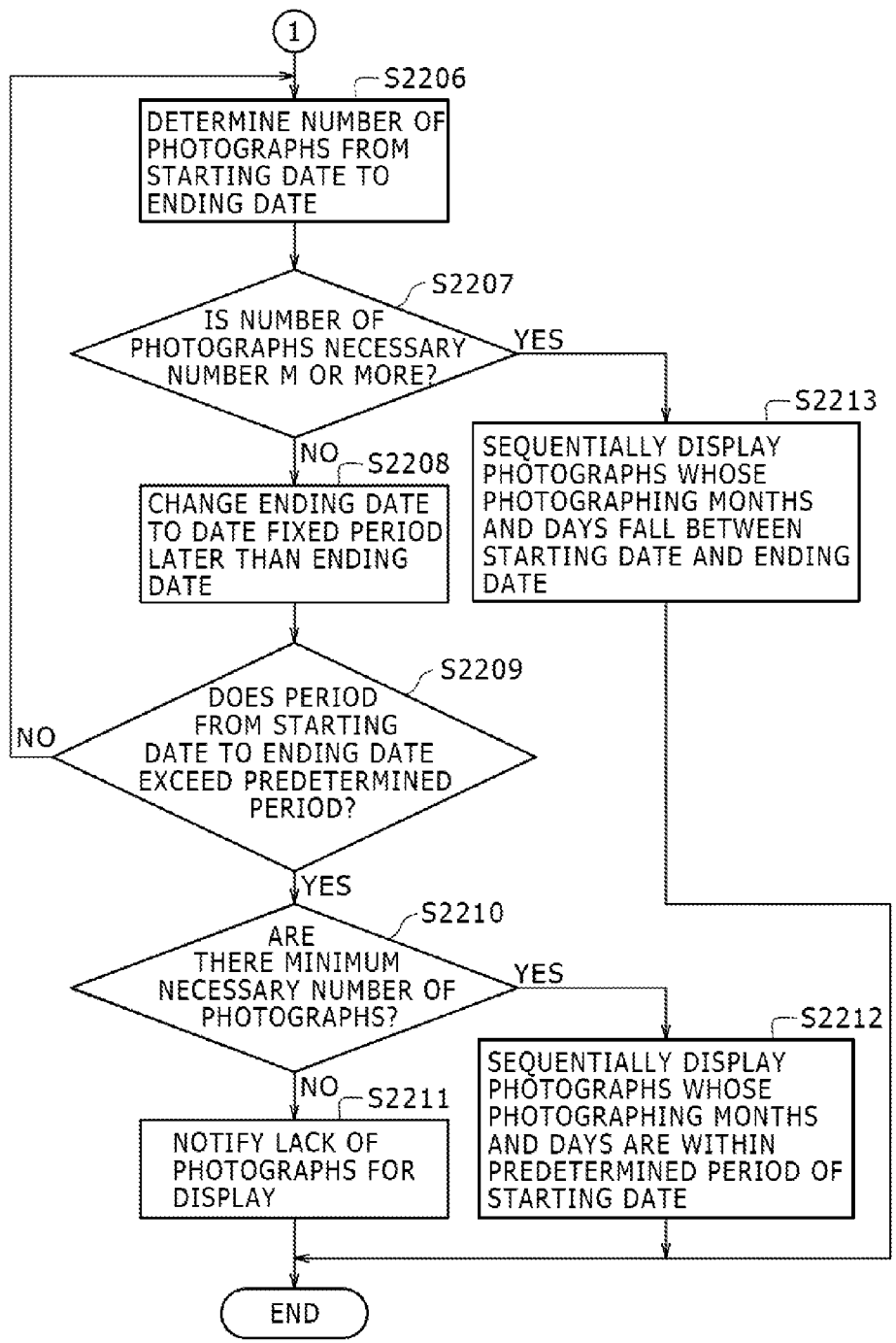
FIG. 32 is a flowchart continued from FIG. 31.

FIG. 31 and FIG. 32 are flowcharts of assistance in explaining a first display process of displaying an image by the "memory frame." The process represented in FIG. 31 and FIG. 32 is performed when the user selects a desired "memory frame" from a menu displayed on the display screen of the LCD 14 and having performable functions as selection items via the panel operating section 41. The process represented in FIG. 31 and FIG. 32 is also performed by the main CPU 31 and the auxiliary CPU 32.

When the process represented in FIG. 31 and FIG. 32 is performed, the main CPU 31 obtains the registered information of the selected "memory frame" registered in the flash memory 33 (step S2201). The registered information obtained in this step is information registered in the registering process described with reference to FIG. 30, and includes information indicating an access destination, the number N of display photographs of one screen, a display changing time t, a performance time range T, and the like.

The main CPU 31 then calculates the necessary number M of pieces of still image data to be displayed by the function of the selected "memory frame" on the basis of the information obtained in step S2201 (step S2202).

The process of step S2202 obtains the necessary number M of pieces of still image data to be reproduced by Equation (1) shown in the following.

$$\text{Necessary Number } M = \text{Number } N \text{ of Display Photographs of One Screen} \times \text{Performance Time Range } T \div \text{Display Changing Time } t \quad (1)$$

Suppose in this case that the necessary number N of display photographs of one screen is "2," that the performance time range T is "12 hours (720 minutes)," and that the display changing time t is "30 minutes." In this case, Necessary Number M=2×720 minutes÷30 minutes. Hence, in this case, the necessary number M of pieces of photograph data (still image data) to be displayed by the function of the "memory frame" is 48.

The main CPU 31 then sorts (rearranges) photograph data (still image data) recorded at the access destination associated with the "memory frame" by photographing month and day, ignoring years of photographing dates of the photograph data and starting with a present month and day (step S2203). This rearrangement is performed in the work area of the flash memory 33, for example. Incidentally, the rearrangement may be performed using a RAM not shown in the figure which RAM is connected to the main CPU 31.

Thereby a large number of pieces of photograph data (still image data) stored and retained at the predetermined access destination and having various photographing years, months, and days are rearranged in the predetermined work area with photographing months and days as a rearrangement key (sort key) such that the month and day of today is at a top and the month and day of yesterday is at an end.

Specifically, supposing that the present is February 22, the photograph data is rearranged on the basis of the photographing months and days in order of 2/22, 2/23, 2/24, . . . 2/19, 2/20, and 2/21. Thus, even when a large number of pieces of photograph data whose photographing years, months, and days extend over a plurality of years are processed, the photograph data of the access destination is rearranged on the basis of only the photographing months and days as in a case of there being a large number of pieces of photograph data taken in a single year, as it were.

The main CPU 31 next sets the present month and day as a starting date (step S2204). Specifically, the main CPU 31 obtains the present month and day from the clock circuit 40, and sets the present month and day as the starting date. Incidentally, in this example, the present year, month, and day is Feb. 22, 2008, and therefore February 22 is set as the starting date.

Similarly, the main CPU 31 sets the present month and day obtained in step S2204 also as an ending date (step S2205). As described above, in this example, the present year, month, and day is Feb. 22, 2008, and therefore February 22 is set also as the ending date.

Then, proceeding to the process represented in FIG. 31, the main CPU 31 identifies the number of photographs based on photograph data having a photographing month and day within a period from the starting date to the ending date, the starting date and the ending date being set in step S2204 and step S2205, from the photograph data rearranged in step S2203 (step S2206).

For example, in the example described with reference to FIG. 28 and FIG. 29, when the starting date and the ending date are both February 22, only photograph data taken on Feb. 22, 2008 is counted.

The main CPU 31 then determines whether the number of photographs identified in step S2206 is equal to or more than the necessary number M calculated in step S2202 (step S2207).

When determining in the determination process of step S2207 that the number of photographs identified in step S2206 is not equal to or more than the necessary number M, the main CPU 31 sets the ending date to a month and day a fixed period later than the ending date (step S2208). In this case, the fixed period can be an arbitrary period such as 1 week or 10 days, for example. However, the fixed period is basically one of a plurality of periods into which a predetermined period used in step S2209 to be described later is divided.

The main CPU 31 then determines whether the period from the starting date to the ending date exceeds a predetermined period (step S2209). In this case, the predetermined period serving as a reference for the determination in step S2209 is, for example, one month or the like, and is determined in advance.

Whether the period from the starting date to the ending date exceeds the predetermined period is thus determined in the determination process of step S2209 because lengthening the period from the starting date to the ending date may impair unity of the photographing period of extracted photograph data. For example, a sense of the seasons may be impaired with a photograph of sea bathing and a photograph of autumn leaves mixed with each other.

Incidentally, the predetermined period used in step S2209 is not limited to one month, but can be set in units of one week or set as a period such as two months or three months, which is obtained by dividing one year into six equal parts, four equal parts, three equal parts or the like.

When determining in the determination process of step S2209 that the period from the starting date to the ending date does not exceed the predetermined period, the main CPU 31 repeats the process from step S2206.

When determining in the determination process of step S2209 that the period from the starting date to the ending date exceeds the predetermined period, the main CPU 31 determines whether there is photograph data for a minimum necessary number of photographs (step S2210). The determination process of step S2210 determines whether the number of displayable photographs based on the photograph data is at least the number N of display photographs of one screen or more.

When determining in the determination process of step S2210 that there is no photograph data for forming a minimum necessary number of photographs, the main CPU 31 notifies a lack of photographs to be displayed (step S2211), and then ends the process represented in FIG. 31 and FIG. 32.

Specifically, in step S2211, the main CPU 31 displays a display message that displayable photographs are not present on the display screen of the LCD 14 via the LCD control circuit 44. Alternatively, the main CPU 31 emits the sound of a voice message that displayable photographs are not present from the speakers 47L and 47R via the audio processing section 46. Of course, both the display message and the voice message may be output.

When determining in the determination process of step S2210 that there is photograph data for forming a minimum necessary number of photographs, the main CPU 31 sequentially displays photographs based on the photograph data whose photographing months and days fall within the predetermined period of the starting date (step S2212). Thereafter the process represented in FIG. 31 and FIG. 32 is ended.

Incidentally, for photographs short of the necessary number M, it is possible to repeat display beginning with a photograph based on first photograph data, or display the photographs in a reverse direction beginning with a photograph based on photograph data used last. Of course, it is also possible to display the photographs based on the photograph data usable for display, and end the process by the "memory frame."

When determining in the determination process of step S2207 that the number of photographs identified in step S2206 is equal to or more than the necessary number M, the main CPU 31 sequentially displays the photographs based on photograph data for the necessary number M which photograph data has photographing months and days falling between the starting date and the ending date (step S2213). Thereafter the process represented in FIG. 31 and FIG. 32 is ended.

Thus, the "memory frame" can basically display photographs based on photograph data identified ignoring the years of photographing years, months, and days and directing attention to only the months and days of the photographing years, months, and days for the period of the performance time range T obtained in step S2201.

The first display process of displaying images by the "memory frame" described with reference to FIG. 31 and FIG. 32 can identify photograph data necessary for display while first setting the period from the starting date to the ending date to a minimum and gradually lengthening the period.

[Second Display Process of Displaying Image by "Memory Frame"]

The second display process of displaying an image by the "memory frame" will next be described. This second display process identifies photograph data for display according to a minimum number and an appropriate number of photographs to be displayed by the "memory frame."

Figure 33:
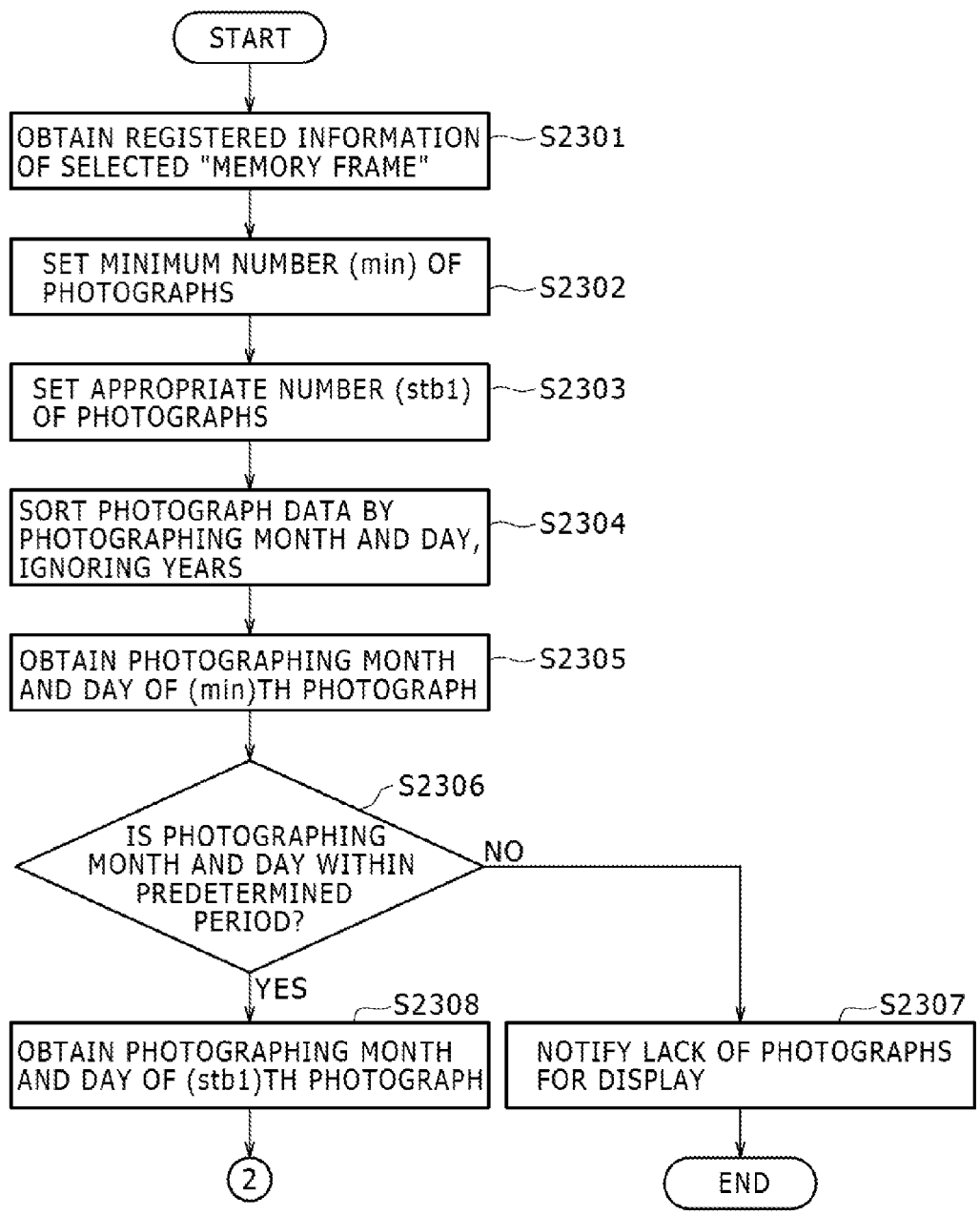
FIG. 33 is a flowchart of assistance in explaining a second display process of displaying an image by the "memory frame"
Figure 34:
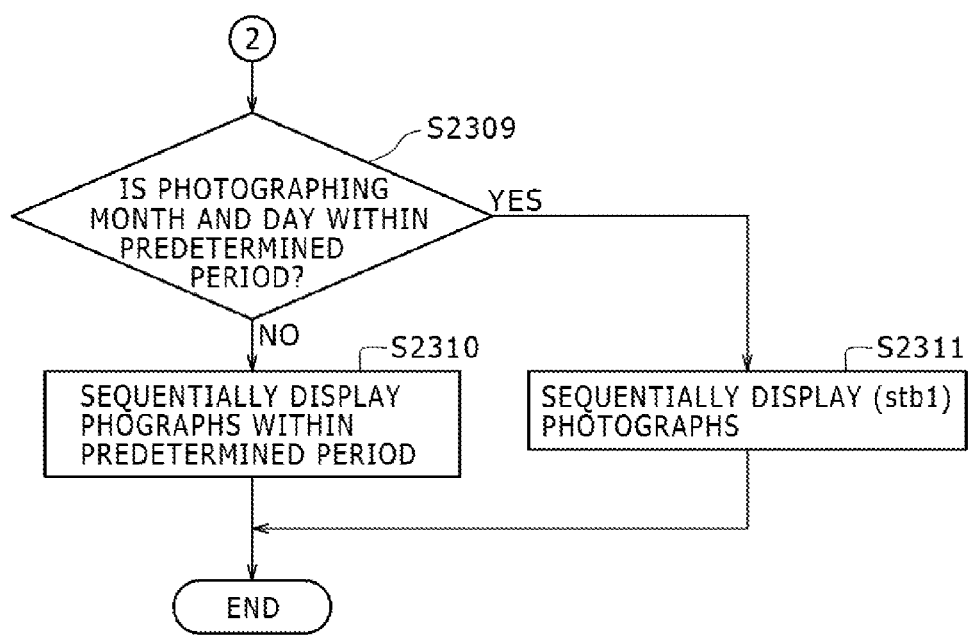
FIG. 34 is a flowchart continued from FIG. 33.

FIG. 33 and FIG. 34 are flowcharts of assistance in explaining the second display process of displaying an image by the "memory frame." The process represented in FIG. 33 and FIG. 34 is performed in the same manner as the first display process described above with reference to FIG. 31 and FIG. 32.

Specifically, the process represented in FIG. 33 and FIG. 34 is performed when the user selects a desired "memory frame" from a menu displayed on the display screen of the LCD 14 and having performable functions as selection items via the panel operating section 41. The process represented in FIG. 33 and FIG. 34 is also performed by the main CPU 31 and the auxiliary CPU 32.

Also in the second display process, when the process represented in FIG. 33 and FIG. 34 is performed, the main CPU 31 obtains the registered information of the selected "memory frame" registered in the flash memory 33 (step S2301). The registered information obtained in this step is information registered in the registering process described with reference to FIG. 30, and includes information indicating an access destination, the number N of display photographs of one screen, a display changing time t, a performance time range T, and the like.

The main CPU 31 then sets the number N of display photographs of one screen as a minimum necessary number of photographs (min) (step S2302). In addition, the main CPU 31 calculates a number (necessary number) M of display photographs necessary for one day on the basis of the number N of display photographs of one screen, the display changing time t, and the performance time range T, and sets the necessary number M as an appropriate number of photographs (stb1) (step S2303).

The process of step S2303 calculates the necessary number M according to the above-described Equation (1) as with the process of step S2202 shown in FIG. 31, and sets the necessary number M as an appropriate number of photographs (stb1).

Thus, supposing that the necessary number N of display photographs of one screen is "2," that the operation time T is "12 hours (720 minutes)," and that the display changing time t is "30 minutes," Necessary Number M=2×720 minutes÷30 minutes. In this example, the value of 48 is set as the appropriate number of photographs (stb1).

The main CPU 31 then sorts (rearranges) photograph data (still image data) recorded at the access destination associated with the "memory frame" by photographing month and day, ignoring years of photographing dates of the photograph data and starting with a present month and day (step S2304).

The process of step S2304 is similar to the process of step S2203 shown in FIG. 31. The process of step S2304 rearranges the photograph data as processing objects which photograph data has photographing years, months, and days extending over a plurality of years such that the month and day of today is at a top and the month and day of yesterday is at an end. Specifically, supposing that the present is February 22, the photograph data is rearranged in order of 2/22, 2/23, 2/24, . . . 2/19, 2/20, and 2/21.

Incidentally, the rearrangement in step S2304 is performed in the work area of the flash memory 33, for example. Incidentally, the rearrangement may be performed using a RAM not shown in the figure which RAM is connected to the main CPU 31.

The main CPU 31 then obtains the photographing month and day of a (min)th piece of photograph data from the photograph data rearranged in step S2304 (step S2305). Specifically, when the minimum number of photographs (min) is two, the main CPU 31 obtains the photographing month and day of a second piece of photograph data from the top of the photograph data rearranged in step S2304.

The main CPU 31 determines whether the photographing month and day of the photograph data which photographing month and day is obtained in step S2305 is within a predetermined period (step S2306). The predetermined period is determined in advance. A present month and day being set as a starting date, the predetermined period is a period from the starting date to a month and day after the passage of one month from the starting date, for example. In this example, when the present month and day is February 22, a period from February 22 to March 21, which is one month later than February 22, is the predetermined period.

Incidentally, the predetermined period used in step S2306 is not limited to one month, but can be set in units of one week or set as a period such as two months or three months, which is obtained by dividing one year into six equal parts, four equal parts, three equal parts or the like.

When determining in the determination process of step S2306 that the photographing month and day of the (min)th piece of photograph data is not within the predetermined period, the main CPU 31 notifies a lack of photograph data of photographs to be displayed (step S2307), and then ends the process represented in FIG. 33 and FIG. 34.

Specifically, in step S2307, the main CPU 31 displays a display message that displayable photographs are not present on the display screen of the LCD 14 via the LCD control circuit 44. Alternatively, the main CPU 31 emits the sound of a voice message that displayable photographs are not present from the speakers 47L and 47R via the audio processing section 46. Of course, both the display message and the voice message may be output.

When determining in the determination process of step S2306 that the photographing month and day of the (min)th piece of photograph data is within the predetermined period, the main CPU 31 obtains the photographing month and day of an (stb1)th photograph (step S2308). Specifically, when the appropriate number of photographs (stb1) is 48 as described above, the main CPU 31 obtains the photographing month and day of a 48th piece of photograph data from the top of the photograph data rearranged in step S2304.

Thereafter proceeding to the process represented in FIG. 34, the main CPU 31 determines whether the photographing month and day of the photograph data which photographing month and day is obtained in step S2308 is within the predetermined period (step S2309). The determination process of step S2309 is similar to the determination process of step S2306. The determination process of step S2309 determines whether the photographing month and day of the (stb1)th photograph falls within the predetermined period.

Incidentally, the predetermined period used in step S2309 is the same as the predetermined period used in step S2306.

When determining in the determination process of step S2309 that the photographing month and day of the (stb1)th piece of photograph data is not within the predetermined period, the main CPU 31 sequentially displays photographs within the predetermined period (step S2310).

Specifically, in step S2310, the present month and day is set as a starting date, usable photograph data having months and days within the predetermined period of the starting date as photographing months and days is extracted, and photographs based on the extracted photograph data are sequentially displayed. Then, after the process of step S2310, the process represented in FIG. 33 and FIG. 34 is ended.

Incidentally, for photographs short of the necessary number M, it is possible to repeat display beginning with a photograph based on first photograph data, or display the photographs in a reverse direction beginning with a photograph based on photograph data used last. Of course, it is also possible to display the photographs based on the photograph data usable for display, and end the process by the "memory frame."

When determining in the determination process of step S2309 that the photographing month and day of the (stb1)th piece of photograph data is within the predetermined period, the main CPU 31 sequentially displays (stb1) photographs (step S2311).

Specifically, in step S2311, photographs based on photograph data for the (stb1) photographs from the top of the photograph data rearranged in step S2304 are displayed sequentially. Then, after the process of step S2311, the process represented in FIG. 33 and FIG. 34 is ended.

Thus, in the second display process of displaying an image by the "memory frame" function described with reference to FIG. 33 and FIG. 34, whether image data necessary for display exists at the access destination is checked first. When photograph data for a minimum number of photographs is not present, photograph display is not made. However, when there is photograph data for a minimum number of photographs or more, a photograph displaying process is performed according to the photograph data.

Incidentally, both in the case of the first display process described with reference to FIG. 31 and FIG. 32 and in the case of the second display process described with reference to FIG. 33 and FIG. 34, photographs can be displayed in various orders. For example, photographs can be displayed in order into which the photograph data is rearranged in step S2203 or step S2304.

It is also possible to extract only photograph data to be displayed, rearrange the extracted photograph data in descending order of photographing year, month, and day or photographing month and day or in ascending order of photographing year, month, and day or photographing month and day, and display the photograph data in that order. In addition, photograph data to be displayed can be displayed according to a certain rule, by which the photograph data to be displayed is rearranged in order of the file name of the photograph data and then displayed, for example. Further, photograph data to be displayed can be reproduced in random order by using random numbers or the like.

[Photo Clock Frame]

The image display device 10 according to the present embodiment also realizes a function of "photo clock frame" as one of new functions using the new concept of "frame" described above. An outline of the function of the "photo clock frame" is simply illustrated as follows.

The "photo clock frame" rearranges a large number of pieces of still image data (photograph data) stored at a predetermined access destination, directing attention to only the photographing time of a photographing date and time (a photographing year, month, and day and photographing time) added to each of the pieces of still image data. Then, the "photo clock frame" sets a reproduction time as a reference time, extracts still image data within a predetermined period (predetermined time) of the reference time as still image data to be reproduced from the rearranged still image data, and sequentially reproduces the still image data to be reproduced.

Thus, in the case of the "photo clock frame," even when still image data stored at the access destination extends over a plurality of years, the still image data is rearranged with attention directed to only the photographing time of the still image data. Therefore, supposing that the photographing time is represented in hours and minutes, all the still image data at the access destination, which still image data may have different photographing years, months, and days, is rearranged between 0:00 and 23:59.

In other words, in the case of the "photo clock frame," all the still image data stored at the access destination is rearranged into the period of 24 hours from 0 a.m. to 12 p.m. Incidentally, while 0 a.m. and 12 p.m. both indicate 12 midnight, 0 a.m. means a starting point of one day, and 12 p.m. means an ending point of one day.

In the case of the "photo clock frame," only photograph data close to the reproduction time is extracted from the still image data rearranged on the basis of the photographing time, and then displayed. It is thereby possible to automatically display photographs corresponding to a reproduction time period, such as displaying photographs of sun rises or the like in a morning time period and displaying photographs of night views or the like in a night time period, for example.

Incidentally, also in the case of the "photo clock frame," the user can select a display mode suited to a purpose from the four display modes described with reference to FIGS. 4A to 4D. In the case of the above-described "memory frame," a calendar function is realized by displaying a present month and day and a present day of the week. On the other hand, in the case of the "photo clock frame," the main CPU 31 obtains a present time from the clock circuit 40 and displays the present time, whereby a clock function is realized.

In addition, the "photo clock frame" can change the display color of character information displaying the present time according to a time period. For example, the present time is displayed in blue characters from 5 a.m. to 10:59 a.m. The present time is displayed in yellow characters from 11 a.m. to 3:59 p.m. The present time is displayed in red characters from 4 p.m. to 6:59 p.m. The present time is displayed in navy-blue characters from 7 p.m. to 4:59 a.m. Thus, a time period can also be represented by the display color of the present time.

Thus, the "photo clock frame" extracts photograph data to be displayed directing attention to only the photographing time of the photograph data, and displays the photograph data to be displayed. Thereby photographs taken during the same time period in the past as that of the reproduction time can be displayed.

Incidentally, also in the case of the "photo clock frame," a process of registering the "photo clock frame" is performed as in the case of the process of registering the "memory frame" as described with reference to FIG. 30. This process of registering the "photo clock frame" is also performed when the user selects an item "CREATE NEW FRAME" via the panel operating section 41 from a menu displayed on the display screen of the LCD 14 and having performable functions as selection items.

Also in the case of the "photo clock frame," information including an access destination, the number N of display photographs of one screen, a display changing time t, a performance time range T, and the like is registered. In addition, in the case of the "photo clock frame," the present time is displayed together with a still image, and information on the display mode of the present time, such as a 12-hour representation or a 24-hour representation, a display color, and digital display or analog display, can be registered.

[Processes of Displaying Images by "Photo Clock Frame" Function]

Processes of displaying still images when the function of the "photo clock frame" is used in the image display device 10 according to the present embodiment will next be described with reference to FIGS. 35 to 38. Description in the following will be made of two display processes (a first display process and a second display process) by the "photo clock frame."

Incidentally, one of the first display process and the second display process can be selected according to characteristics, performance or the like of hardware resources of the image display device 10 on the side of a manufacturer manufacturing the image display device 10.

[First Display Process of Displaying Image by "Photo Clock Frame" Function]

Figure 35:
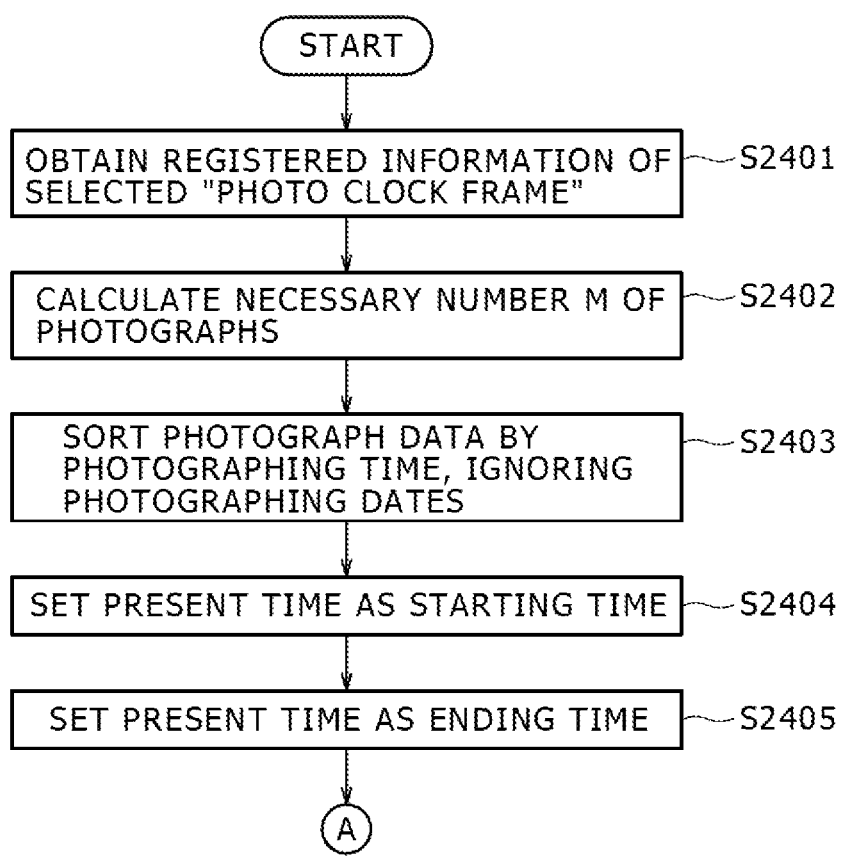
FIG. 35 is a flowchart of assistance in explaining a first display process of displaying an image by a "photo clock frame"
Figure 36:
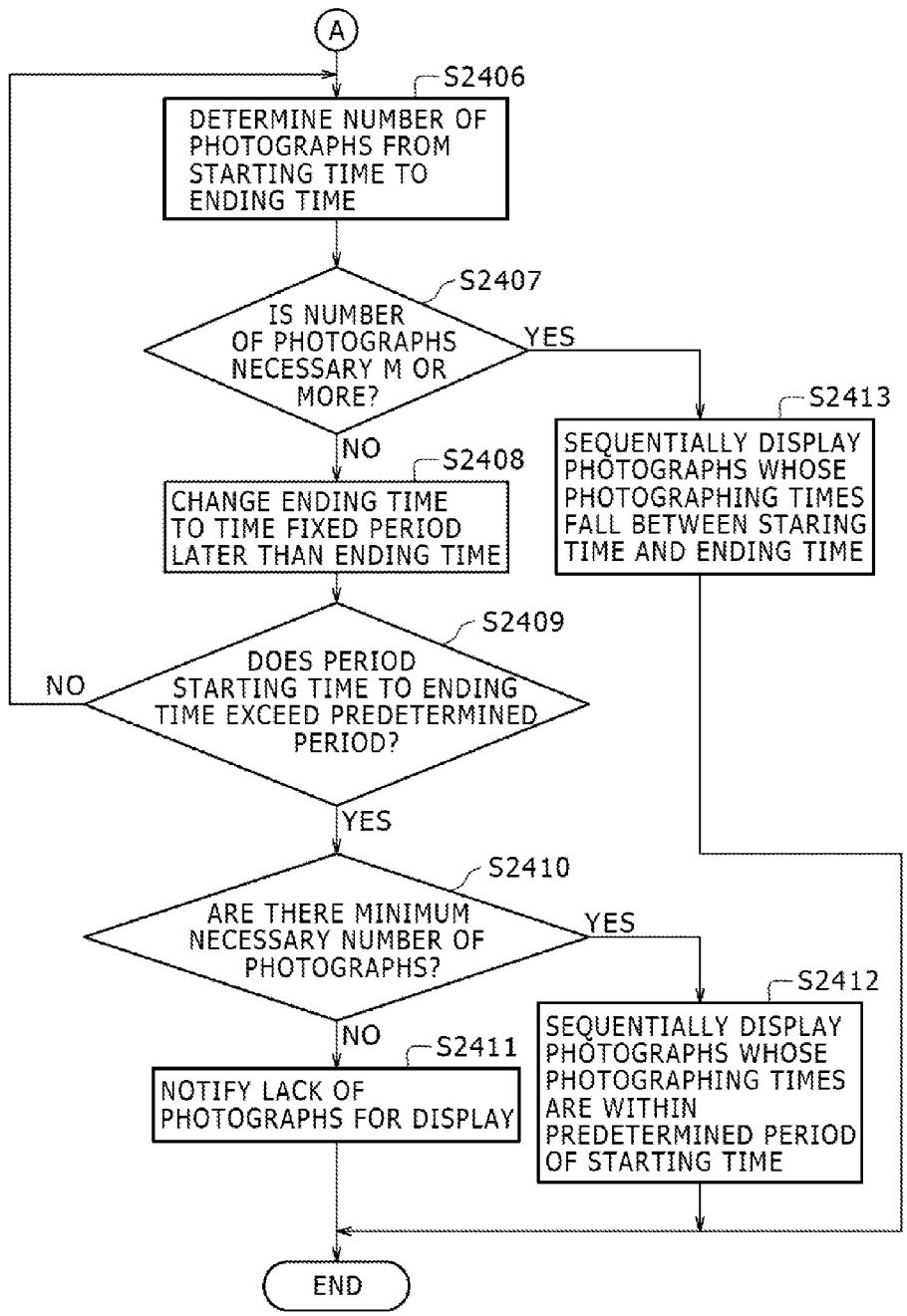
FIG. 36 is a flowchart continued from FIG. 35.

FIG. 35 and FIG. 36 are flowcharts of assistance in explaining a first display process of displaying an image by the "photo clock frame." The process represented in FIG. 35 and FIG. 36 is performed when the user selects a desired "photo clock frame" from a menu displayed on the display screen of the LCD 14 and having performable functions as selection items via the panel operating section 41. The process represented in FIG. 35 and FIG. 36 is also performed by the main CPU 31 and the auxiliary CPU 32.

When the process represented in FIG. 35 and FIG. 36 is performed, the main CPU 31 obtains the registered information of the selected "photo clock frame" registered in advance in the flash memory 33 (step S2401). As in the case of the above-described "memory frame," the registered information obtained in this step is information registered by the registering process described with reference to FIG. 30. Specifically, the registered information includes information indicating an access destination, the number N of display photographs of one screen, a display changing time t, a performance time range T, and the like.

The main CPU 31 then calculates the necessary number M of pieces of still image data to be displayed by the function of the selected "photo clock frame" on the basis of the information obtained in step S2401 (step S2402).

As with the process of step S2202 in the first display process of the "memory frame" which process is represented in FIG. 31, the process of step S2402 obtains the necessary number M of pieces of still image data to be reproduced by the above-described Equation (1).

Supposing in this case that the necessary number N of display photographs of one screen is "2," that the performance time range T is "1 hour (60 minutes)," and that the display changing time t is "10 minutes," in this case, Necessary Number M=2×60 minutes÷10 minutes.

Hence, in this case, the necessary number M of pieces of photograph data (still image data) to be displayed per hour as the performance time range T by the function of the "photo clock frame" is 12.

The main CPU 31 then sorts (rearranges) photograph data (still image data) recorded at the access destination associated with the "photo clock frame" by photographing time, ignoring years, months, and days of photographing dates of the photograph data and starting with a present time (step S2403).

This rearrangement is performed in the work area of the flash memory 33, for example. Incidentally, the rearrangement may be performed using a RAM not shown in the figure which RAM is connected to the main CPU 31.

Thereby a large number of pieces of photograph data (still image data) stored and retained at the predetermined access destination and having various photographing dates and times are rearranged with the photographing times as a rearrangement key (sort key) such that the present time is at a top.

Thus, even when a large number of pieces of photograph data whose photographing dates and times extend over a plurality of years are processed, the photograph data of the access destination is rearranged on the basis of only the photographing times as in a case of there being a large number of pieces of photograph data taken on a same day, as it were.

The main CPU 31 next sets the present time as a starting time (step S2404). Specifically, the main CPU 31 obtains the present time from the clock circuit 40, and sets the present time as the starting time. For example, when the present time is 7:23 a.m., the data of 7:23 a.m. is set as the starting time.

Similarly, the main CPU 31 sets the present time obtained in step S2404 also as an ending time (step S2405). That is, the process of step S2405 sets the same time as the time set as the starting time in step S2404 as the ending time.

Then, proceeding to the process represented in FIG. 36, the main CPU 31 identifies the number of photographs based on photograph data having a photographing time within a period from the starting time to the ending time, the starting time and the ending time being set in step S2404 and step S2405, from the photograph data rearranged in step S2403 (step S2406).

Thus, when the data of 7:23 a.m. is set as the starting time and the ending time as described above, the number of pieces of photograph data having a time from 7:23 a.m. to 7:23 a.m. as photographing time is counted and identified.

The main CPU 31 then determines whether the number of photographs identified in step S2406 is equal to or more than the necessary number M calculated in step S2402 (step S2407).

When determining in the determination process of step S2407 that the number of photographs identified in step S2406 is not equal to or more than the necessary number M, the main CPU 31 sets the ending time to a time after a fixed period (step S2408). In this case, the fixed period can be an arbitrary period such as 10 minutes or 20 minutes, for example. However, the fixed period is basically one of a plurality of time ranges into which a predetermined period used in step S2409 to be described later is divided.

The main CPU 31 then determines whether the period from the starting time to the ending time exceeds a predetermined period determined in advance (step S2409). In this case, the predetermined period serving as a reference for the determination in step S2409 is the same time range as the performance time range T, which is a time range during which photographs are displayed by the "photo clock frame." Therefore, when the performance time range T is, for example, 1 hour as described above, the predetermined period serving as a reference for the determination in step S2409 is also 1 hour (60 minutes).

Whether the period from the starting time to the ending time exceeds the predetermined period is thus determined in the determination process of step S2409 because lengthening the period from the starting time to the ending time may result in photograph data of different time periods being typically extracted. For example, a sense of unity due to the time period may be impaired with a photograph of morning and a photograph of noon mixed with each other.

When determining in the determination process of step S2409 that the period from the starting time to the ending time does not exceed the predetermined period, the main CPU 31 repeats the process from step S2406.

When determining in the determination process of step S2409 that the period from the starting time to the ending time exceeds the predetermined period, the main CPU 31 determines whether there is photograph data for a minimum necessary number of photographs (step S2410). The determination process of step S2410 determines whether the number of displayable photographs based on the photograph data is at least the number N of display photographs of one screen or more.

When determining in the determination process of step S2410 that there is no photograph data for forming a minimum necessary number of photographs, the main CPU 31 notifies a lack of photographs to be displayed (step S2411), and then ends the process represented in FIG. 35 and FIG. 36.

Specifically, in step S2411, the main CPU 31 displays a display message that displayable photographs are not present on the display screen of the LCD 14 via the LCD control circuit 44. Alternatively, the main CPU 31 emits the sound of a voice message that displayable photographs are not present from the speakers 47L and 47R via the audio processing section 46. Of course, both the display message and the voice message may be output.

When determining in the determination process of step S2410 that there is photograph data for forming a minimum necessary number of photographs, the main CPU 31 sequentially displays photographs based on the photograph data whose photographing times fall within the predetermined period of the starting time (step S2412). Thereafter the process represented in FIG. 35 and FIG. 36 is ended.

When determining in the determination process of step S2407 that the number of photographs identified in step S2406 is equal to or more than the necessary number M, the main CPU 31 sequentially displays the photographs based on photograph data for the necessary number M which photograph data has photographing times falling between the starting time and the ending time (step S2413). Thereafter the process represented in FIG. 35 and FIG. 36 is ended.

Thus, the "photo clock frame" can basically display photographs based on photograph data identified ignoring the years, months, and days of photographing dates and times and directing attention to only the photographing times of the photographing dates and times for the period of the performance time range T obtained in step S2401.

After displaying photographs for the performance time range T according to the process represented in FIG. 35 and FIG. 36, the image display device 10 according to the present embodiment performs the process of FIG. 35 and FIG. 36 again for a next new performance time range (a next period of one hour in the above-described example), and performs a photograph data displaying process according to the function of the same "photo clock frame" for a new time period.

Thus, in the case of the "photo clock frame," after the process of displaying photographs based on photograph data for the set performance time range T is ended, a process of displaying photographs based on similar photograph data is performed in a new time period (next time period of the performance time range T).

In the case of the "photo clock frame," a total performance time period can also be set to display photographs by the function of the "photo clock frame" from 7 a.m. to 7 p.m., for example. In addition, photographs can be displayed continuously for 24 hours by the function of the "photo clock frame."

Thus, the first display process of displaying images by the "photo clock frame" described with reference to FIG. 35 and FIG. 36 can identify photograph data necessary for display while first setting the period from the starting time to the ending time to a minimum and gradually lengthening the period.

[Second Display Process of Displaying Image by "Photo Clock Frame"]

The second display process of displaying an image by the "photo clock frame" will next be described. This second display process identifies photograph data for display according to a minimum number and an appropriate number of photographs to be displayed by the "photo clock frame."

Figure 37:
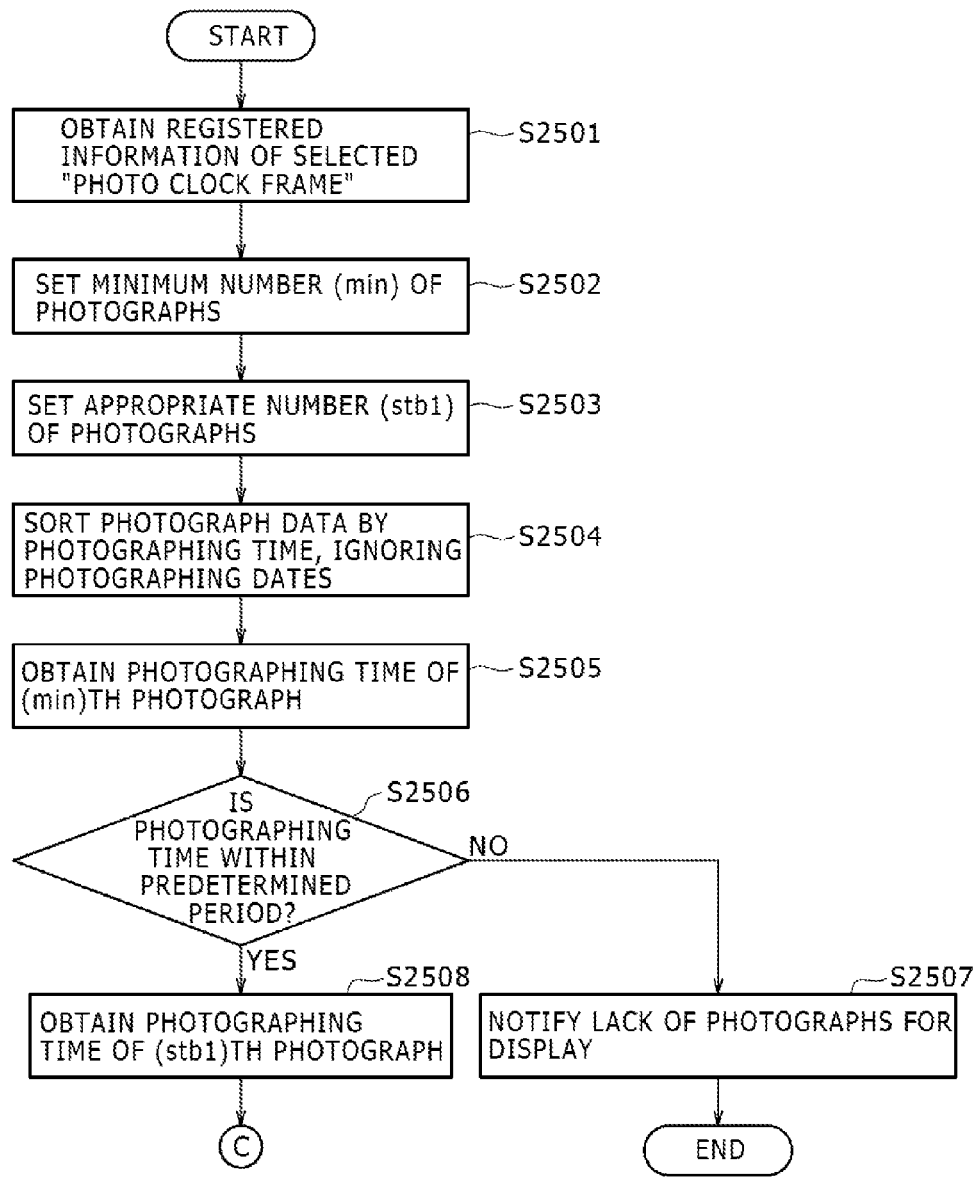
FIG. 37 is a flowchart of assistance in explaining a second display process of displaying an image by the "photo clock frame"
Figure 38:
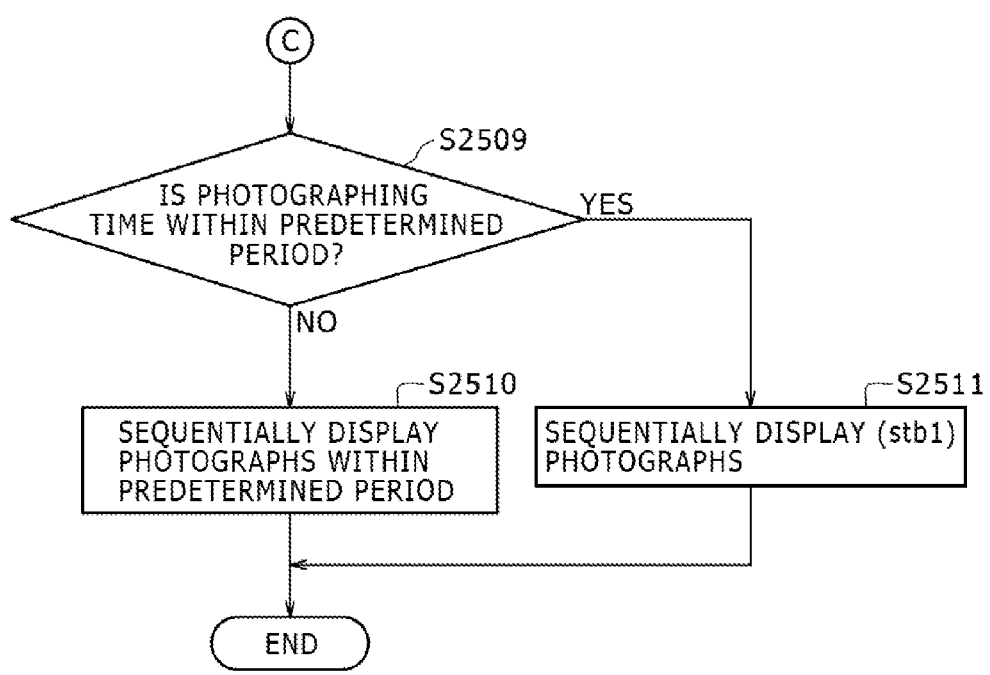
FIG. 38 is a flowchart continued from FIG. 37.

FIG. 37 and FIG. 38 are flowcharts of assistance in explaining the second display process of displaying an image by the "photo clock frame." The process represented in FIG. 37 and FIG. 38 is performed in the same manner as the first display process described above with reference to FIG. 35 and FIG. 36.

Specifically, the process represented in FIG. 37 and FIG. 38 is performed when the user selects a desired "photo clock frame" from a menu displayed on the display screen of the LCD 14 and having performable functions as selection items via the panel operating section 41. The process represented in FIG. 37 and FIG. 38 is also performed by the main CPU 31 and the auxiliary CPU 32.

Also in the second display process, when the process represented in FIG. 37 and FIG. 38 is performed, the main CPU 31 obtains the registered information of the selected "photo clock frame" registered in the flash memory 33 (step S2501). As in the case of the above-described "memory frame," the registered information obtained in this step is information registered by the registering process described with reference to FIG. 30, for example, and includes information indicating an access destination, the number N of display photographs of one screen, a display changing time t, a performance time range T, and the like.

The main CPU 31 then sets the number N of display photographs of one screen as a minimum necessary number of photographs (min) (step S2502). In addition, the main CPU 31 calculates a number (necessary number) M of display photographs necessary for one day on the basis of the number N of display photographs of one screen, the display changing time t, and the performance time range T, and sets the necessary number M as an appropriate number of photographs (stb1) (step S2503).

The process of step S2503 calculates the necessary number M according to the above-described Equation (1) as with the process of step S2402 shown in FIG. 35, and sets the necessary number M as an appropriate number of photographs (stb1).

Thus, supposing that the necessary number N of display photographs of one screen is "2," that the operation time T is "1 hour (60 minutes)," and that the display changing time t is "10 minutes," Necessary Number M=2×60 minutes÷10 minutes. In this example, the value of 12 is set as the appropriate number of photographs (stb1).

The main CPU 31 then sorts (rearranges) photograph data (still image data) recorded at the access destination associated with the "photo clock frame" by photographing time, ignoring years, months, and days of photographing dates and times of the photograph data and starting with a present time (step S2504).

This rearrangement is performed in the work area of the flash memory 33, for example. Incidentally, the rearrangement may be performed using a RAM not shown in the figure which RAM is connected to the main CPU 31.

Thereby a large number of pieces of photograph data (still image data) stored and retained at the predetermined access destination and having various photographing dates and times are rearranged with the photographing times as a rearrangement key (sort key) such that the present time is at a top.

Thus, even when a large number of pieces of photograph data whose photographing dates and times extend over a plurality of years are processed, the photograph data of the access destination is rearranged on the basis of only the photographing times as in a case of there being a large number of pieces of photograph data taken on a same day, as it were.

The main CPU 31 then obtains the photographing time of a (min)th piece of photograph data from the photograph data rearranged in step S2504 (step S2505). Specifically, when the minimum number of photographs (min) is two, the main CPU 31 obtains the photographing time of a second piece of photograph data from the top of the photograph data rearranged in step S2504.

The main CPU 31 determines whether the photographing time of the photograph data which photographing time is obtained in step S2505 is within a predetermined period (step S2506). The predetermined period is determined in advance. In the present embodiment, the performance time range T in the process of registering the "photo clock frame" is, for example, 1 hour (60 minutes). Thus, in this example, a period from a starting time to a time after the passage of 60 minutes from the starting time, for example, is set as the predetermined period as a reference for the determination in step S2506.

When determining in the determination process of step S2506 that the photographing time of the (min)th piece of photograph data is not within the predetermined period, the main CPU 31 notifies a lack of photograph data of photographs to be displayed (step S2507), and then ends the process represented in FIG. 37 and FIG. 38.

Specifically, in step S2507, the main CPU 31 displays a display message that displayable photographs are not present on the display screen of the LCD 14 via the LCD control circuit 44. Alternatively, the main CPU 31 emits the sound of a voice message that displayable photographs are not present from the speakers 47L and 47R via the audio processing section 46. Of course, both the display message and the voice message may be output.

When determining in the determination process of step S2506 that the photographing time of the (min)th piece of photograph data is within the predetermined period, the main CPU 31 obtains the photographing time of an (stb1)th photograph (step S2508). Specifically, when the appropriate number of photographs (stb1) is 12 as described above, the main CPU 31 obtains the photographing time of a 12th piece of photograph data from the top of the photograph data rearranged in step S2504.

Thereafter proceeding to the process represented in FIG. 38, the main CPU 31 determines whether the photographing time of the photograph data which photographing time is obtained in step S2508 is within the predetermined period (step S2509). The determination process of step S2509 is similar to the determination process of step S2506. The determination process of step S2509 determines whether the photographing time of the (stb1)th photograph falls within the predetermined period.

Incidentally, the predetermined period used in step S2509 is the same as the predetermined period used in step S2506.

When determining in the determination process of step S2509 that the photographing time of the (stb1)th piece of photograph data is not within the predetermined period, the main CPU 31 sequentially displays photographs within the predetermined period of the starting time (step S2510).

Specifically, in step S2510, the present time is set as a starting time, usable photograph data having times within the predetermined period of the starting time as photographing times is extracted, and photographs based on the extracted photograph data are sequentially displayed. Then, after the process of step S2510, the process represented in FIG. 37 and FIG. 38 is ended.

When determining in the determination process of step S2509 that the photographing time of the (stb1)th piece of photograph data is within the predetermined period, the main CPU 31 sequentially displays (stb1) photographs (step S2511).

Specifically, in step S2511, photographs based on photograph data for the (stb1) photographs from the top of the photograph data rearranged in step S2504 are displayed sequentially. Then, after the process of step S2511, the process represented in FIG. 37 and FIG. 38 is ended.

Thus, in the second display process of displaying an image by the "photo clock frame" function described with reference to FIG. 37 and FIG. 38, whether image data necessary for display exists at the access destination is checked first. When photograph data for a minimum number of photographs is not present, photograph display is not made. However, when there is photograph data for a minimum number of photographs or more, a photograph displaying process is performed according to the photograph data.

After displaying photographs for the performance time range T according to the process represented in FIG. 37 and FIG. 38, the image display device 10 according to the present embodiment performs the process of FIG. 37 and FIG. 38 again for a next new performance time range (a next period of one hour in the above-described example), and performs a photograph data displaying process according to the function of the same "photo clock frame" for a new time period.

Thus, in the case of the "photo clock frame," after the process of displaying photographs based on photograph data for the set performance time range T is ended, a process of displaying photographs based on similar photograph data is performed in a new time period (next time period of the performance time range T).

In the case of the "photo clock frame," a total performance time period can also be set to display photographs by the function of the "photo clock frame" from 7 a.m. to 7 p.m., for example. In addition, photographs can be displayed continuously for 24 hours by the function of the "photo clock frame."

Incidentally, in the case of the "photo clock frame," as in the case of the "memory frame," photographs can be displayed in various orders. For example, photographs can be displayed in order into which the photograph data is rearranged in step S2403 or step S2504.

It is also possible to extract only photograph data to be displayed, rearrange the extracted photograph data in descending order of photographing year, month, and day or photographing month and day or in ascending order of photographing year, month, and day or photographing month and day, and display the photograph data in that order. In addition, photograph data to be displayed can be displayed according to a certain rule, by which the photograph data to be displayed is rearranged in order of the file name of the photograph data and then displayed, for example. Further, photograph data to be displayed can be reproduced in random order by using random numbers or the like.

Incidentally, in the above-described embodiment, the respective functions of rearranging means and extracting means are realized mainly by the main CPU 31. The functions of reproducing means are realized by collaboration between the main CPU 31, the LCD control circuit 44, and the LCD 14.

The respective functions of period changing means, reproduction controlling means, and determining means are also realized mainly by the main CPU 31.

A method and a program as inventions of the present application are mainly applied to the processes represented in the flowcharts of FIGS. 31 to 38.

Specifically, a rearranging process is performed in step S2203 in FIG. 31. A process of extracting image data to be displayed is performed by the process of steps S2206 to S2210 in FIG. 32. A reproducing process is performed in each of steps S2212 and S2213 in FIG. 32.

Similarly, a rearranging process is performed in step S2304 in FIG. 33. A process of extracting image data to be displayed is performed by the process of steps S2305 in FIG. 33 to S2309 in FIG. 34. A reproducing process is performed in each of steps S2310 and S2311 in FIG. 34.

A rearranging process is performed in step S2403 in FIG. 35. A process of extracting image data to be displayed is performed by the process of steps S2406 to S2410 in FIG. 36. A reproducing process is performed in each of steps S2412 and S2413 in FIG. 36.

Similarly, a rearranging process is performed in step S2504 in FIG. 37. A process of extracting image data to be displayed is performed by the process of steps S2505 in FIG. 37 to S2509 in FIG. 38. A reproducing process is performed in each of steps S2510 and S2511 in FIG. 38.

Content data extraction is performed by the process of step S2206 in FIG. 32. A period changing process is performed by the process of step S2207 and step S2208. A process of extracting content data again is performed by the loop process of step S2209 and step S2206.

A process of reproducing content data in a predetermined reproduction mode is performed by the process of step S2212 in FIG. 32. A process of determining the number of pieces of content data to be reproduced is performed by the process of step S2202 in FIG. 31.

Similarly, content data extraction is performed by the process of step S2406 in FIG. 36. A period changing process is performed by the process of step S2407 and step S2408. A process of extracting content data again is performed by the loop process of step S2409 and step S2406.

A process of reproducing content data in a predetermined reproduction mode is performed by the process of step S2412 in FIG. 36. A process of determining the number of pieces of content data to be reproduced is performed by the process of step S2402 in FIG. 35.

[Usability of Content Data Other than Still Image Data]

The foregoing embodiment has been described above supposing that content data to be reproduced is still image data (photograph data). However, the present invention is not limited to this. The content data to be reproduced may be graphics data, moving image data, or audio data of musical pieces and the like.

For example, photographing dates and times are added to moving image data obtained by photographing using a digital video camera or the like. Thus, using the photographing dates and times, as in the case of photograph data in the foregoing embodiment, the moving image data is rearranged on the basis of only photographing months and days. Then, a moving image for a fixed time of each piece of moving image data can be displayed in the modes described with reference to FIGS. 4A to 4D. In addition, the moving image data is rearranged on the basis of only the photographing times of the moving image data. Then, a moving image for a fixed time of each piece of moving image data can be displayed in the modes described with reference to FIGS. 4A to 4D.

Some audio data of musical pieces or the like has information such as release dates, for example, added thereto. Thus, as in the case of photograph data in the foregoing embodiment, the audio data of musical pieces is rearranged on the basis of only release months and days. Then, sound for a fixed time of each piece of audio data can be reproduced in order.

In addition, when the user can add information such as obtainment dates and times to audio data of music or the like, it is, for example, possible to rearrange the audio data on the basis of the obtainment months and days, the obtainment times or the like of the obtainment dates and times, extract target audio data on the basis of a present date and time or a present time, and reproduce each piece of the extracted audio data for a fixed time.

Thus, even in the case of moving image data or audio data, as in the case of still image data, the present invention rearranges the content data on the basis of a part of date information added to the target content data.

Then, content data suitable for reproduction is extracted using a reproduction month and day or a reproduction time as a predetermined temporal reference, and the extracted content data can be reproduced in a predetermined reproduction mode.

Incidentally, in the foregoing embodiment, when the content data to be reproduced is still image data, the photographing date and time of the still image data is used. However, the present invention is not limited to this. For example, as in the case of audio data of a musical piece, when a sales date is added, the sales date can be used, or when an obtainment date and time can be added, the obtainment date and time can be used. That is, various date and time information that is added to or can be added to content data can be used.

In addition, in the foregoing embodiment, still image display modes without division of the screen, with two divisions of the screen, and with four divisions of the screen have each been described with reference to FIGS. 4A to 4D. However, the present invention is not limited to this. It is also possible to display images in three divided parts of the screen, or to divide the screen into more than four parts and display images in the respective parts.

In addition, in the foregoing embodiment, the "memory frame" and the "photo clock frame" have been described supposing that information indicating an access destination, the number N of display photographs of one screen, a display changing time t, a performance time range T, and the like are registered in advance. However, the present invention is not limited to this.

As a mode of performing the "memory frame" and the "photo clock frame," it is possible to input information such as information indicating an access destination, the number N of display photographs of one screen, a display changing time t, and a performance time range T each time after selecting the frames to be performed, and perform a process corresponding to the input information.

In addition, while the foregoing embodiment has been described by taking as an example a case of applying the present invention to an image display device, the present invention is not limited to this. Because content data may be audio data as described above, the present invention is applicable to audio reproducing devices.

In addition, the present invention is applicable to reproducing devices and recording and reproducing devices capable of reproducing still image data, moving image data, audio data and the like as well as information processing devices such as personal computers.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
circuitry configured to
associate information indicating providing sources with a plurality of display areas of a display screen;
obtain data from the providing sources;
generate a plurality of images using the data obtained from the providing sources; and
control display of the plurality of images in the plurality of the display areas so that each image is displayed in an associated display area of the plurality of display areas,
wherein the data from the providing sources is obtained via the Internet based on results of automatic checking of the providing sources by periodically accessing the providing sources to determine if new data is available at the providing sources, in which the automatic checking determines data of a latest time indicated by the data obtained from the providing sources at a time of the periodically accessing, and the images are updated based on the data obtained from the providing sources.

2. The communication device according to claim 1, wherein the plurality of images to be displayed in the plurality of the display areas comprises at least one of still image data, data of graphics exhibiting no motion, moving image data, data of graphics exhibiting motion, and animation data.

3. The communication device according to claim 1, wherein one of the plurality of display areas indicates a time of day.

4. The communication device according to claim 2, wherein the time of day is represented in an analog clock manner.

5. The communication device according to claim 1, wherein the information indicating providing sources comprises at least one uniform resource locator (URL).

6. The communication device according to claim 1, wherein the images are updated based on the data obtained from the providing sources at predetermined intervals.

7. The communication device according to claim 6, wherein the predetermined intervals are set by a user.

8. The communication device according to claim 1, wherein when data obtained from one of the providing sources is the new data, an indication of the new data is displayed in the display area corresponding to the providing source which provided the new data.

9. The communication device according to claim 1, wherein the device simultaneously displays a plurality of the images in respective ones of the display areas.

10. The communication device according to claim 1, wherein the images include at least of a name of a person and an image of a person.

11. The communication device according to claim 1, wherein a number of the plurality of display areas simultaneously displayed is set by a user.

12. The communication device according to claim 1, wherein the associating information comprises a keyword, and the data from the providing sources is obtained based on the keyword.

13. The communication device according to claim 1, further comprising:
a wireless local area network (LAN) module to receive the data from the providing sources via the Internet;
a display screen exposed to a front of the communication device, the plurality of the display areas being set on the display screen;
a bezel to hold the display screen; and
a supporting leg disposed at a rear of the communication device.

14. A communication method comprising:
associating information indicating providing sources with a plurality of display areas of a display screen;
obtaining data from the providing sources;
generating a plurality of images using the data obtained from the providing sources; and
controlling display of the plurality of images in the plurality of the display areas so that each image is displayed in an associated display area of the plurality of display areas,
wherein the data from the providing sources is obtained via the Internet based on results of automatic checking of the providing sources by periodically accessing the providing sources to determine if new data is available at the providing sources, in which the automatic checking determines data of a latest time indicated by the data obtained from the providing sources at a time of the periodically accessing, and the images are updated based on the data obtained from the providing sources.

15. A non-transitory computer-readable medium having stored thereon a computer-readable program for implementing a communication method, the method comprising:
associating information indicating providing sources with a plurality of display areas of a display screen;
obtaining data from the providing sources;
generating a plurality of images using the data obtained from the providing sources; and
controlling display of the plurality of images in the plurality of the display areas so that each image is displayed in an associated display area of the plurality of display areas,
wherein the data from the providing sources is obtained via the Internet based on results of automatic checking of the providing sources by periodically accessing the providing sources to determine if new data is available at the providing sources, in which the automatic checking determines data of a latest time indicated by the data obtained from the providing sources at a time of the periodically accessing, and the images are updated based on the data obtained from the providing sources.

* * * * *